United States Patent
Bhatti et al.

(10) Patent No.: US 12,130,959 B2
(45) Date of Patent: Oct. 29, 2024

(54) DATA SYSTEMS FOR WEARABLE AUGMENTED REALITY APPARATUS

(71) Applicant: Peloton Interactive, Inc., New York, NY (US)

(72) Inventors: AbdurRahman Bin Shahzad Bhatti, Clyde Hill, WA (US); Jensen Rarig Steven Turner, Everett, WA (US)

(73) Assignee: Peloton Interactive, Inc., New York, NY (US)

( * ) Notice: Subject to any disclaimer, the term of this patent is extended or adjusted under 35 U.S.C. 154(b) by 0 days.

(21) Appl. No.: 17/703,271

(22) Filed: Mar. 24, 2022

(65) Prior Publication Data

US 2023/0040573 A1    Feb. 9, 2023

Related U.S. Application Data

(60) Provisional application No. 63/165,468, filed on Mar. 24, 2021.

(51) Int. Cl.
*G06F 3/01* (2006.01)
*G01S 19/47* (2010.01)
*G06T 19/00* (2011.01)

(52) U.S. Cl.
CPC .............. *G06F 3/012* (2013.01); *G01S 19/47* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 2012/0218263 A1* | 8/2012 | Meier | G06T 19/006 345/419 |
| 2016/0282127 A1* | 9/2016 | Goto | G01S 5/0027 |
| 2017/0102467 A1* | 4/2017 | Nielsen | G01S 19/47 |
| 2017/0124713 A1* | 5/2017 | Jurgenson | G06F 3/04815 |
| 2018/0082482 A1* | 3/2018 | Motta | G06F 3/012 |
| 2019/0026936 A1* | 1/2019 | Gorur Sheshagiri | G06F 3/0304 |
| 2019/0353800 A1* | 11/2019 | Nirula | G01S 19/22 |
| 2020/0404218 A1* | 12/2020 | Yerli | H04L 65/61 |
| 2021/0201588 A1* | 7/2021 | Yerli | G06Q 50/01 |
| 2022/0236425 A1* | 7/2022 | Zangvil | G01S 19/215 |

OTHER PUBLICATIONS

Markus Dorn, Julian O. Filwarny, Manfred Wieser, "Inertially-Aided RTK Based on Tightly-Coupled Integration Using Low-Cost GNSS Receivers," 2017, IEEE European Navigation Conference, pp. 186-197 (Year: 2017).*

* cited by examiner

*Primary Examiner* — Michael J Cobb
(74) *Attorney, Agent, or Firm* — Volpe Koenig

(57) ABSTRACT

Described herein are embodiments of methods and apparatuses for an augmented reality system wherein a wearable augmented reality apparatus may efficiently manage and transfer data and approximate the position of its wearer and the perceived position of a virtual avatar in space. The embodiments may include methods of using data from various external or embedded sensors to estimate and/or determine fields related to the user, apparatus, and/or the avatar. The embodiments may further include methods by which the apparatus can approximate the perceived position of the apparatus and the avatar relative to the user when no predefined path is specified. The embodiments may further include methods by which information about a user's path is compressed and transferred.

19 Claims, 43 Drawing Sheets

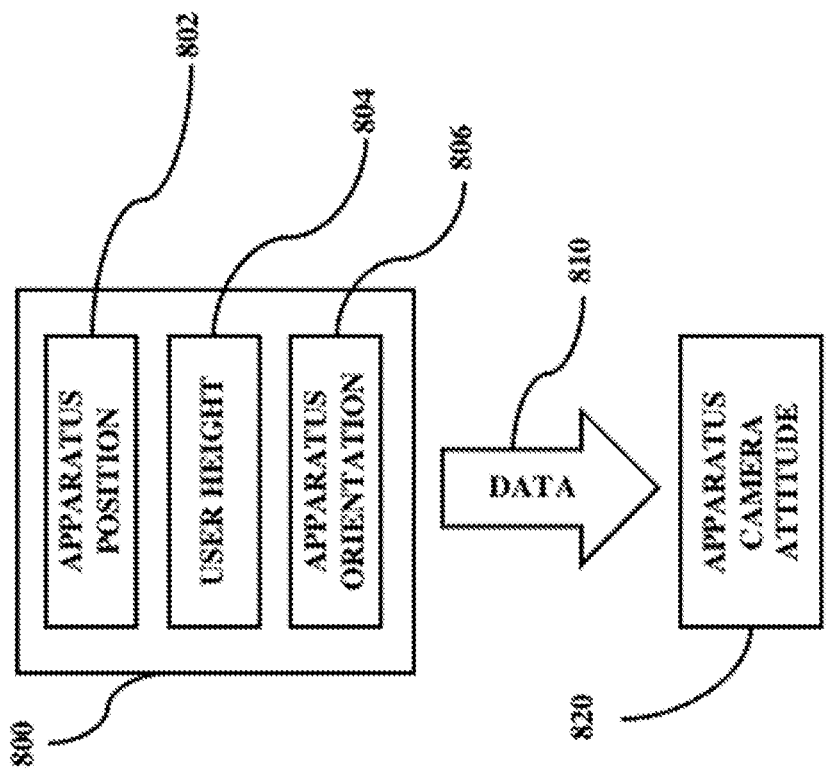

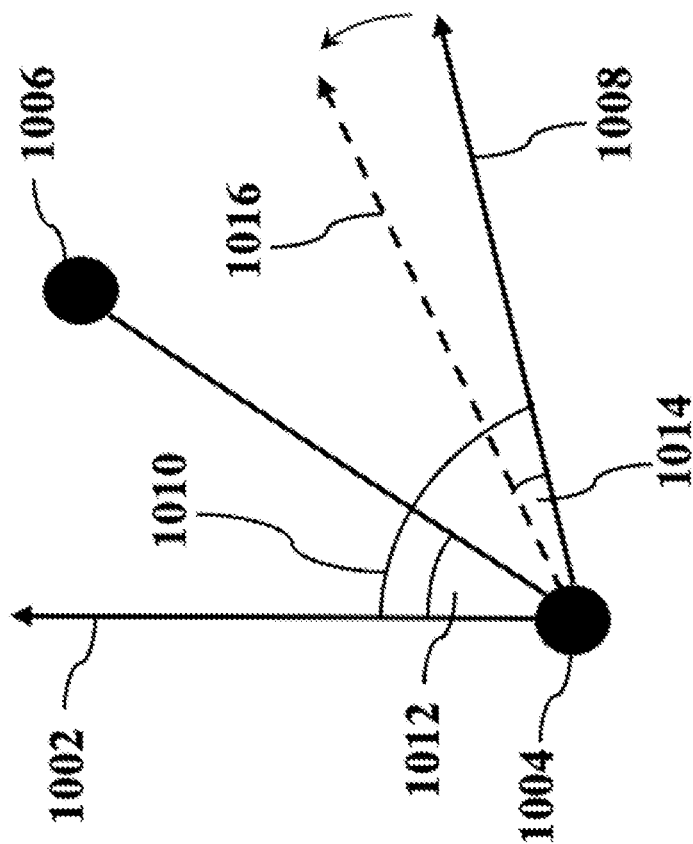
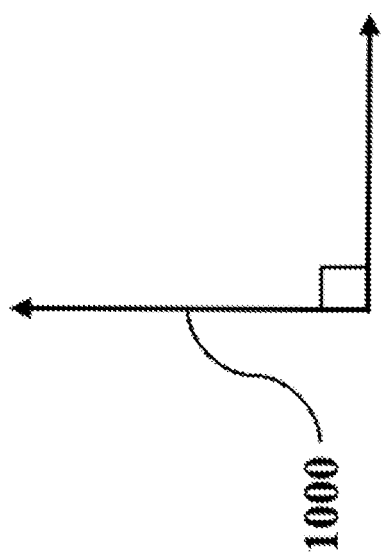
FIG. 9A

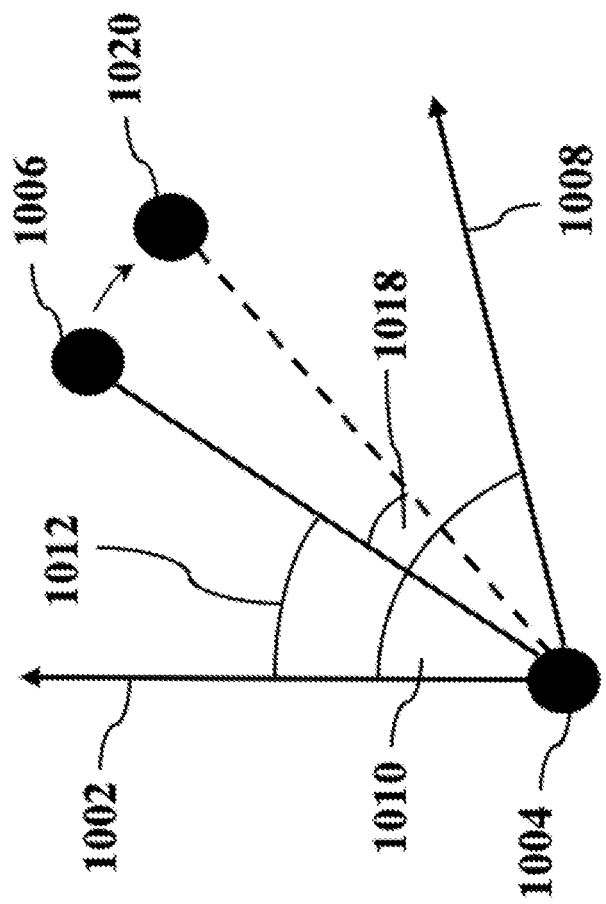
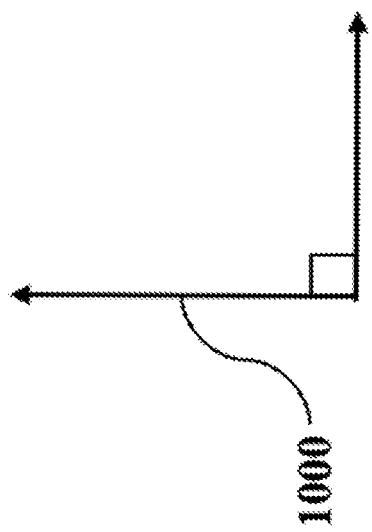
FIG. 9B

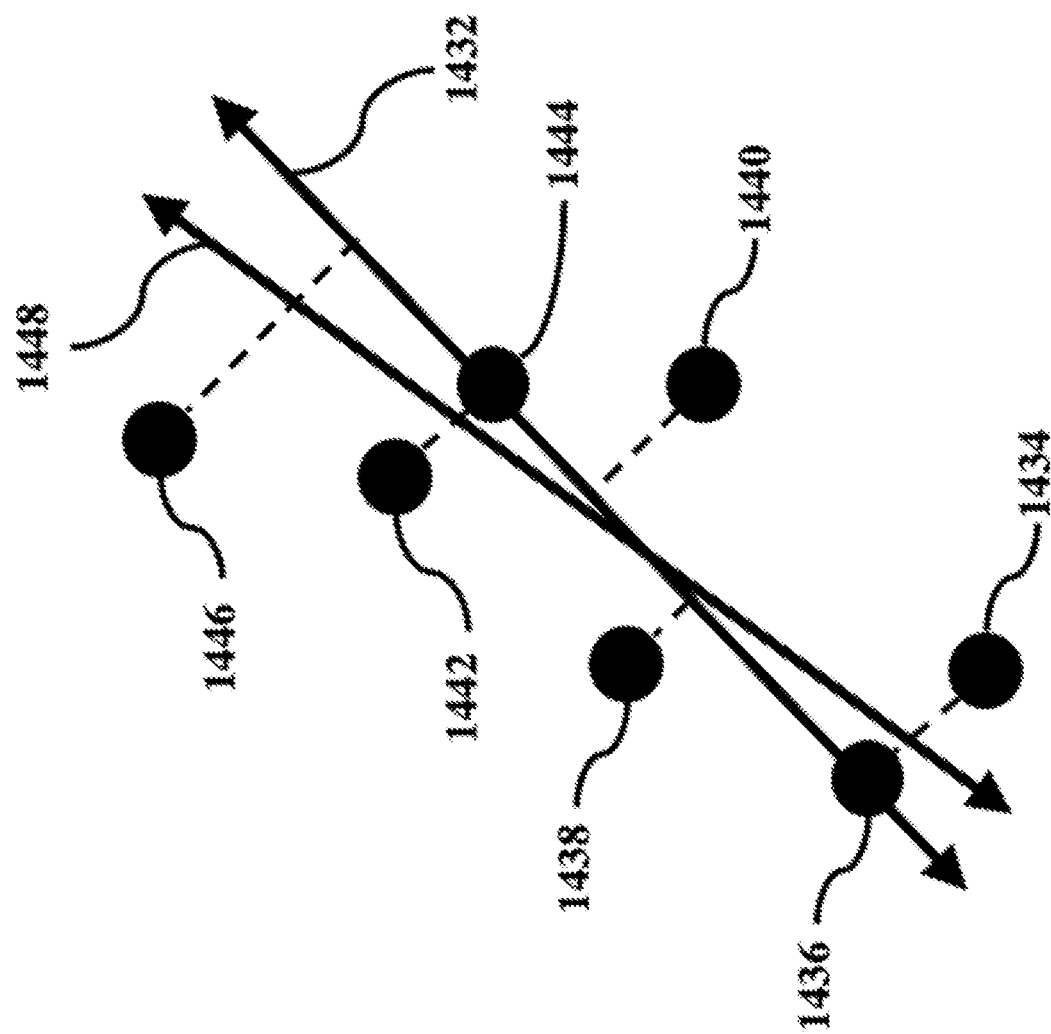

DATA SYSTEMS FOR WEARABLE AUGMENTED REALITY APPARATUS

CROSS REFERENCE TO RELATED APPLICATION

This application claims the benefit of U.S. provisional patent application No. 63/165,468 filed Mar. 24, 2021, which is incorporated by reference as if fully set forth.

BACKGROUND

Augmented reality systems superimpose computer-generated images on a user's view of reality, thus providing a mixed or augmented reality. Wearable augmented reality apparatuses use multiple sensors and data sources in order to create a superimposed image that looks three dimensional to the user.

The data involved in rendering an avatar, approximating the apparatus's position in 3D space, and approximating the position relative to the user requires collection, transmission, and processing in order to determine the appearance of the avatar on a display. Existing systems for augmented reality require meaningful amounts of both processing and electrical power, which can affect the physical parameters and components of an augmented reality headset in a way that detracts from the user experience. Creating a smooth, accurate, and effective augmented reality experience requires synthesizing multiple streams of data and using algorithms efficiently implemented on a computer to interpret various fields and extract useful information.

SUMMARY

Described herein are embodiments of methods and apparatuses for an augmented reality system. Some embodiments may include a wearable augmented reality apparatus that may include a processor operationally coupled to receive data from a sensor system. Some embodiments of the sensor system may include an inertial measurement unit (IMU) sensor and a global navigation satellite system (GNSS) unit. Some embodiments of the wearable augmented reality apparatus may further include a display system operationally coupled to the processor which may be configured to produce at least one avatar superimposed on a field of vision of a user of the wearable augmented reality apparatus.

In some embodiments, the processor may be configured to control the display system to adjust a perceived position of the avatar based at least in part on data received from the sensor system. In some embodiments, data from the sensor system, the position of a user of the wearable augmented reality apparatus, and an avatar may be interpreted by the processor as elements in the same, uniform coordinate system. In some embodiments, the wearable augmented reality apparatus may receive data from a smart device in the augmented reality system. In some embodiments, the wearable augmented reality apparatus may receive data that affects the composition of an avatar from an internet-connected source.

In some embodiments, the processor may synthesize data from multiple sources to approximate a position for a user of the wearable augmented reality apparatus and the processor may further be configured to control the display system to adjust a perceived position of the avatar relative to the user by interpreting and extrapolating data received from the sensor system to determine new updated perceived positions with every frame.

In some embodiments, various algorithms may be applied to data from sensors connected to the wearable augmented reality apparatus and data collected during an activity to provide an effective, accurate, and smooth augmented reality experience.

In some embodiments, a wearable augmented reality apparatus is primarily geared towards activities involving outdoor movement, several of which may be fitness-oriented. The wearable augmented reality apparatus may have an onboard processor configured to modify how one or more holographic avatars are displayed by a display system. The estimated attitude for both the user of the wearable augmented reality apparatus and any generated avatars may be determined based on data from a variety of sensors, such as inertial measurement unit (IMU), global navigation satellite system (GNSS), camera, infrared, etc.

The speed of the apparatus may be estimated based in part on the variance of IMU acceleration data in cases when the dilution of precision (DOP) of available GNSS units indicate that GNSS data alone may not be sufficiently accurate. The estimated speed and position of the apparatus at any given time might also use information about the known environment or data from the camera or previous data points to account for and avoid cumulative error.

If the apparatus outputs data about an activity and the path the apparatus traveled during that activity, that data may be compressed via an onboard compression system before being saved or transmitted elsewhere.

The behavior, such as any one or combination of attitude, appearance, speed, etc., of an avatar may be modified by several factors, including a user's heart rate, exertion levels, or previous workout data. In some cases, avatar behavior might be modified via an external source, whether that is an internet-connected smart device or another wearable augmented reality apparatus.

BRIEF DESCRIPTION OF THE DRAWINGS

A more detailed understanding can be had from the following description, given by way of example in conjunction with the accompanying drawings wherein:

FIG. 6I is a block diagram of another example system for establishing the position of an avatar relative to an apparatus in accordance with some embodiments.

FIG. 7A is a block diagram of an example system for establishing the camera attitude settings of an apparatus in accordance with some embodiments.

FIG. 9A is a diagram that illustrates an example of how the relative positions and orientations of a user and an avatar may be automatically changed depending on the current positioning of that user and that avatar and the orientation of that user in accordance with some embodiments.

FIG. 9B is a diagram that illustrates another example of how the relative positions and orientations of a user and an avatar may be automatically changed depending on the current positioning of that user and that avatar and the orientation of that user in accordance with some embodiments.

FIG. 10 is a diagram that illustrates an example of how the relative positions and orientations of a user and an avatar may be automatically changed when certain conditions are met and there is no predefined path for the user or avatar in accordance with some embodiments.

FIG. 13D is a diagram that illustrates an example of another test of a relationship between multiple points in space in accordance with some embodiments.

DETAILED DESCRIPTION OF THE PREFERRED EMBODIMENTS

Figure 1A:
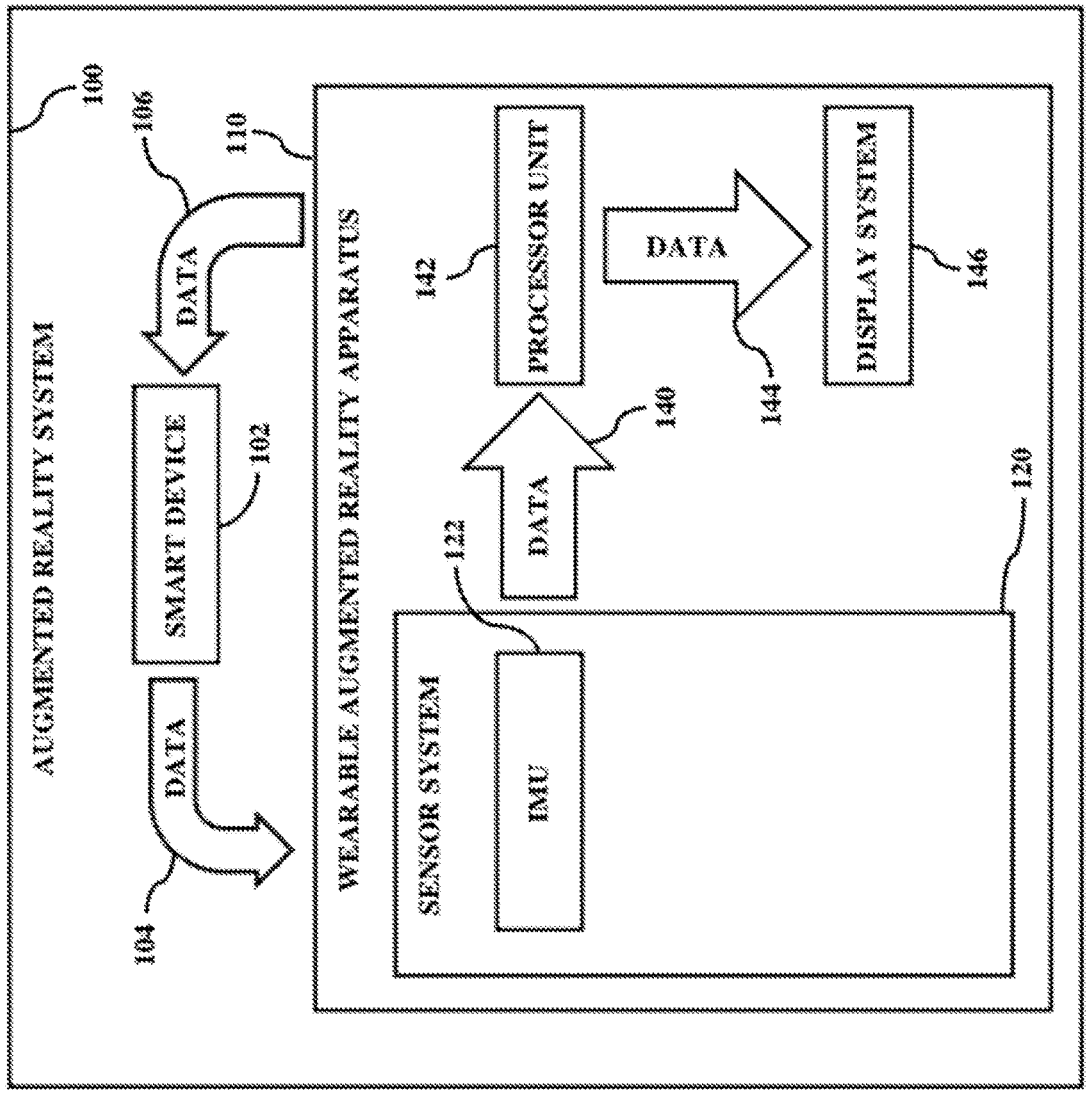
FIG. 1A is a block diagram depicting an example augmented reality system for fitness in accordance with some embodiments.

Although features, techniques, approaches, examples, cases, situations, and elements are described herein in particular combinations, one of ordinary skill in the art will appreciate that each of these features, techniques, approaches, examples, cases, situations, and elements may be used alone or in any combination with the other features, techniques, approaches, examples, cases, situations, and elements.

In addition, the methods described herein may be implemented in a computer program, software, or firmware incorporated in a non-transitory computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a mobile terminal, base station, or any host computer.

One of the key difficulties for augmented reality headsets is determining their position and orientation and the corresponding position and orientation of virtual objects or avatars superimposed onto a user's field of view. Solutions to this problem have various benefits and shortcomings depending on the situation and objectives of the augmented reality headset.

One application of an outdoor augmented reality headset is the generation of a perceived three dimensional (3D) avatar of which a user can set the pace and then race against outdoors. This avatar may be programmed to follow a defined path or just be set to run along the path the user is on. The avatar may also be configured to respond to data received from an external source or user performance. During operation, in order to create an effective workout experience, the position of the user and the avatar at any given time must be approximated in an effective way. Furthermore, data collected and generated by the augmented reality headset must be processed, transferred, and stored through efficient software and hardware systems.

Determining the position of virtual objects and a user of an augmented reality headset in 3D space has several applications beyond running workouts with a virtual running partner. In addition to other distance sports (such as cycling, hiking, etc.), gauging an accurate real-time position can also be used for general navigation, creating superimposed virtual environments, interactive 3D simulations, or any other augmented reality (AR) or virtual reality (VR) application where spacing matters.

Disclosed herein are embodiments of an augmented reality system wherein a wearable augmented reality apparatus may collect and synthesize data and display a holographic avatar which may exhibit certain perceived behavior for a particular activity.

During operation, data from a sensor system that may be included in the wearable augmented reality apparatus or may be coupled to the wearable augmented reality apparatus may send data to a processor that may be included in the wearable augmented reality apparatus, which may be used to modify what is displayed by the apparatus.

In some embodiments, the raw data from a sensor system and/or external sources may be interpreted by the processor in a number of ways in order to better determine what the user and avatar attitudes are and to provide a smooth, fluid experience.

During or after operation, data about the user's movements, etc. may be compressed and uploaded to a smart device once the smart device is paired or otherwise associated with the wearable augmented reality apparatus in accordance with some embodiments.

As used herein, the term attitude may include the position and/or the orientation of a user or a virtual object or system.

As used herein, the term trendline may include any line or curve constructed from a set of points that indicate their general course or tendency.

As used herein, the term global positioning system (GPS) may reference any global navigation satellite system (GNSS), which may refer to data that may include an estimate of the geographic position from one or more constellations of satellites. In accordance with some embodiments, a GPS unit may be operationally linked to the GPS satellite constellation. In accordance with other embodiments, a GPS unit may be a Global Navigation Satellite System (GLONASS), Galileo, and/or BeiDou Navigation Satellite System (BDS) unit, receiving information from at least one or more constellations of satellites.

As used herein, the term user may reference a user of wearable augmented reality apparatus 110 unless otherwise specified.

FIG. 1A is a block diagram of an example augmented reality system 100, which may include smart device 102 and wearable augmented reality apparatus 110 in accordance with some embodiments. Wearable augmented reality apparatus 110 may include sensor system 120, which may send data 140 to processor unit 142 in accordance with some embodiments. Wearable augmented reality apparatus may further include data 144, which may represent the output of processor unit 142 that drives display system 146. Prior or during the operation of wearable augmented reality apparatus 110 wherein holographic objects may be generated, wearable augmented reality apparatus 110 may receive data 104 from smart device 102. Data 104 may include information that outlines the behavior of at least one of the holographic objects generated by wearable augmented reality apparatus 110. Examples of what fields may be included in data 104 are further discussed in FIGS. 5 and 6.

Wearable augmented reality apparatus 110 may include sensor system 120. Among other sensors, sensor system 120 may contain inertial measurement unit (IMU) sensor 122. In accordance with some embodiments, IMU sensor 122 may output data from a magnetometer, a gyroscope, and/or an accelerometer.

Figure 1B:
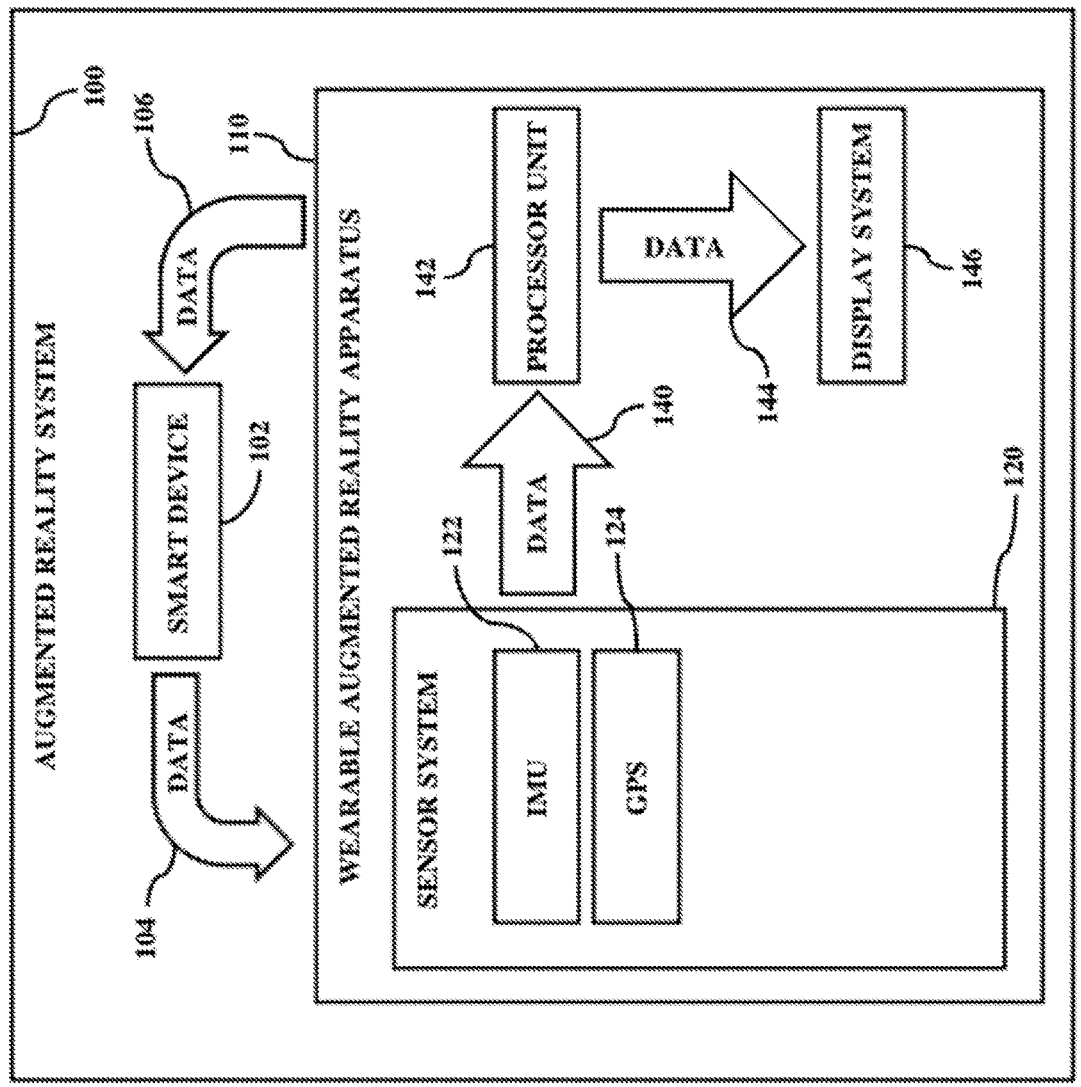
FIG. 1B is a block diagram depicting another example augmented reality system for fitness in accordance with some embodiments.

As shown in FIG. 1B, sensor system may include GPS unit 124, which may output data 140 that may include an estimate of the geographic position and/or coordinates of wearable augmented reality apparatus 110.

Figure 1C:
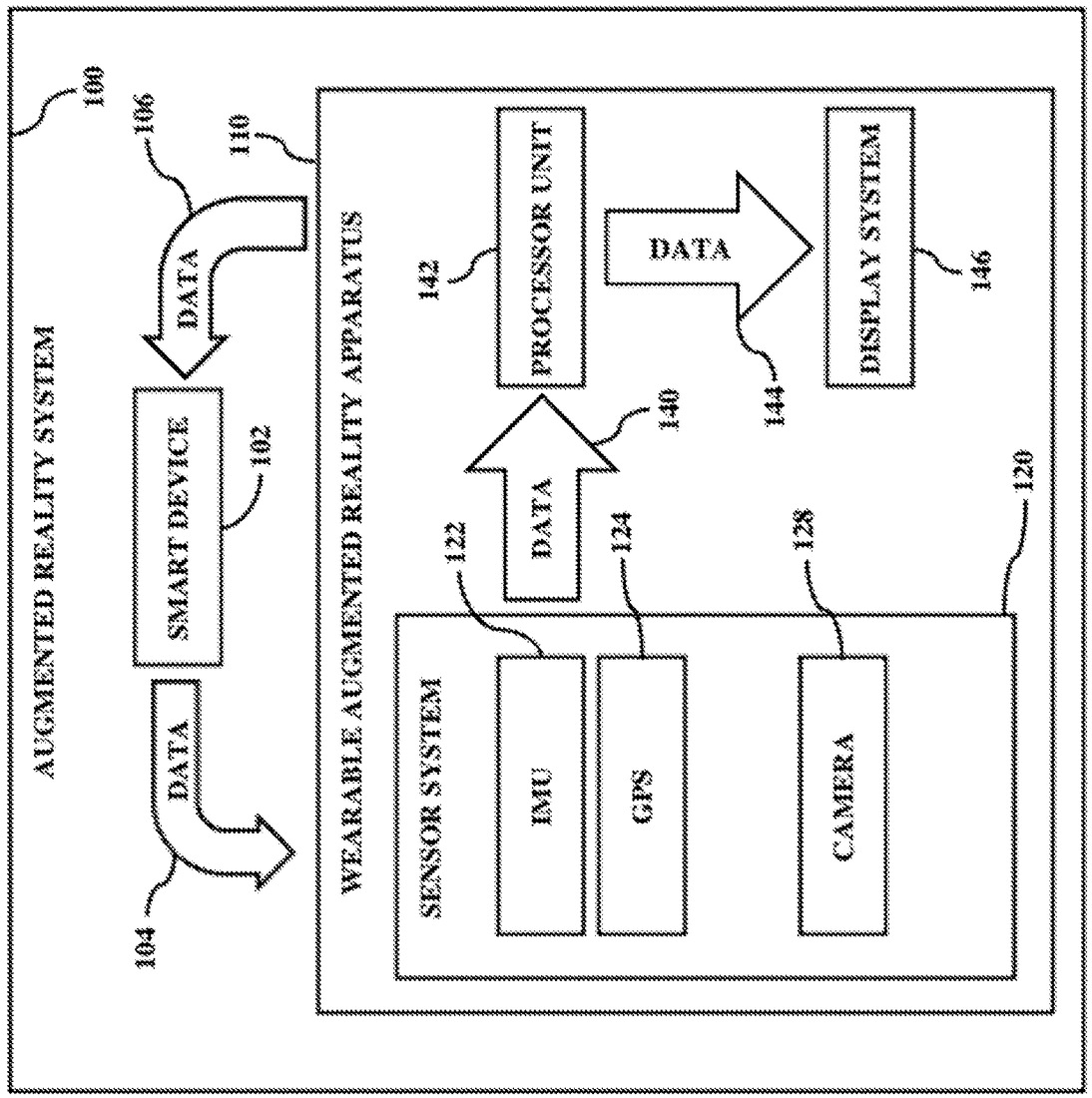
FIG. 1D is a block diagram depicting another example augmented reality system for fitness in accordance with some embodiments.

As shown in FIG. 1C, sensor system 120 may include camera 128, which may be an infrared (IR) or visible spectrum camera in accordance with various embodiments. Camera 128 may provide visual data that may be output as data 140 that may indicate more precise information about the position of the apparatus and about the immediate environment. In accordance with some embodiments, data 140 from camera 128 may be processed by processor unit 142 to provide information about the position of wearable augmented reality apparatus 110. This may modify data 144 and the perceived position of any holographic objects rendered on display system 146 appear relative to the ground as well as relative to any other physical objects in accordance with some embodiments. Visual data from camera 128 may also be used to modify the perceived position of at least one holographic avatar such that virtual objects seen by a user of wearable augmented reality apparatus 110 may not visually overlap or conflict with physical objects in accordance with some embodiments.

Figure 1D:
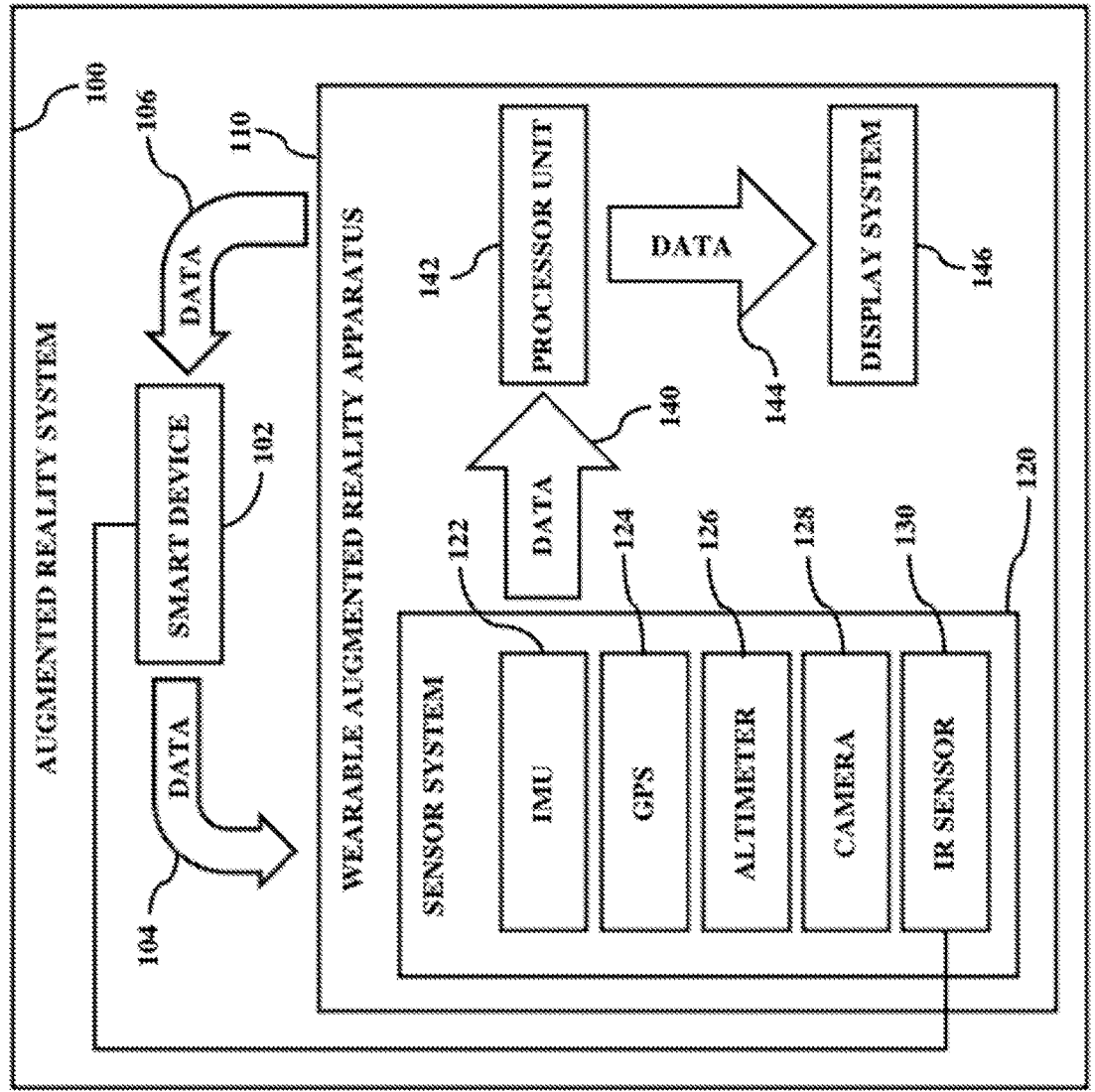

As shown in FIG. 1D, sensor system 120 may include altimeter 126, which may output data 140 about the elevation of wearable augmented reality apparatus 110. In accordance with some embodiments, sensor system 120 may include infrared (IR) sensor 130, which may output data 140 about IR radiation in the immediate area. IR sensor 130 may provide information about a distance of wearable augmented reality apparatus 110 from the ground (and therefore information on height of the user of wearable augmented reality apparatus 110). IR sensor 130 may also be operationally coupled to smart device 102 in accordance with some embodiments and may provide information about relative position and orientation of smart device 102 to wearable augmented reality apparatus 110 or vice versa.

Data 140 from sensor system 120 may include some or all raw data generated from sensors in sensor system 120. In accordance with some embodiments, data 140 may include a combination of information about the orientation, heading, linear acceleration, longitude, latitude, elevation or immediate visual environment of wearable augmented reality apparatus 110 and its user. Data 140 may be used to help determine the attitude of wearable augmented reality apparatus 110 and, by extension, the attitude of a user wearing wearable augmented reality apparatus 110.

Data 140 may be processed by processor unit 142. In accordance with some embodiments, data 140 may be synthesized with data 104. Processor unit 142 may save and/or interpret this data in order to modify data 144, which, in accordance with some embodiments may be passed to display system 146. Depending on the information in data 144, display system 146 may modify how virtual objects are displayed and the attitude of those virtual objects in the virtual reference frame of wearable augmented reality apparatus 110.

In accordance with some embodiments, wearable augmented reality apparatus 110 may output data 106 to smart device 102. In accordance with some embodiments, data 106 may be sent to smart device 102 during or after operation of wearable augmented reality apparatus 110. In accordance with some embodiments, data 106 may include information about a user's workout, regularly updated information about a user's health/performance metrics, and/or information about wearable augmented reality apparatus 110.

Figure 2:
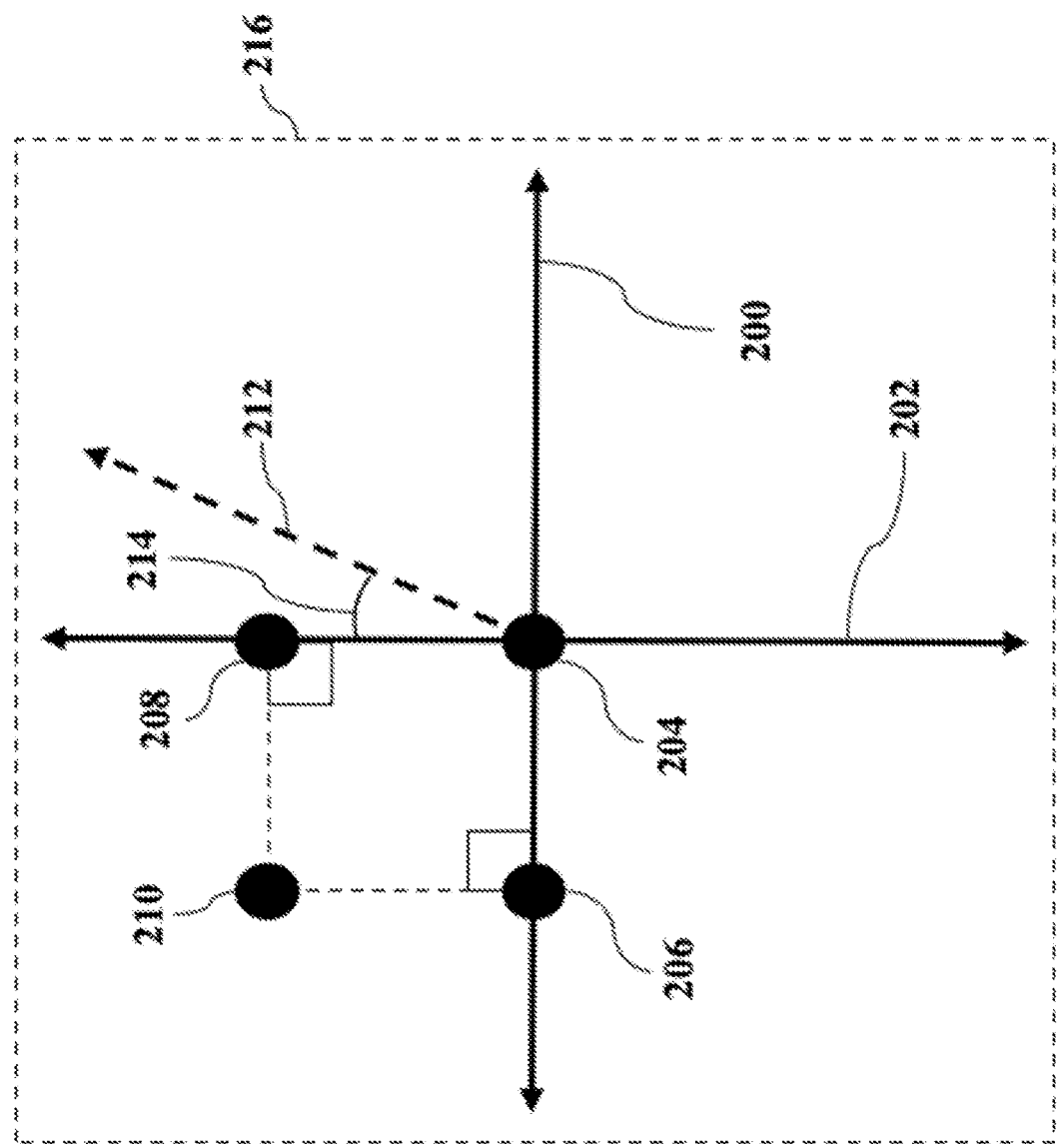
FIG. 2 is a diagram illustrating an example way to construct a uniform coordinate system that can be used to interpret all of the data from sensors in accordance with some embodiments.

FIG. 2 is a diagram illustrating an example of how a uniform flat coordinate system 216 may be constructed which may be used to more easily interpret, for example, location and orientation information, such as data from GPS unit 124 and IMU sensor 122. Coordinate system 216 may include axes 200 and 202. In accordance with some embodiments, axes 200 and 202 are perpendicular to one another. In some embodiments, axis 202 may point towards true north and true south.

Coordinate system 216 may also include origin point 204. Origin 204 has the value [0, 0] in coordinate system 216. Coordinate system 216 may also have corresponding GPS coordinates for a point in space that is relatively close to where wearable augmented reality apparatus 110 was last turned on. Additionally or alternatively, coordinate system 216 may have coordinates for a point in space where an activity was started with wearable augmented reality apparatus 110.

In accordance with some embodiments, GPS unit 124 may provide GPS data, which may include the latitude and longitude of wearable augmented reality apparatus 110 at a given time, which may correspond to a geographic position on the globe, which is approximately spherical. Because the globe is approximately spherical, in order to find the distance between two GPS points, a haversine formula (which differs from a linear distance formula) may be used.

The geographical range in which a single activity with wearable augmented reality apparatus 110 may occur may be locally flat compared to curvature of the globe. And in accordance with some embodiments, arbitrary GPS data point 210 can be mapped onto coordinate system 216 using the haversine function. In accordance with some embodiments, GPS point 206 may be constructed to have the same latitude as point 204 and the same longitude as point 210, and GPS point 208 may be constructed to have the same longitude as point 204 and the same latitude and point 210.

The haversine function can be used to find the distance between points 210 and 208 to find the coordinate for point 210 along the axis 200 in coordinate system 216. Similarly, the haversine function can be used to find the distance between points 210 and 206 to find the coordinate for point 210 along the axis 202 in coordinate system 216.

Data from, for example, GPS unit 124 may use true north as a reference direction, which differs from magnetic north. The angle between true north and magnetic north is known as magnetic declination or magnetic variation, and varies depending on geographic location. In accordance with some embodiments, data from IMU sensor 122 may include a compass heading, indicating the direction wearable augmented reality apparatus 110 and/or the user wearing wearable augmented reality apparatus 110 is facing relative to magnetic north 212. Therefore, for any compass heading data that may come from IMU sensor 122 to be relative to axis 202 instead of direction 212 in coordinate system 216, the compass heading data is adjusted by magnetic declination angle 214.

Figure 3:
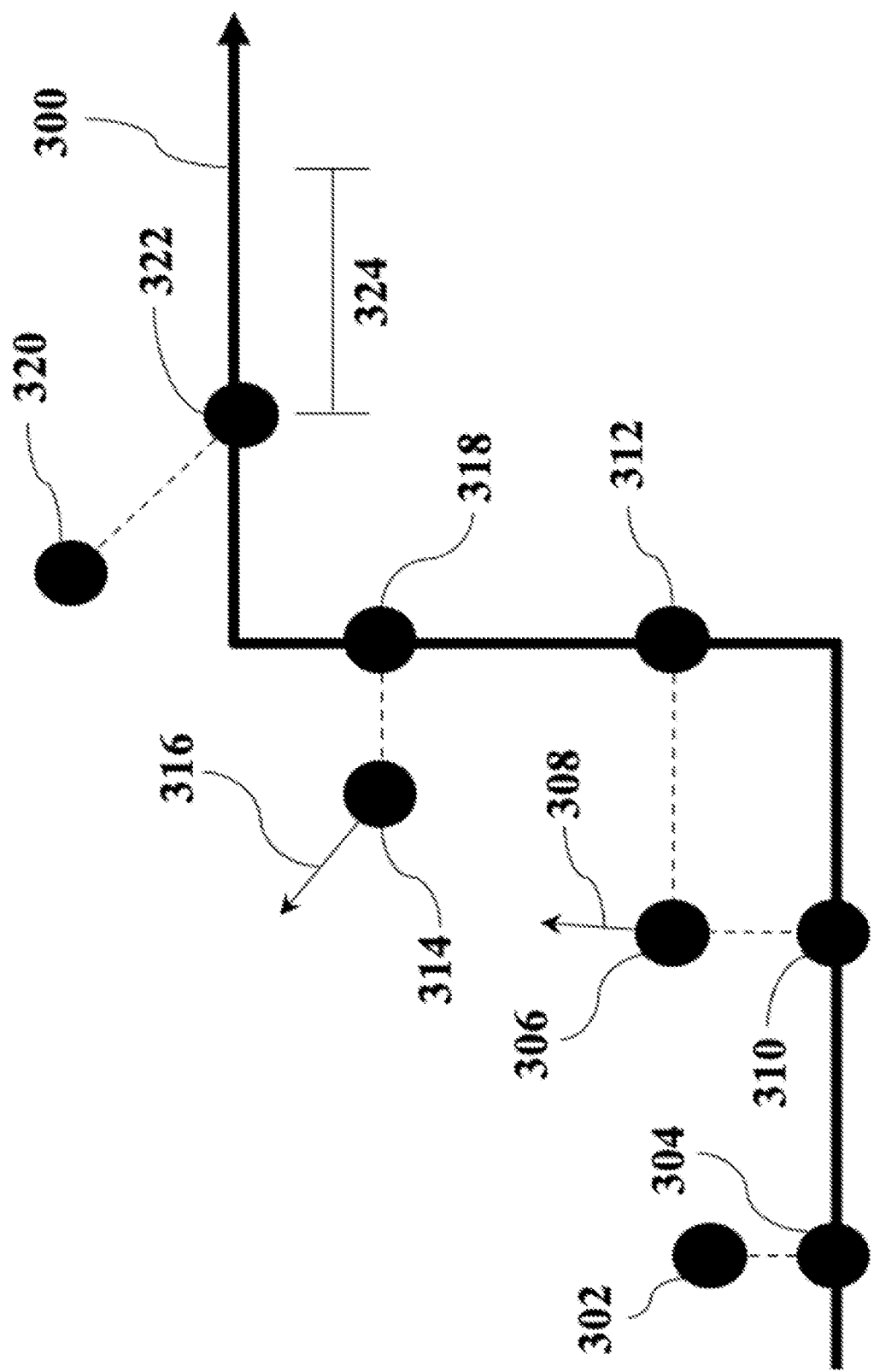
FIG. 3 is a diagram that illustrates examples of how the most likely position along a path may be determined based on at least one recent sensor reading in accordance with some embodiments.

FIG. 3 is a diagram that illustrates examples of how to determine the most likely position for wearable augmented reality apparatus 110 along a predefined path (which may be referred to hereinafter as the "snap point") when new position information is received, such as a GPS point from GPS unit 124.

In accordance with some embodiments, path 300 may be a path constructed using a series of GPS coordinates. In accordance with some embodiments, the snap point that corresponds to arbitrary GPS point 302 along path 300 may be the closest point on path 300 to point 302, which is point 304.

Additionally or alternatively, in accordance with some embodiments, the direction the user of wearable augmented reality apparatus 110 is facing (heading 308) while at GPS point 306 may be used to help determine the snap point corresponding to GPS point 306. In accordance with some embodiments, if the closest point on path 300 to point 306 (point 310) is on a segment of path 300 where the next points along the path 300 are in a significantly different direction than heading 308, it may not be eligible to be the snap point corresponding to point 306 and the snap point may the closest point to point 306 along path 300 that is on a segment of path 300 that aligns closely with heading 308 (i.e. point 312).

Additionally or alternatively, in accordance with some embodiments, if there are no points that are within a certain maximum distance to a GPS point like GPS point 314 along path 300 that are on segments that align meaningfully closely with heading 316, the corresponding snap point to point 314 may be the closest point on path 300 (point 318).

Additionally or alternatively, in accordance with some embodiments, the points along path 300 that may be eligible to be the corresponding snap point for GPS point 320 may be within range 324, a range of distances or points along path 300, in which case the snap point may be point 322, the closest point along path 300 to point 320 within range 324. The example methods in FIG. 3 may be used to update the placement, size, and/or orientation of a holographic avatar rendered on display system 146 to improve the consistency of how the avatar is perceived to be on the same path as a wearer of wearable augmented reality apparatus 110.

Figure 4:
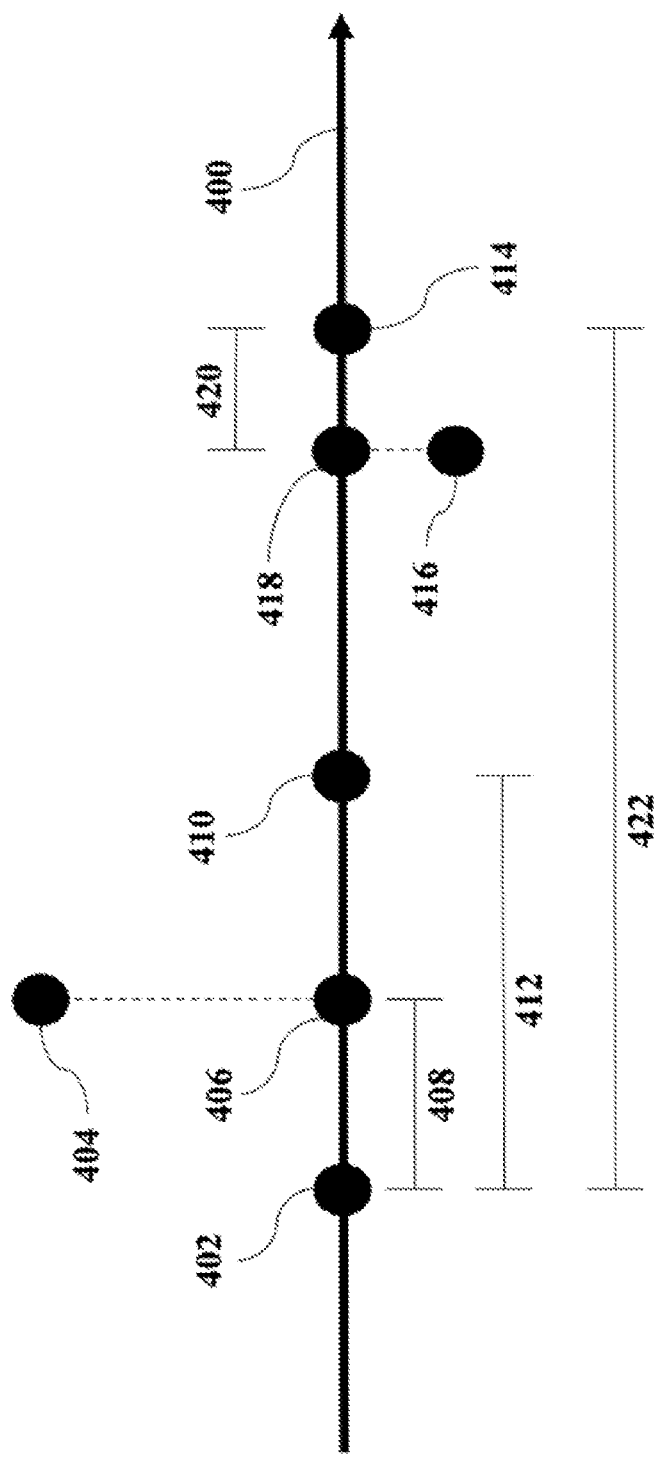
FIG. 4 is a diagram that illustrates an example of how the position of a user along a path may be determined in accordance with some embodiments.

FIG. 4 is a diagram that illustrates an example of how the position of a user along path 400 may be determined both when new position information, such as GPS data from GPS unit 124, is received and for frames rendered by display system 146 when new position information has not yet been received.

The frequency at which several GPS units (like GPS unit 124) update may be relatively low (about 1 Hz) in accordance with some embodiments. This GPS update frequency for GPS unit 124 may be lower than the framerate used by display system 146 (about 30, 60, or 120 Hz in accordance with some embodiments).

An effective augmented reality experience may require that during operation, the position for wearable augmented reality apparatus 110 along path 400 must be accurately estimated in between new GPS readings. In accordance with some embodiments, changes to the user position may also need to be smooth, meaning the user position can only change by incremental changes in distance as opposed to sudden jumps. In accordance with some embodiments, it also may be important to avoid any cumulative error building up with the positioning and the distance a user has travelled. The diagram in FIG. 4 outlines an example of a system that may allow for these conditions to be met to create an effective augmented reality experience where there may be an expected path 400 that a user and at least one avatar may travel along.

In FIG. 4, point 402 may be the position at which the user is estimated to be located along path 400 just before GPS point 404 is received from GPS unit 124. Point 406 may be the snap point corresponding to point 404 and distance 408 may be the distance between points 402 and 406 along path 400.

When GPS point 404 is received, an estimate for the speed the user is moving or information that may be used to calculate an approximate average speed that the user travelled since the last GPS point was received may be received or calculated by wearable augmented reality apparatus 110.

Since the magnitude of a person's acceleration when running may be relatively low, if the frequency of the GPS updates is sufficiently high (~≥0.5 Hz), this speed may be assumed to be the user's speed until the next GPS point is received, meaning that that speed may be used to determine the distance along the path during the time period in between when GPS point 404 is received and when subsequent GPS point 416 is received. Notably, however, if that is how distance along the path is calculated for the entire run, a significant amount of cumulative error may build up over time.

When GPS point 404 is received, the user may be estimated to be at point 402, which may differ from snap point 406 (corresponding to GPS point 404) by distance 408. As shown in FIG. 3, snap point 406 may be interpreted by processor unit 142 to be a more accurate estimate for the position of wearable augmented reality apparatus 110 along path 400 compared to point 402. Thus, distance 408 may be understood to be the "error" in position estimation when GPS point 404 is received. However, the user position may not "jump" from point 402 to point 406 without breaking the smoothness and continuity of the experience.

When determining point 410, which is the position of the apparatus at some arbitrary time after GPS point 404 is received and before GPS point 416 is received, offsetting error may be accomplished by modifying the speed at which it is assumed the user is travelling along the path.

Without loss of generality, the distance travelled in between receiving GPS points is the speed the user is estimated to be travelling when GPS point 404 is received (estimated speed) divided by the GPS update frequency, or rather, [estimated speed/GPS update frequency]. However, in order to account for distance 408, the error in user position, and to ensure further error does not accumulate in position estimation, the distance travelled may need to be [(estimated speed/GPS update frequency)+(distance 408)]. If point 418 is the position of the apparatus along path 400 when GPS point 416 is received, the estimated distance with the adjusted formula may be visually shown in the figure as distance 422.

Since the amount of time in between receiving GPS points is [1/GPS update frequency] and speed is defined as [distance travelled/time elapsed], in order to account for distance 408 and prevent cumulative distance error, after GPS point 404 is received, it may be assumed that the finalized speed of a wearer of wearable augmented reality apparatus 110 along the path, which may modify the placement and appearance of an avatar on display system 146, is [((estimated speed/GPS update frequency)+(distance 408))/(1/GPS update frequency)] or, when simplified, [estimated speed+(distance 408\*GPS update frequency)]. In order to calculate the distance travelled along the path at point 410, this may be expressed as [distance travelled at point 402+((time elapsed since GPS point 404 was received)\*(estimated speed+(distance 408\*GPS update frequency)))].

Since the assumed speed may not be completely accurate, point 414, which is the estimated position of the apparatus just before GPS point 416 is received, may differ from snap point 418 by some distance 420, which, before the next GPS point is received, may be accounted for through a similar method as the method described above that accounts for distance 408. In such a way, finalized speed of a user leading up to the next received GPS point may differ from estimated speed when GPS point 416 is received. In accordance with some embodiments, the distance error of distance 408 may be distributed over frames that have a total duration of less than or more than [1/GPS update frequency].

The calculated finalized speed of user may be used to update the placement, size, and/or orientation of a holographic avatar rendered on display system 146 to minimize the number of significant jumps in avatar appearance between frames and improve consistency of avatar appearance with a programmed/expected behavior.

Figure 5A:
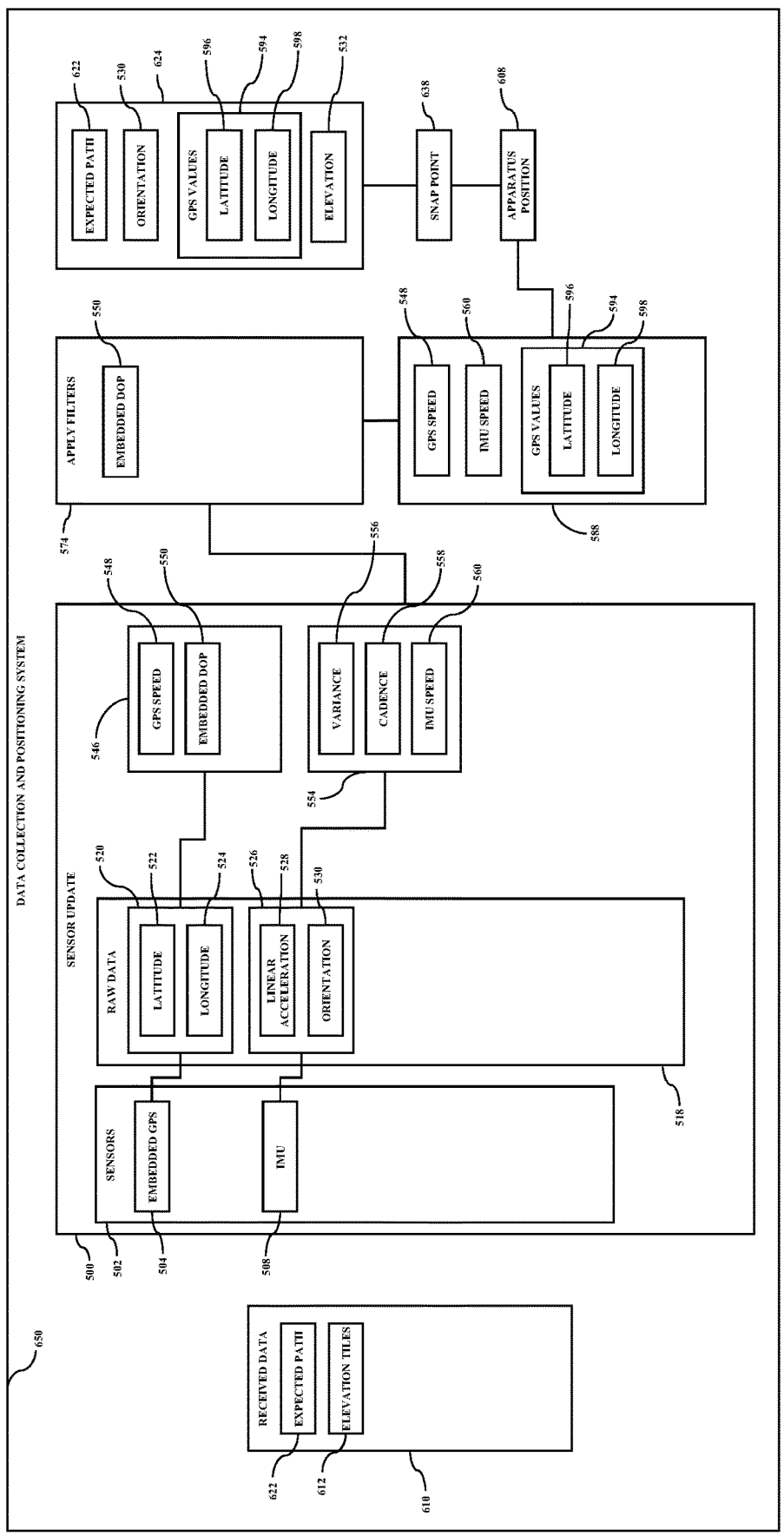
FIG. 5A is a block diagram of an example data collection and positioning system in accordance with some embodiments.
Figure 5B:
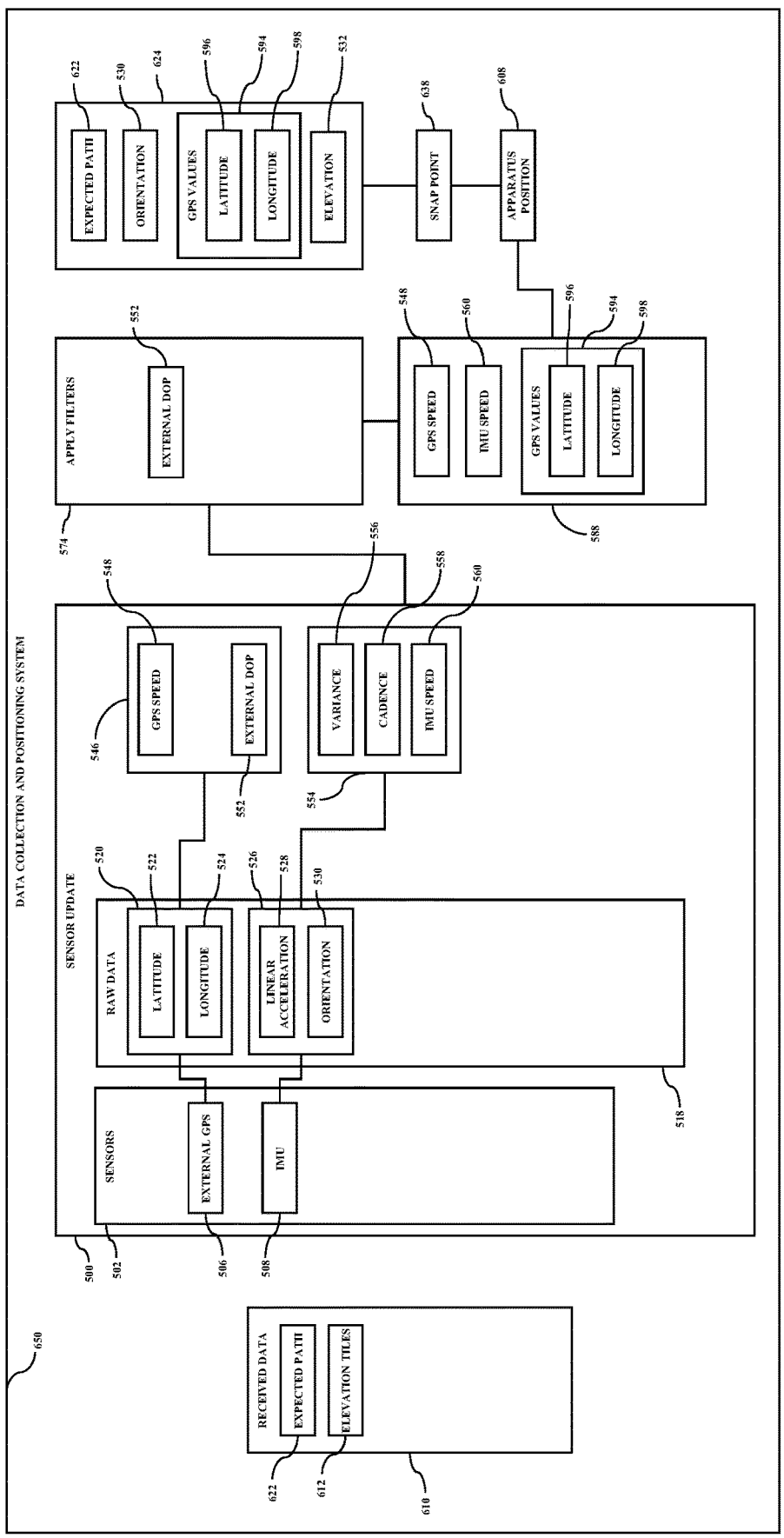
FIG. 5B is a block diagram of another example data collection and positioning system in accordance with some embodiments.
Figure 5C:
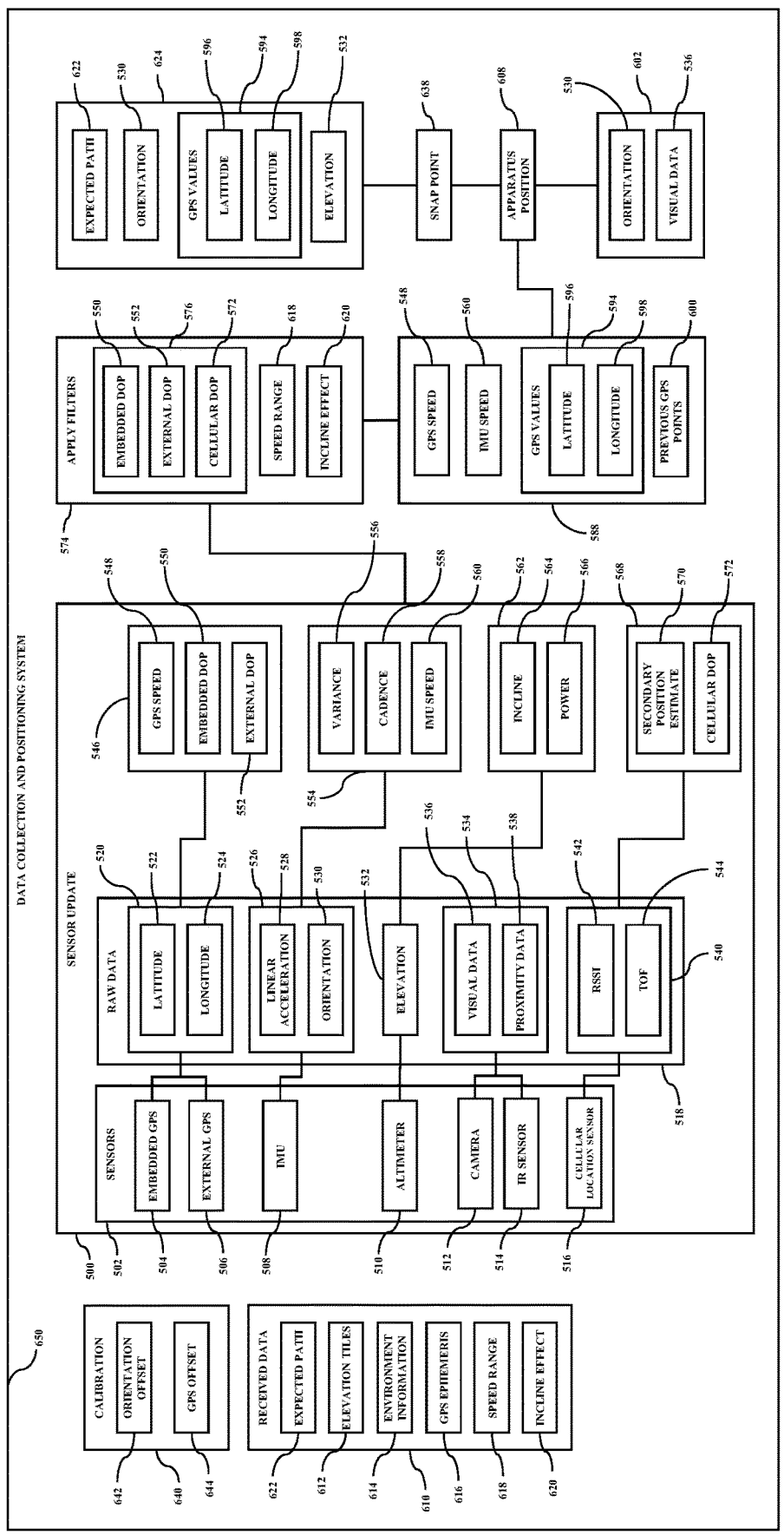
FIG. 5C is a block diagram of another example data collection and positioning system in accordance with some embodiments.

FIGS. 5A-5G depict, by way of example, various embodiments of data collection and positioning system 650. Wearable augmented reality apparatus 110 may use data collection and positioning system 650 to collect data and use at least some of the data to approximate apparatus position 608 for the wearable augmented reality apparatus 110 and, by extension, the user of wearable augmented reality apparatus 110. Data collection and positioning system 650 may be used to improve the accuracy of the estimated position of a user in 2D or 3D space, and thus modify the placement and appearance of an avatar on display system 146 to improve consistency of the avatar with programmed/expected behavior and the avatar's visual consistency with a user's behavior and proximal environment. Approximation of apparatus position 608 may also be accomplished by data collection and positioning system 650 with meaningful efficiency with respect to electrical and processing power, which may allow for reduced capacity of processor unit 142 compared to some existing alternatives to data collection and positioning system 650. FIGS. 5A, 5B, and 5C illustrate examples of data collection and positioning system 650 that may be used to determine the user's position along an expected path 622. In accordance with some embodiments, wearable augmented reality apparatus 110 may receive received data 610 from some external source, for example smart device 102, either prior to or during active operation wherein the position of wearable augmented reality apparatus 110 is determined.

Received data 610 may include expected path 622, which may include a set of GPS points that a user and at least one holographic avatar are expected to approximately follow and are therefore what snap point 638 will lie on. The method data collection and positioning system 650 may use for determining snap point 638 along expected path 622 may be a similar method to how snap points are calculated in FIG. 3 along path 300. In some embodiments, GPS points in expected path 622 might also have associated timestamps, such that the speed of an object previously moving along expected path 622 at any given point might be approximated. Expected path 622 may also include elevation information, such that a 3D trajectory of expected path might be approximated.

Received data 610 may also include elevation tiles 612. In accordance with some embodiments, elements in received data 610 may be received by wearable augmented reality apparatus 110 asynchronously. In accordance with some embodiments, some or all of elements in received data 610 may be received synchronously or asynchronously. Elevation tiles 612 may include information captured by satellites of the surface of the earth and may include elevation values for points on the earth's surface. In some embodiments, these points may be approximately evenly spaced out. Subsections of elevation tiles 612 may include information on the elevation of a specific geographic region.

In accordance with some embodiments, elevation tiles 612 may be pre-processed before being received by wearable augmented reality apparatus 110 to exclude elevation caused by buildings or other obstructions. In accordance with some embodiments, elevation data points from elevation tiles 612 may be linearly or bilinearly interpolated to approximate elevation for an arbitrary point in the geographic region covered by elevation tiles 612.

Data collection and positioning system 650 may include sensor update 500, which may include physical sensors 502 and a set of processes taking place on processor unit 142 to extract data fields from sensors 502, and may be at least partially operationally coupled to sensor system 120 depicted in FIGS. 1A-1C. In accordance with some embodiments, sensor update 500, in addition to raw data 518 and various secondary data, may include sensors 502. Sensors 502 may include IMU 508, which may output IMU raw data 526 that may be interpreted to extract linear acceleration 528 of wearable augmented reality apparatus 110 along at least one axis. IMU raw data 526 may also include information from a magnetometer and/or gyroscope included in IMU 508 to yield orientation 530. Orientation 530 may include the wearable augmented reality apparatus 110's orientation relative to the Earth's magnetic field or relative to some other object or coordinate system.

Raw IMU data 526 may be interpreted and processed by processor unit 142 depicted in FIGS. 1A-1C to yield secondary IMU data 554. Secondary IMU data 554 might include cadence 558, which may include an approximation of the number of steps a user of wearable augmented reality apparatus 110 is taking during a fixed length of time. Cadence 558 may be approximated by examining values of linear acceleration 528 over a period of time. In accordance with some embodiments, orientation 530 data over a period of time may be synthesized with linear acceleration 528 data to approximate cadence 558.

Cadence 558 may be calculated by isolating peaks and/or sinusoidal data within tracked linear acceleration 528 to determine when each step was taken by a user. Cadence 558 may be determined from an IMU on the wearable augmented reality apparatus 110, or it may be determined from data taken from an IMU on an external device. In some embodiments, cadence 558 may include data indicating the probability that the user is walking, jogging, or running in accordance with some embodiments. In some embodiments, cadence 558 may include a boolean that indicates whether the user is currently in motion, which may affect the finalized speed estimated for the user of wearable augmented reality apparatus 110.

IMU secondary data 554 may include IMU variance 556. IMU variance as used herein may refer to any quantitative metric of the spread of linear acceleration data over a fixed period of time or distance or a set of data synthesized from linear acceleration and orientation data over a fixed period of time or distance. In accordance with various embodiments, IMU variance may refer to the statistical variance, standard deviation, or interquartile range of IMU raw data.

In accordance with some embodiments, there may be a correlation that exists between IMU variance 556 and the speed of a user wearing wearable augmented reality apparatus 110. If IMU variance 556 is higher, there may be a higher chance that the user of wearable augmented reality apparatus 110 is using more force with each step, and therefore proportionally travelling further with each step, thus increasing their speed. IMU speed 560, which may include an estimated speed for the user of wearable augmented reality apparatus 110 based at least on data from IMU 508, may be further approximated based at least partially on IMU variance 556.

In accordance with some embodiments, IMU speed 558 may be calculated using a polynomial function from IMU variance 556. In accordance with some embodiments, IMU speed 560 may be a combination of polynomial functions of IMU variance 556 where IMU variance 556 may be calculated across multiple periods of time and/or across multiple acceleration axes. In accordance with some embodiments, IMU speed 560 may be a linear combination of polynomial functions of IMU variance 556 values. This estimation of speed based on IMU data may reduce capacity of processor unit 142 and modify the placement and appearance of an avatar on display system 146 to improve consistency of the avatar with programmed/expected behavior and the avatar's visual consistency with a user's behavior and proximal environment.

In accordance with some embodiments, sensors 502 may include embedded GPS 504. Embedded GPS 504 may include a physical GPS antenna or transceiver in wearable augmented reality apparatus 110 that may output raw GPS data 520. Raw GPS data 520 may include information on the geographic position of the wearable augmented reality apparatus 110. In accordance with some embodiments, raw GPS data 520 may include latitude 522 and longitude 524.

Raw GPS data 520 may be collected over a given period of time such that secondary GPS data 546 may be extracted. Secondary GPS data 546 may be received directly from embedded GPS 504 or may be calculated by processor unit 142. Secondary GPS data 546 may include GPS speed 548, which may include the approximate speed at which the user of wearable augmented reality apparatus 110 is travelling when a new GPS update is received. In accordance with some embodiments, GPS speed 548 may be approximated by dividing the distance between consecutive latitude 522 and longitude 524 values by the amount of time between GPS updates.

In accordance with some embodiments, secondary GPS data 546 may include embedded dilution of precision (DOP) 550. As used herein, DOP may refer to any measure of accuracy or precision of GPS readings including, for example, signal-to-noise ratio, technical DOP, etc. Embedded DOP 550 may include a measure of the accuracy of data from embedded GPS 504. As an example, in dense urban environments, where wearable augmented reality apparatus 110 may have less line of sight access to GPS satellites, there may be significantly more variation in latitude 522 and longitude 524 even if the user of wearable augmented reality apparatus 110 is not moving that much. A high value of embedded DOP 550 may indicate that GPS speed 548 is also relatively inaccurate. Improvement of accuracy to estimated position compared to raw GPS readings may be used to modify the placement and appearance of an avatar on display system 146 to improve consistency of the avatar with programmed/expected behavior and the avatar's visual consistency with a user's behavior and proximal environment.

As shown in FIG. 5B, in accordance with some embodiments, sensors may include external GPS 506. External GPS 506 may have an antenna or transceiver that is not located physically on or within wearable augmented reality apparatus 110. In accordance with some embodiments, external GPS 506 may be embedded in a smart device operationally coupled to wearable augmented reality apparatus 110, for example smart device 102 depicted in FIGS. 1A-1C, where that smart device regularly transmits external GPS data to wearable augmented reality apparatus 110. In accordance with some embodiments, external GPS 506 may output raw data that corresponds to latitude 522 and longitude 524. External GPS 506 may also have a corresponding DOP value, depicted as external DOP 552, which may include a quantitative measure of the accuracy of external GPS 506. In accordance with some embodiments, external DOP 552 may differ from embedded DOP 550 due to, among other things, proximity to a system outputting electrical/GPS signal interference, orientation, antenna size, and/or physical location.

As shown in FIG. 5A and FIG. 5B, apply filters 574 may be applied to data from sensor update 500. Depending on the composition of sensors 502, apply filters 574 may include embedded DOP 550 in accordance with some embodiments. In some embodiments, apply filters 572 includes an algorithmic system executed on processor unit 142 that is used to modify the placement and appearance of an avatar on display system 146 to improve consistency of the avatar with programmed/expected behavior and the avatar's visual consistency with a user's behavior and proximal environment, In accordance with some embodiments, apply filters may include external DOP 552. Through apply filters 574, certain weights to different data in data set 588 may be applied. As an example, if embedded DOP 550 and/or external DOP 552 are meaningfully large, IMU speed 560 may be understood to be more accurate than GPS speed 548. Synthesized/finalized GPS values 594 may include new latitude 596 and new longitude 598, which depending on apply filters 574 and the composition of sensor update 500 may differ from raw latitude 522 and raw longitude 524.

In accordance with some embodiments, snap point 638 may be generated from data set 624 using, for example, the process outlined in FIG. 3. In accordance with some embodiments, data set 624 may include some combination with at least one element among expected path 622, orientation 530, and GPS values 594. In accordance with some embodiments, data set 624 may also include elevation 532, which may be used to approximate a user's position along a segment of an expected path 622 with a large range of elevations.

In accordance with some embodiments, the values in snap point 638 may be synthesized with weighted data from data set 588 to provide an estimate of apparatus position 608 in 2D and/or 3D space.

As shown in FIG. 5C, more elements may be included in data collection and positioning system 650, which may increase the efficacy of the system. In accordance with some embodiments, data collection and positioning system 650 may include calibration 640, which may be an algorithmic system executed by processor unit 142 used to modify the placement and appearance of an avatar on display system 146 to improve the avatar's visual consistency with a user's behavior and proximal environment. Calibration 640 may happen prior to a virtual avatar being generated by wearable augmented reality apparatus 110. During calibration 640, orientation offset 642 may be determined by analyzing data collected by wearable augmented reality apparatus 110 over a period of time or calculated from raw values sent to wearable augmented reality apparatus 110.

Orientation offset 642 may include magnetic declination angle 214 which may be used to adjust the compass heading to be in line with the GPS axes as illustrated in FIG. 2. Orientation offset may also account for different head sizes for users of wearable augmented reality apparatus 110. Two users with different heads may stretch wearable augmented reality apparatus 110 differently, which means that even if those two users were to face the same direction, data from IMU sensor 508 describing orientation 530 may vary slightly between them. In accordance with some embodiments, orientation offset may be used to adjust orientation data 530 such that it remains more consistent across different users.

During calibration 640, GPS offset 644 may be calculated or established. GPS offset 644 may be used to account for how latitude 522 and longitude 524 might be off by a consistent amount from their real-world position along either or both of axis 202 and axis 204. If ignored, this may create errors in data collection and positioning system 650. In some embodiments, GPS offset 644 may be initially calculated during calibration 640 by having the user indicate when they are at the start point of expected path 622 and comparing the live GPS reading then to the saved start point of expected path 622. In accordance with some embodiments, GPS offset 644 might be changed after calibration 640.

In accordance with some embodiments, in addition to expected path 622 and elevation tiles 612, received data 610 may include environment information 614. Environment information 614 may include visual markers or a 3D map of the location of wearable augmented reality apparatus 110, which may be processed by processor unit 142 to allow for more accuracy with regards to how virtual objects may be displayed. Environment information 614 may include more accurate or precise elevation values for a region. Environment information 614 may include information about the terrain and a classification for the environment (urban, running trail, hazardous, etc.).

In accordance with some embodiments, received data 610 may include GPS ephemeris 616. GPS ephemeris 616 may include data on the predicted and current location of satellites that embedded GPS 504 or external GPS 506 might use to triangulate the position of wearable augmented reality apparatus 110. GPS ephemeris data 616 may provide additional information on satellites since there may be a difference between predicted position of satellites at a given time and actual position, which in turn would affect the accuracy of raw GPS data 520 and secondary GPS data 564. GPS ephemeris 616, in accordance with some embodiments, may be received by wearable augmented reality apparatus 110 by a device connected to the internet. In accordance with some embodiments, smart device 102 may send GPS ephemeris 616 to wearable augmented reality apparatus 110 as part of data 104 either before or actively during operation of wearable augmented reality apparatus 110. In accordance with some embodiments, wearable augmented reality apparatus 110 may be connected to the internet and incorporate GPS ephemeris 616 into data collection and positioning system 650 before or actively during operation of wearable augmented reality apparatus 110. GPS ephemeris 616 may be used to modify the placement and appearance of an avatar on display system 146 to improve consistency of the avatar with programmed/expected behavior and the avatar's visual consistency with a user's behavior and proximal environment.

In accordance with some embodiments, data collection and positioning system 650 may incorporate speed range 618, which may be included in received data 610. In accordance with some embodiments, speed range 618 may outline a range of speeds that would be reasonable for a user during an activity with wearable augmented reality apparatus 110.

In accordance with some embodiments, speed range 618 may be based at least partially on a user's workout history and/or speed information included with expected path 622. Speed range 618 may be incorporated into apply filters 574, wherein it may be used to help determine how heavily GPS speed 548 and/or IMU speed 560 are weighted in determining a user's overall speed.

Anatomically, humans have not been shown to be able to exceed a 13 m/s speed on foot. For reference, Usain's Bolt fastest speed during his world record sprint was just above 10 m/s. Therefore, a reasonable speed range for all people may be less than 10 m/s for a run and any GPS speed 548 or IMU speed 560 exceeding that may be considered erroneous. However, for different people and different routes, that upper threshold in terms of what is a reasonable speed will vary. In accordance with some embodiments, speed range 618 may not be included in received data 610, but may be a predetermined value or a set of values that may be accessed by processor unit 142 and incorporated into apply filters 574.

In accordance with other embodiments, received data 610 may include incline effect 620. Because it may take more energy for a user to run uphill than to run downhill on the same surface, some people may tend to run faster downhill than uphill. By a similar line of reasoning, there may generally exist a correlation between the incline the user is travelling on, which may be indicated by incline data 564, and their speed assuming they are exerting a constant amount of effort. Different people may be affected by hills and incline changes differently. For instance, more experienced distance runners will typically maintain a more constant speed on uphill and downhill segments as compared to less experienced runners. Incline effect 620 may describe how a user's speed is likely to be impacted by the incline they are on.

In accordance with some embodiments, there may be a default value, set of values, or function for incline effect 620 and/or a value or function specific to a user's previous workout data. In accordance with some embodiments, incline effect 620 may be received by wearable augmented reality apparatus 110 during receive data 610. Incline 564 and incline effect 620 (which may outline the likely impact of incline 564 on user speed) may be incorporated into apply filters 574, wherein they may be used to help determine how reasonable an estimated overall speed is at a given time.

In accordance with some embodiments, sensors 502 may include altimeter 510, which may output raw data elevation 532. In accordance with some embodiments, elevation 532 may include data about the elevation of wearable augmented reality apparatus 110 relative to sea level and/or relative to the starting elevation of the user. In accordance with some embodiments, altimeter 510 may be physically attached to or embedded within wearable augmented reality apparatus 110. In accordance with some embodiments, altimeter 510 may be part of an external device operationally coupled to wearable augmented reality apparatus 110 and elevation 510 may be periodically received by wearable augmented reality apparatus 110.

In accordance with some embodiments, elevation 510 may be calculated without the use of an altimeter and be based primarily off of elevation tiles 612 and the estimated geographic position of the user in GPS values 594. In accordance with some embodiments, secondary elevation raw data 562 may be generated from tracking how elevation 532 changes over time. Secondary elevation data 562 may include incline 564, which may be a quantifiable measure of the change in elevation of wearable augmented reality apparatus 110 over a fixed amount of time or distance. Incline 564 might also be estimated using elevation tiles 612 and the heading and/or orientation of the user of wearable augmented reality apparatus 110 in accordance with some embodiments. Incline 564 may be used to calculate power 566, which may include an estimate of how much energy the user is actively exerting over a fixed period of time. Inputs for power 566 are further discussed in FIG. 16A and FIG. 16B.

Figure 10:
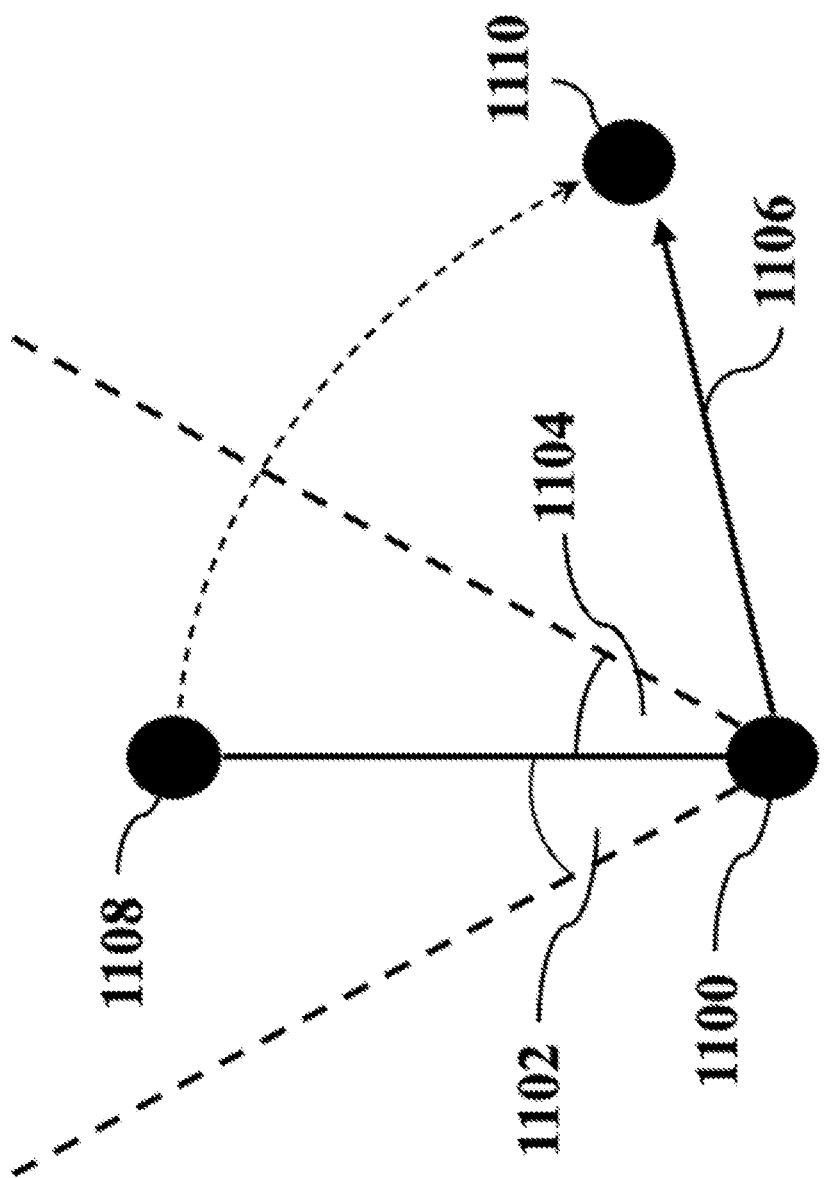
FIG. 10 is a block diagram depicting another example augmented reality system for fitness in accordance with some embodiments.

In accordance with some embodiments, wearable augmented reality apparatus 110 may include camera 512, which may correspond to camera 128 in FIG. 10, and may be an IR or visible spectrum camera in accordance with various embodiments. In accordance with some embodiments, wearable augmented reality apparatus 110 may include IR sensor 514, which may correspond to IR sensor 130 in FIG. 1D, which may be operationally coupled to an external smart device. In accordance with some embodiments, IR sensor 514 may refer to an ultrasonic or alternative proximity sensor. Camera 512 and IR sensor 514 may output raw line-of-sight data 534, which may be included in raw data 518. Line-of-sight data 534 may include information on the environment around wearable augmented reality apparatus 110 that is in a direct line of sight with the camera 512 or IR sensor 514, operating on the visible and/or infrared spectrum.

In accordance with some embodiments, line-of-sight data 534, may include visual data 536 that may indicate more precise information about the position of wearable augmented reality apparatus 110 and the immediate visible environment. In accordance with some embodiments, visual data 536 may include whether there are any identifiable physical objects nearby that a holographic object rendered by wearable augmented reality apparatus 110 may interact with and/or if there are any other visual indicators that may affect the visual output of display system 146. Visual data 536 may also be used to modify the perceived position of at least one holographic avatar such that virtual objects seen by the user of wearable augmented reality apparatus 110 do not visually overlap or conflict with physical objects or the ground in front of the user of wearable augmented reality apparatus 110 in accordance with some embodiments.

Proximity data 538 may include information that IR sensor 130 may provide about a distance of wearable augmented reality apparatus 110 from the ground and/or from other physical objects. In accordance with some embodiments, a user of wearable augmented reality apparatus 110 may have IR-emitting objects on their person or in their immediate vicinity and, through IR sensor 514, proximity data 538 may include the relative proximity to and/or relative orientation of the headset to those IR-emitting objects.

In accordance with some embodiments, sensors 502 may include cellular location sensor 516, which may be included in wearable augmented reality apparatus 110 in accordance with some embodiments. In accordance with some embodiments, cellular location sensor 516 may also be part of an internet proxy device located on or near the user of wearable augmented reality apparatus 110. Cellular location sensor 516 may provide an additional source of data on the geographic position of wearable augmented reality apparatus 110.

In accordance with some embodiments, cellular location sensor 516 may output raw cellular data 544, which may include received signal strength indicator (RSSI) data 542 and time of flight (TOF) data 544. RSSI data 5342 and TOF data 544 may be synthesized over a fixed period of time to result in secondary position estimate 570. In accordance with some embodiments, secondary position estimate 570 may include estimated GPS coordinates of wearable augmented reality apparatus 110. Secondary position estimate 570 may be weighted in the calculation of apparatus position 608 and may be used to modify the placement and appearance of an avatar on display system 146 to improve consistency of the avatar with programmed/expected behavior and the avatar's visual consistency with a user's behavior and proximal environment. In accordance with some embodiments, secondary position estimate 570 may include positional data on wearable augmented reality apparatus 110 relative to a fixed location or previous positions.

In accordance with some embodiments, cellular location sensor 516 may have a corresponding cellular DOP 572, which may indicate the accuracy of the positional data derived from the raw data of cellular location sensor 516.

In accordance with some embodiments, DOP data 576 may be an input during apply filters 574. Based on the values of embedded DOP 550, external DOP 552, and/or cellular DOP 572, finalized GPS values 594 and GPS speed 548 may be determined using some combination of data from embedded GPS 504, external GPS 506, and/or cellular location sensor 516. In accordance with some embodiments, if all the values in DOP data 576 are above a set of predetermined thresholds, data from all corresponding sensors may be regarded as generally invalid, and more weight may be ascribed to data from IMU sensor 508, with regards to user final speed, changes in geographic location, and/or heading.

In accordance with some embodiments, data set 588 may include previous GPS points 600, which, based on the data from apply filters 574, may have a certain mathematical weight ascribed to them in determining apparatus position 608. For example, assuming DOP data 576 has at least one sufficiently low value, GPS values 594 may be assumed to be reasonably accurate, and it may be assumed that there is a maximum distance that a user may move away from an accurate position reading in a given amount of time, which may minimize the difference in placement of an avatar on display system 146 between frame updates. Previous GPS points 600 may also be used to determine the heading or another speed approximation for the user of wearable augmented reality apparatus 110 in accordance with various embodiments.

In accordance with some embodiments, camera data set 602 may be incorporated in determining apparatus position. Visual data 536 from camera 512 and IR sensor 514 may be synthesized with orientation 530 from IMU 508, which may provide a more holistic sense of what visual data should indicate based on predictions and how predictions about apparatus position 608 might need to be modified based at least partially on raw visual data 536. This may be accomplished by simultaneous localization and mapping (SLAM) or simpler algorithms to analyze visual data 536.

Figure 5D:
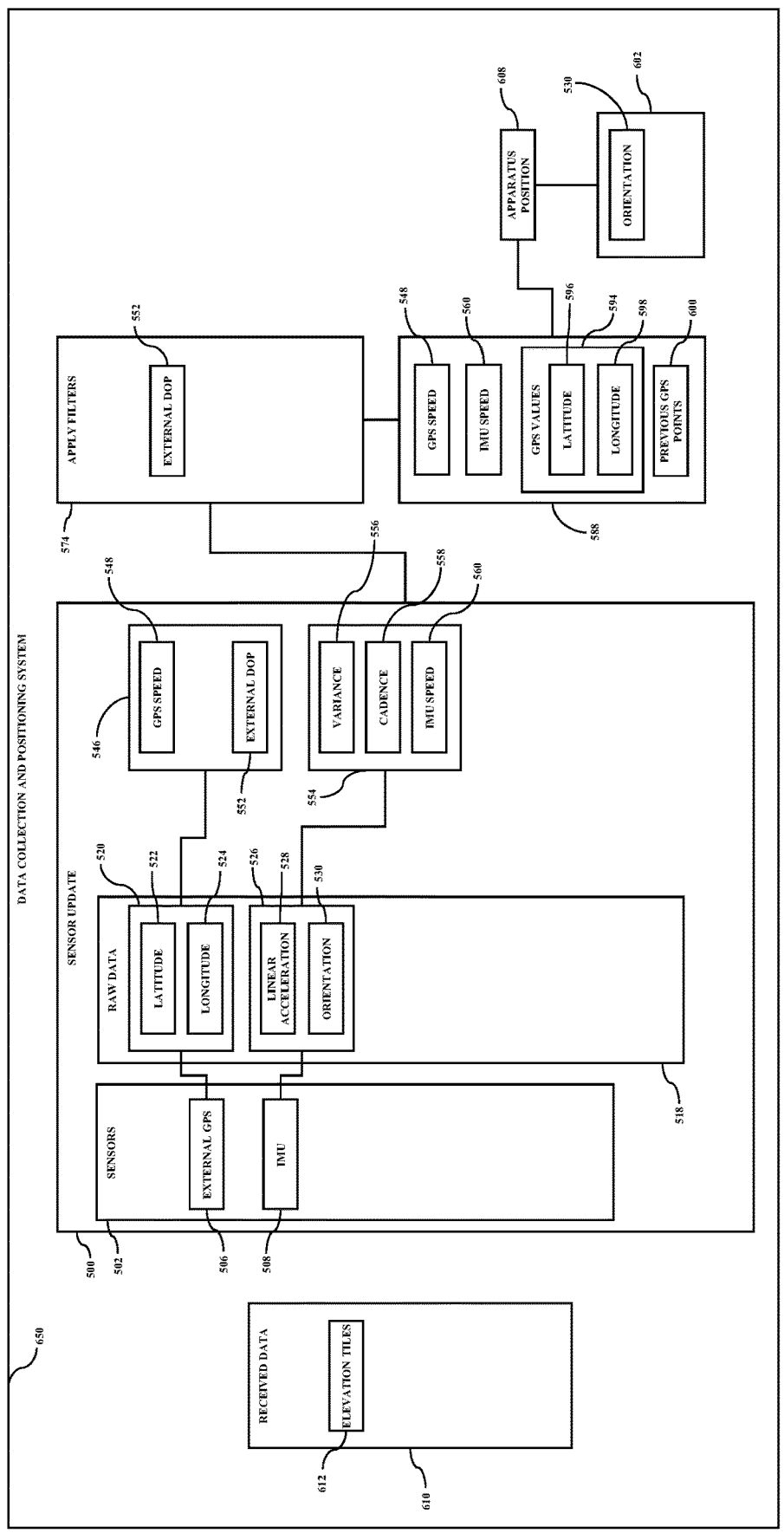
FIG. 5D is a block diagram of another example data collection and positioning system in accordance with some embodiments.
Figure 5E:
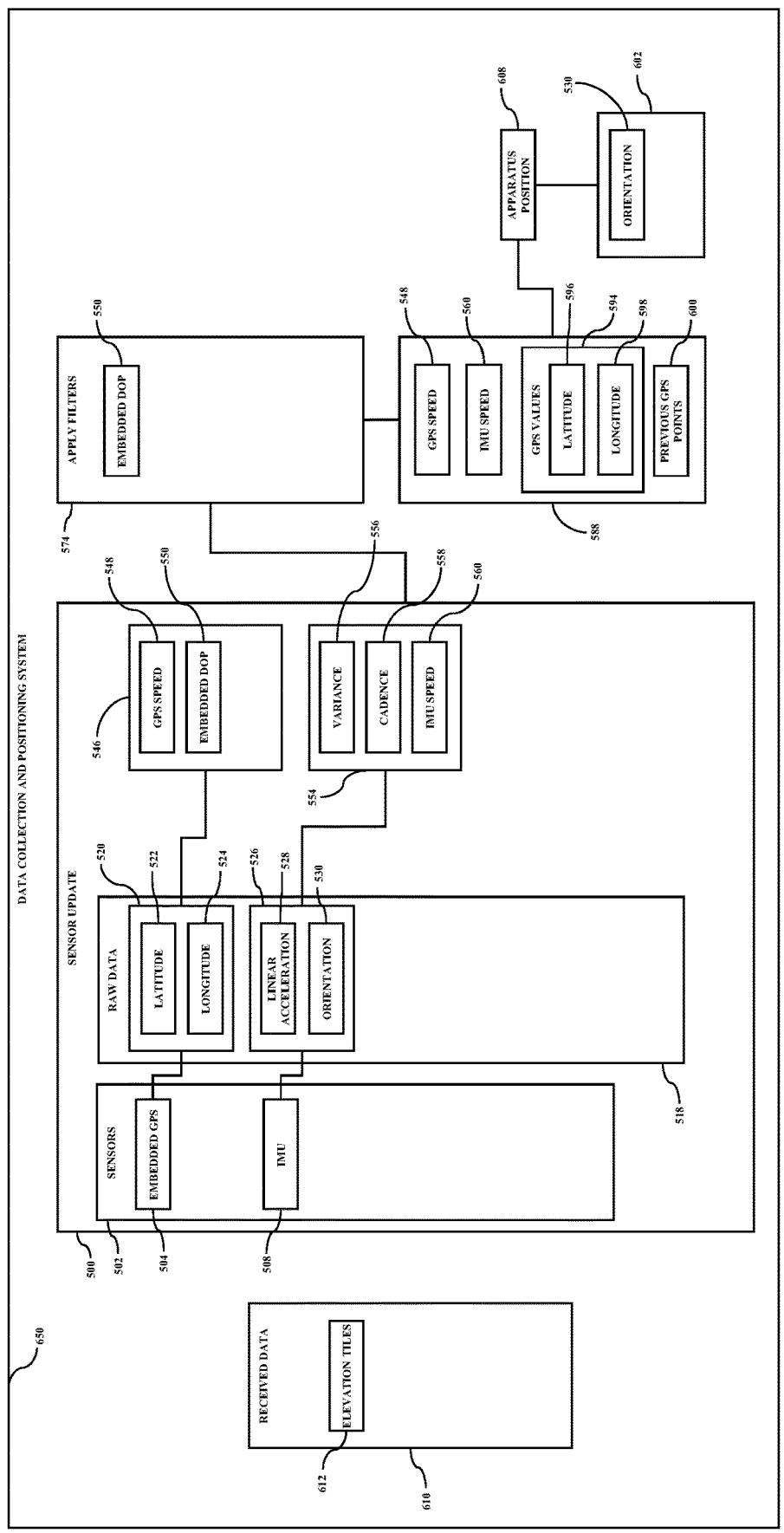
FIG. 5E is a block diagram of another example data collection and positioning system in accordance with some embodiments.
Figure 5F:
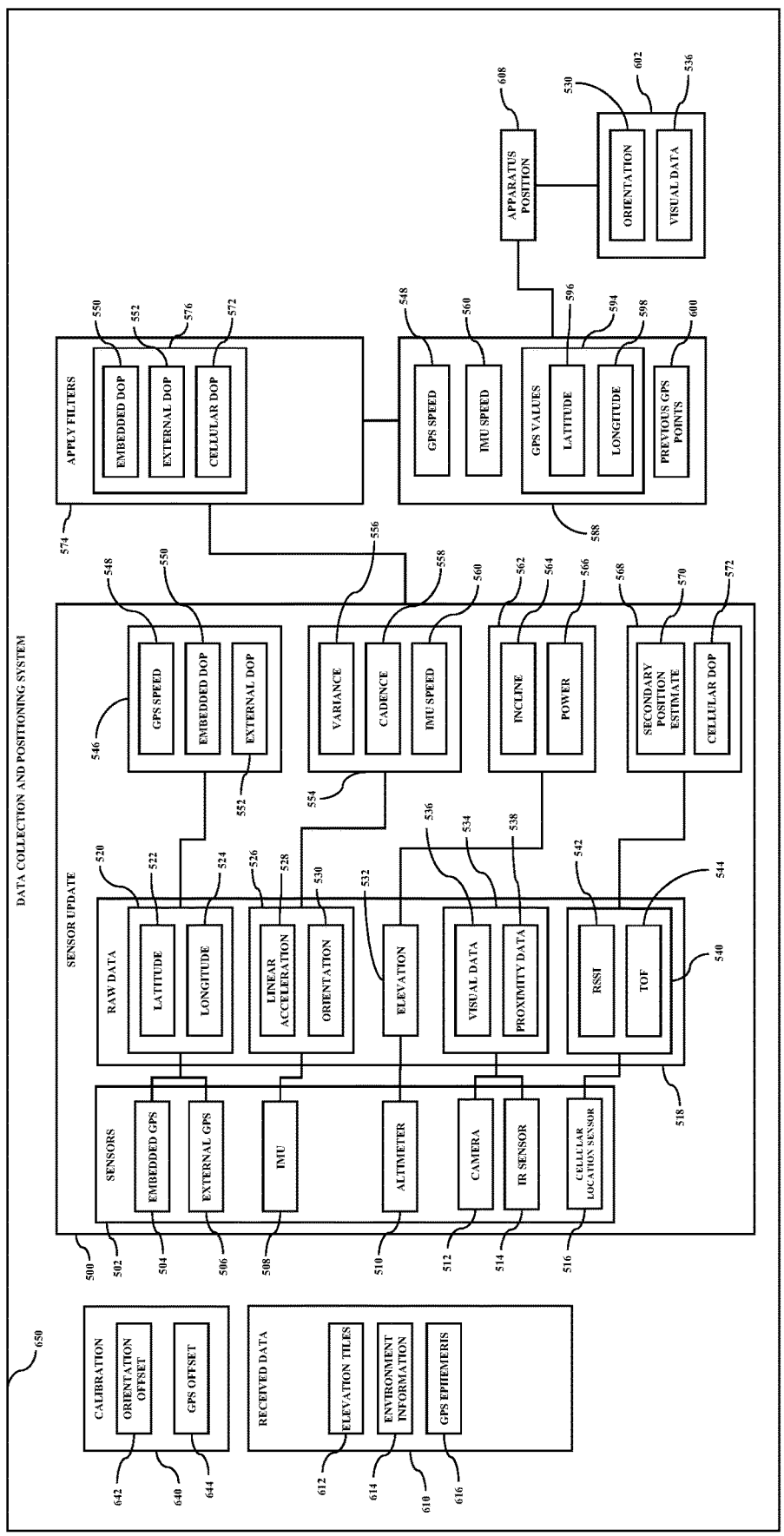
FIG. 5F is a block diagram of another example data collection and positioning system in accordance with some embodiments.
Figure 5G:
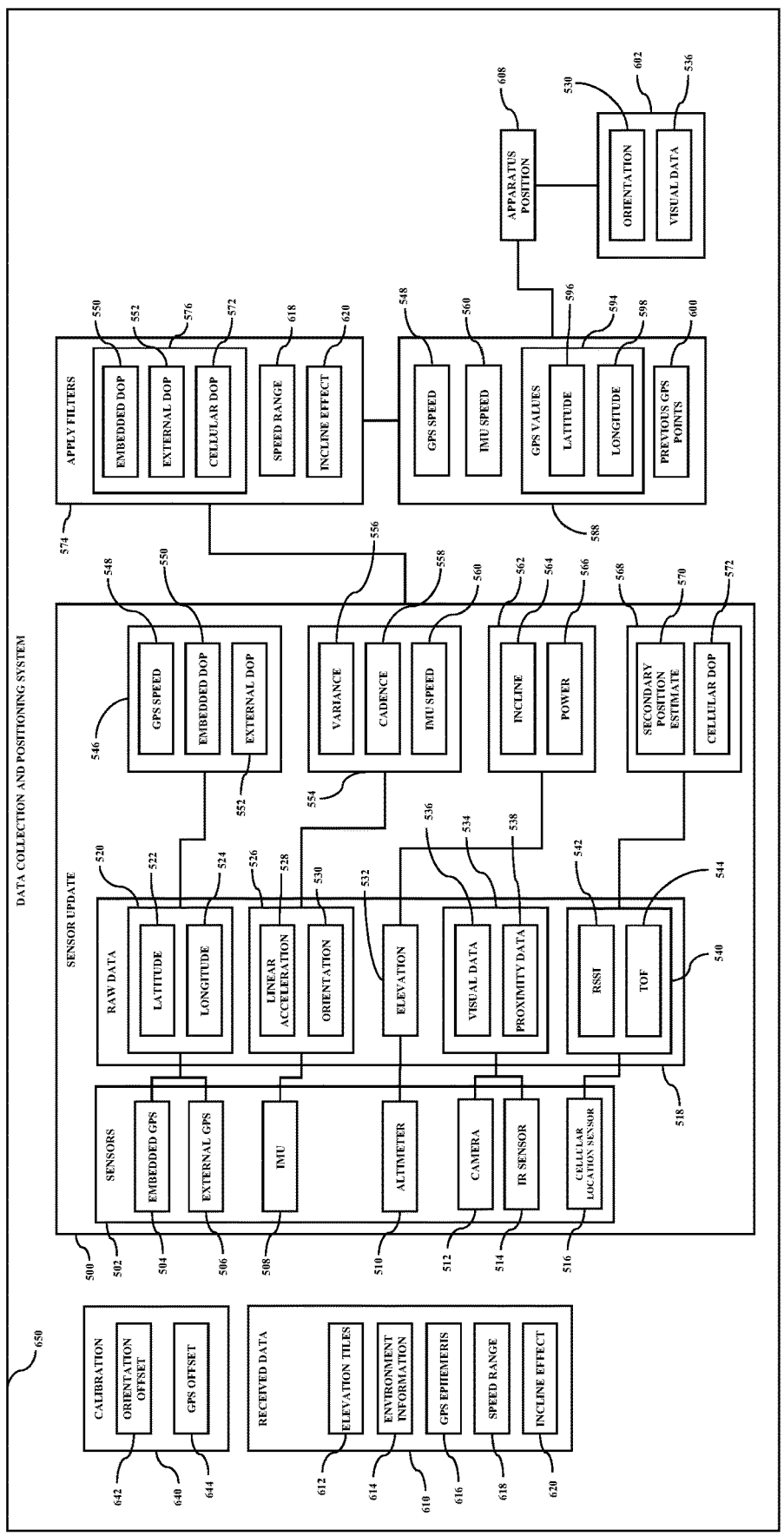
FIG. 5G is a block diagram of another example data collection and positioning system in accordance with some embodiments.

FIGS. 5D, 5E, 5F, and 5G illustrate examples of collecting data and estimating apparatus position 608 when no expected path 622 is given. FIG. 5D shows an example system with a single GPS unit (external GPS 506) and FIG. 5E shows an analogous example system with a single GPS unit (embedded GPS 504). FIG. 5F shows a more comprehensive embodiment of data collection and positioning system 650 without expected path 622 compared to FIGS. 5D and 5E, and FIG. 5G shows an embodiment that further includes speed range 618 and incline effect 620 in addition to the fields shown in FIG. 5F. In these embodiments, apparatus position 608 is not assumed to lie along a predetermined spline. In other words, there is no snap point 638. Subsequent figures outline examples of how not having an expected path 622 may affect estimations for user position and behavior of holographic objects rendered by wearable augmented reality apparatus 110.

Figure 6A:
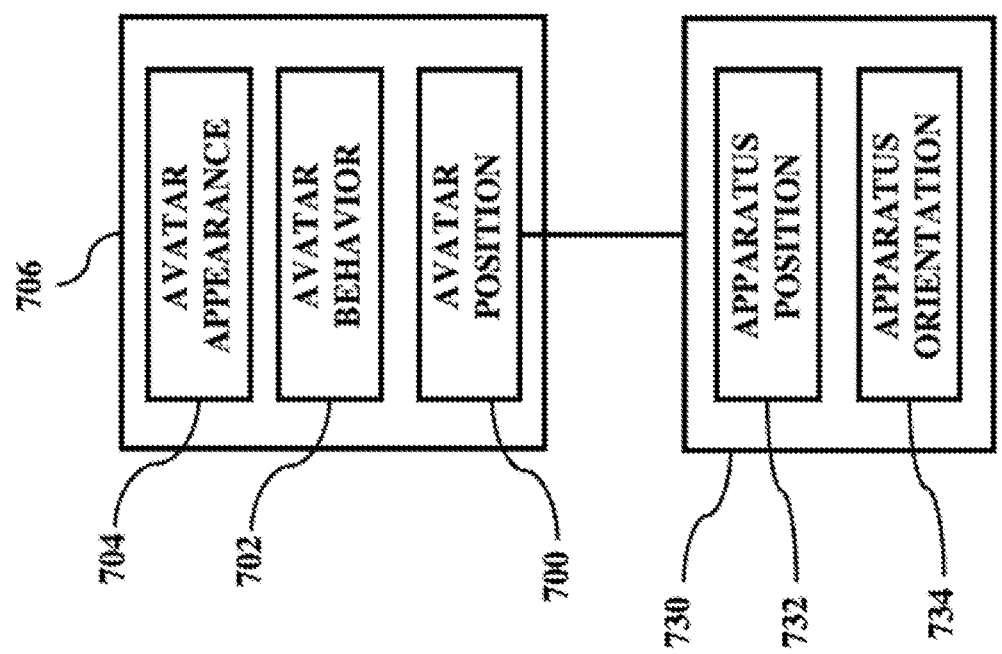
FIG. 6A is a block diagram of an example system for establishing the position of an avatar relative to an apparatus in accordance with some embodiments.

FIG. 6A is a block diagram that outlines a basic embodiment of how avatar information 706 may be determined and the inputs that go into determining the avatar information 706. Avatar information 706 may be included in data 144 and modify the placement and appearance of an avatar on display system 146 to improve consistency of the avatar with programmed/expected behavior and the avatar's visual consistency with a user's behavior and proximal environment. In accordance with some embodiments, avatar information 706 may include avatar position 700, which may include the perceived position of at least one avatar. In accordance with some embodiments, avatar position 700 may be a function of apparatus attitude 730. In accordance with some embodiments, apparatus attitude 730 may include apparatus orientation 734 (corresponding to orientation 530 in FIGS. 5A-5G) and apparatus position (corresponding to apparatus position 608 in FIGS. 5A-5G).

Figure 6B:
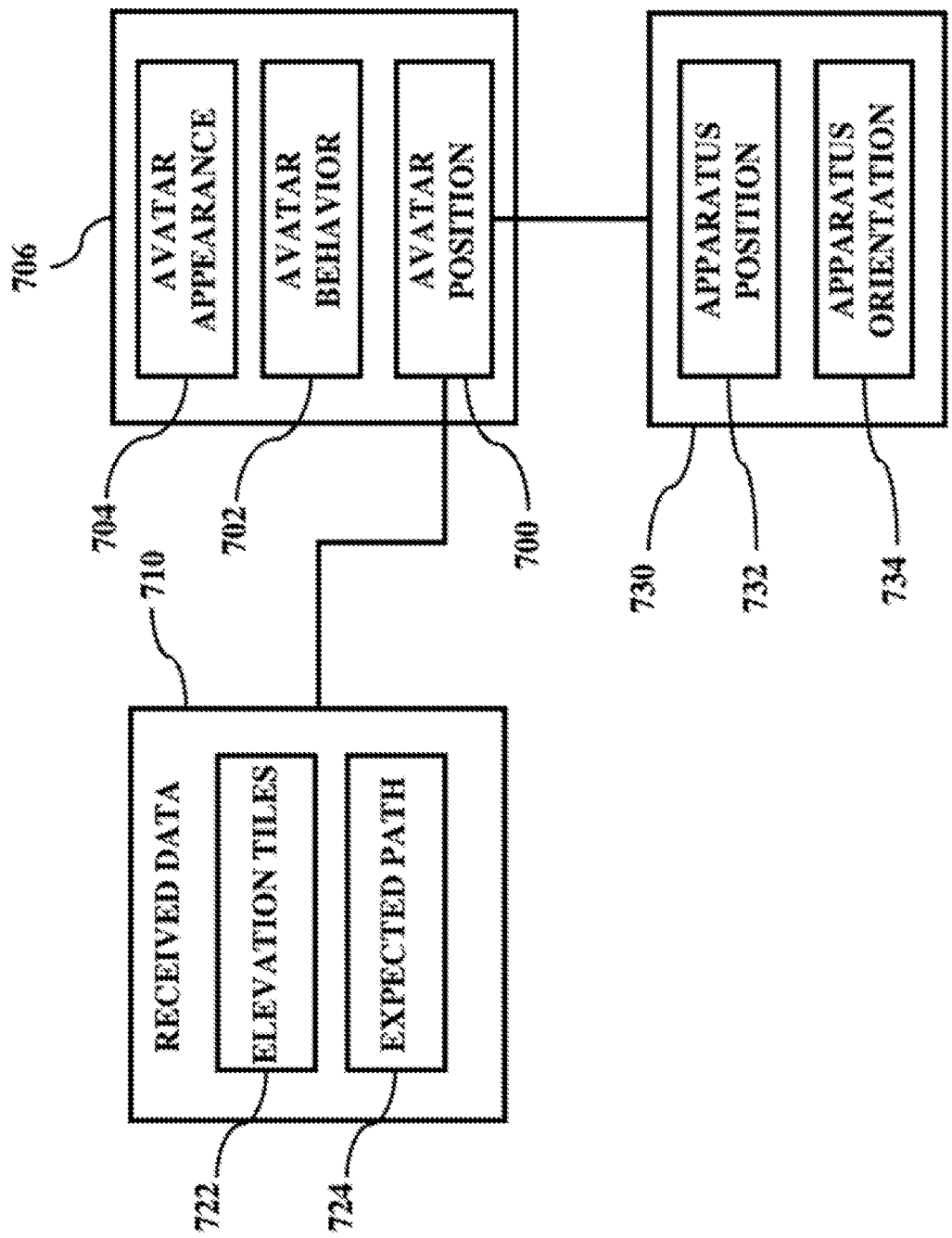
FIG. 6B is a block diagram of another example system for establishing the position of an avatar relative to an apparatus in accordance with some embodiments.

FIG. 6B is a block diagram that shows additional inputs into the determination of avatar information 706 and avatar position 700 if there is an expected path 724 for a user and an avatar. In accordance with some embodiments, avatar information 706 may be at least partially determined based on received data 710, which may include expected path 724 and elevation tiles 722.

In accordance with some embodiments, based on apparatus position 732 along expected path 724, the geographic coordinates of avatar position 700 may be calculated by taking the estimated distance between a user of wearable augmented reality apparatus 110 and the avatar and finding the point along expected path 724 that is that distance from apparatus position 732. In accordance with some embodiments, once the geographic coordinates of avatar position 700 are determined, the elevation of the avatar as well as the vertical position of the avatar relative to wearable augmented reality apparatus 110 may be determined using elevation tiles 722.

Figure 6C:
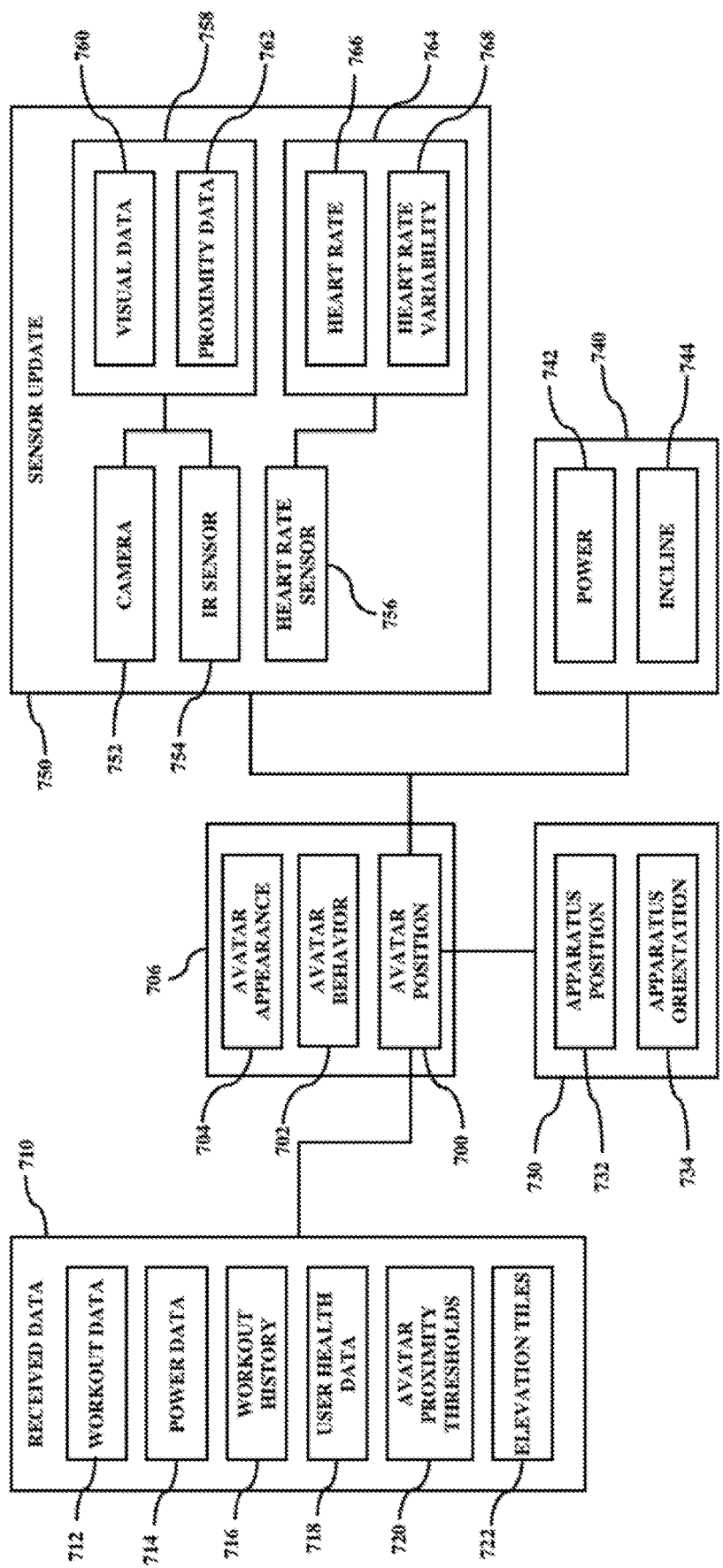
FIG. 6C is a block diagram of another example system for establishing the position of an avatar relative to an apparatus in accordance with some embodiments.
Figure 6D:
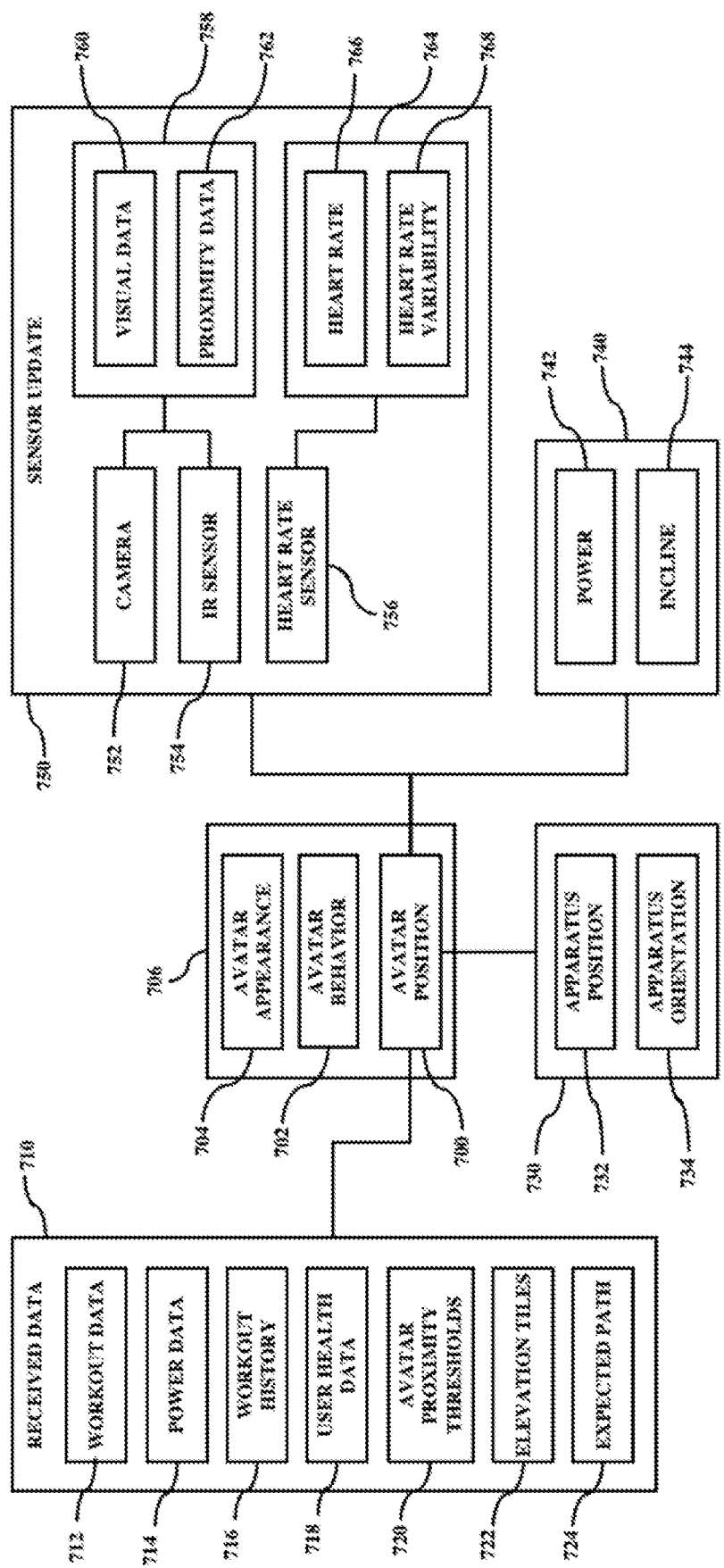
FIG. 6D is a block diagram of another example system for establishing the position of an avatar relative to an apparatus in accordance with some embodiments.

FIGS. 6C and 6D are block diagrams that show examples of inputs that may be included in determining avatar position 700 in accordance with some embodiments. FIGS. 6C and 6D may illustrate examples of how avatar information 706 might be modified without and with expected path 724 respectively. In accordance with some embodiments, avatar information 706 may be at least partially determined by received data 710. Receive data 710 may contain some or all fields depicted in FIGS. 6A-6I and/or may include fields not depicted in FIGS. 6A-6I. In accordance with some embodiments, receive data 710 may include workout data 712. Workout data 712 may include a fixed speed for the avatar in accordance with some embodiments. Workout data 712 may further include a set of speeds at which the avatar may travel for different periods during an activity, which may affect avatar behavior 702. In accordance with some embodiments, workout data 712 may include specific behavior for the avatar in line with specific types of workouts (intervals, tempo runs, etc.), which may affect avatar behavior 702 and/or avatar appearance 704.

In accordance with some embodiments, received data 710 may include power data 714. In accordance with some embodiments, the avatar may not be set to run at a set of defined speeds but rather to have a set of defined power outputs. That is to say, in accordance with some embodiments, if the user of wearable augmented reality apparatus 110 is running uphill, the corresponding incline 744 for the user of wearable augmented reality apparatus 110 may lead to a higher power 742 value than if the user was maintaining that same speed on a flat surface. In accordance with some embodiments, the perceived speed of the avatar relative to the user of the wearable augmented reality apparatus 110, may be reflective of the difference in power 742 from exertion data set 740 and the specified perceived power output of the avatar included in power data 714. This may be reflected in the rate that avatar position 700 changes, avatar behavior 702, and/or avatar appearance 706. Avatar appearance 706 may include an avatar's animation, coloration, and/or skin, which may be modified based on user performance and user performance relative to the an avatar.

In accordance with some embodiments, received data 710 may include workout history 716, which may include a record of at least some metrics from previous workouts completed with the wearable augmented reality apparatus 110 and/or by the current user of the wearable augmented reality apparatus 110. Workout history 716 may be analyzed to automatically generate information included in workout data 712 and/or power data 714 in accordance with some embodiments. In accordance with some embodiments, workout history 716 may help inform speed range 618 for a given user of wearable augmented reality apparatus 110. Workout history 716 may be used to render one or more avatars that represent previous performance (with regards to speed and/or power output) of a user on earlier workouts.

In accordance with some embodiments, received data 710 may include user health data 718. User health data 718, among other things, may include some combination of a user's age, gender, weight, height, BMI, health history, hydration, oxygenation levels, sleep patterns, temperature, historical workout type and frequency, medical conditions and history, and/or previous health metrics from prior activities and/or workouts. Notably, while wearable augmented reality apparatus 110 may be used for physical workouts and exercise/fitness purposes, some embodiments of wearable augmented reality apparatus 110 may be used for other activities, for example gaming, industrial applications, user-interactive visual simulations, etc. In accordance with some embodiments, user health data 718 may be incorporated into avatar behavior 702 of one or more avatars and how avatar information 706 changes over any given period of time. User health data 718 may affect information included in workout data 712 and/or power data 714 in accordance with some embodiments.

In accordance with some embodiments, received data 710 may include avatar proximity thresholds 720. Intuitively, even a physical running partner may not be very useful if they are significantly ahead of or behind a runner during a workout. Ideally, a training partner/avatar is consistently within a user's zone of proximal development. In accordance with some embodiments, avatar proximity thresholds 720 may include information for the maximum distances that an avatar may get either in front of or behind a user of wearable augmented reality apparatus 110 when running before they are unable to get farther from the user and/or avatar position 700 is changed such that the avatar is closer to the user. In accordance with some embodiments, the values in avatar proximity thresholds 720 may be predetermined and saved on wearable augmented reality apparatus 110. In accordance with some embodiments, a user of wearable augmented reality apparatus 110 may set the values for avatar proximity thresholds 720 prior to operation. In accordance with some embodiments, there may be no defined maximum limits in avatar proximity thresholds 720 for the distance an avatar may be in front of or behind a user or the avatar proximity thresholds 720 may not be included.

In accordance with some embodiments, information from regularly occurring sensor update 750 may be at least partially used to determine avatar position 700. In accordance with some embodiments, augmented reality system 100 may include camera 752 and/or IR sensor 754, which may provide line-of-sight data 758 (corresponding to line-of-sight data 534 in FIGS. 5C, 5F, and 5G), which may inform the distance that the avatar should be off of the ground more accurately than bilinear interpolation from data included in elevation tiles 722. Visual data 760 may be incorporated to ensure that the perceived position of the avatar does not visually clash with the immediate environment.

In accordance with some embodiments, at least one avatar rendered by wearable augmented reality apparatus 110 may change their perceived speed and avatar position 700 based at least partially on user health data 718 and periodically updated data received from heart rate sensor 756. In accordance with some embodiments, avatar behavior 702 may change in real-time such that if the user or wearable augmented reality apparatus 110 were to mimic the speed of the avatar, their heart rate 766 would stay within some defined range and/or heart rate metrics would conform to some pattern.

Heart rate sensor data 764 may include heart rate 766 of the user. In accordance with some embodiments, an avatar may speed up if heart rate falls below a certain level or vice versa. In accordance with some embodiments, the heart rate range in which an avatar will maintain its speed is at least partially determined by user health data 718. In accordance with some embodiments, based at least partially on heart rate sensor data 764, avatar behavior 702 and/or avatar appearance 704 may be modified in a predictable way. In accordance with some embodiments, heart rate variability 768 may be calculated based at least partially on tracking heart rate 766 data over a fixed period of time. In accordance with some embodiments, avatar information 706 may be at least partially modified by heart rate variability 768.

Figure 6E:
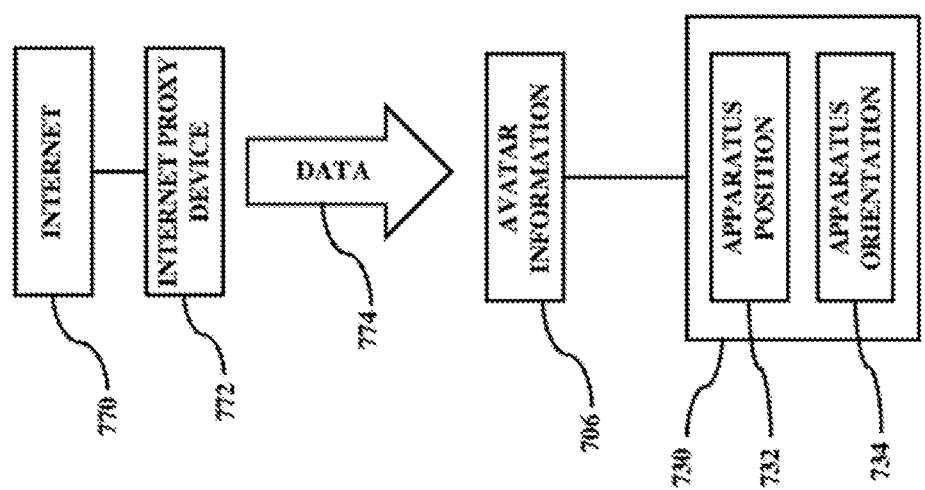
FIG. 6E is a block diagram of another example system for establishing the position of an avatar relative to an apparatus in accordance with some embodiments.

FIG. 6E is a diagram of an example embodiment of a system wherein avatar information 706 is determined at least partially from an external internet connected source. In accordance with some embodiments, the external source of information that affects avatar information 706 may be another wearable augmented reality apparatus and/or the performance of a user of that headset, which is later discussed with respect to FIGS. 8A and 8B). In accordance with other embodiments, an external internet connected source may be an individual, e.g. a virtual coach or teammate, or automated process, e.g. a regular group workout, that modifies avatar information 706 during operation of wearable augmented reality apparatus 110. In some embodiments, modification of avatar information 706 in this way may be done to modify or improve the behavior of a user of wearable augmented reality apparatus 110.

Figure 6F:
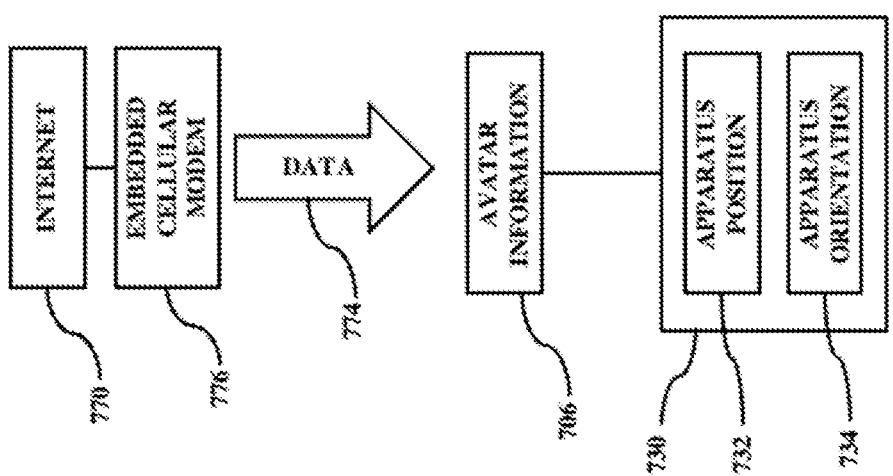
FIG. 6F is a block diagram of another example system for establishing the position of an avatar relative to an apparatus in accordance with some embodiments.

In accordance with some embodiments, data 774 from internet 770 may be received by wearable augmented reality apparatus 110 via internet proxy device 772. In accordance with other embodiments, data 774 from internet 770 may be received by wearable augmented reality apparatus 110 via internet proxy device 776 as seen in FIG. 6E and/or via embedded cellular modem 776 as seen in FIG. 6F. In accordance with some embodiments, data 774 may include information that impacts avatar position 700. In accordance with other embodiments, data 774 may include information relevant to avatar behavior 702 and avatar appearance 704, including avatar speed, power, orientation, vertical and horizontal position, animation, color, size, and which of multiple avatars may be displayed and how.

Figure 6G:
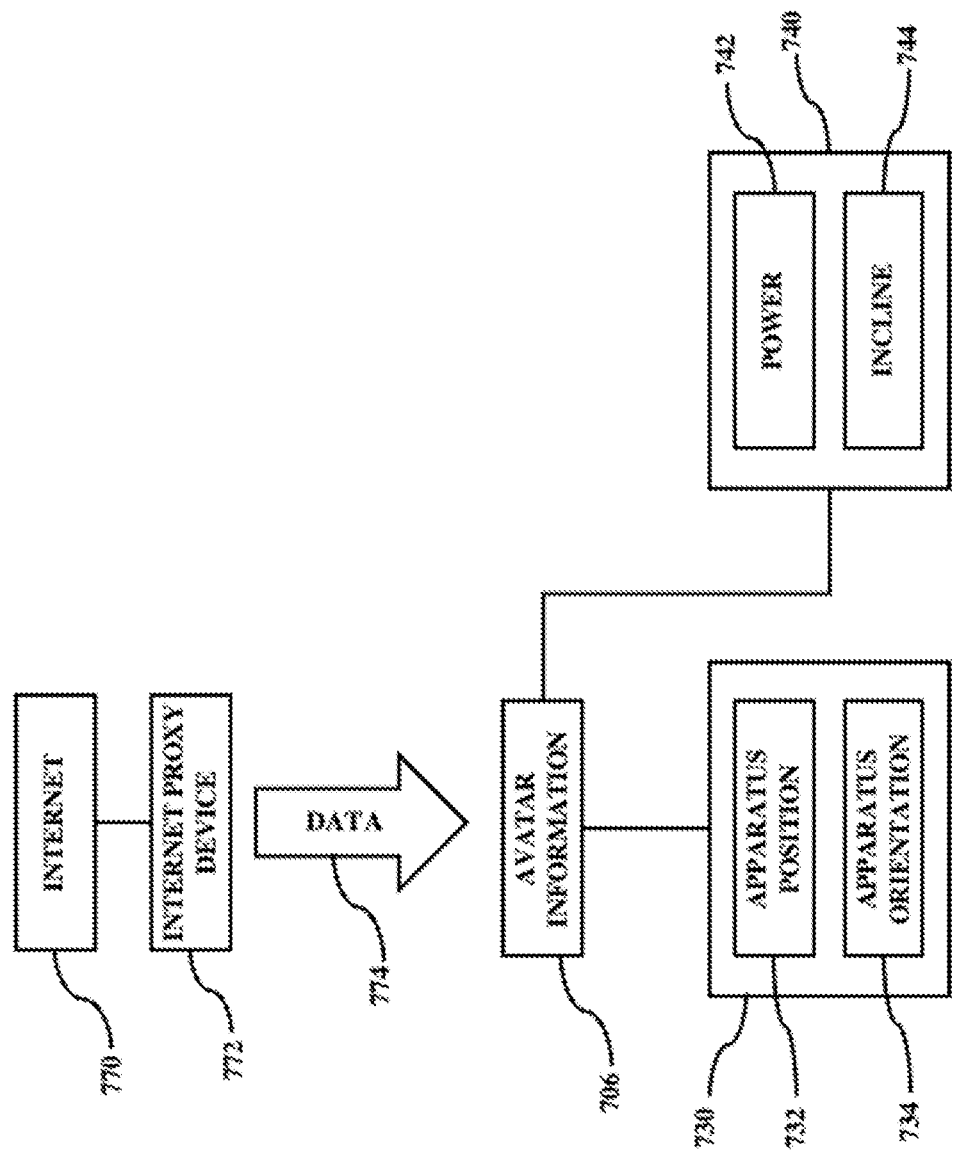
FIG. 6G is a block diagram of another example system for establishing the position of an avatar relative to an apparatus in accordance with some embodiments.
Figure 6H:
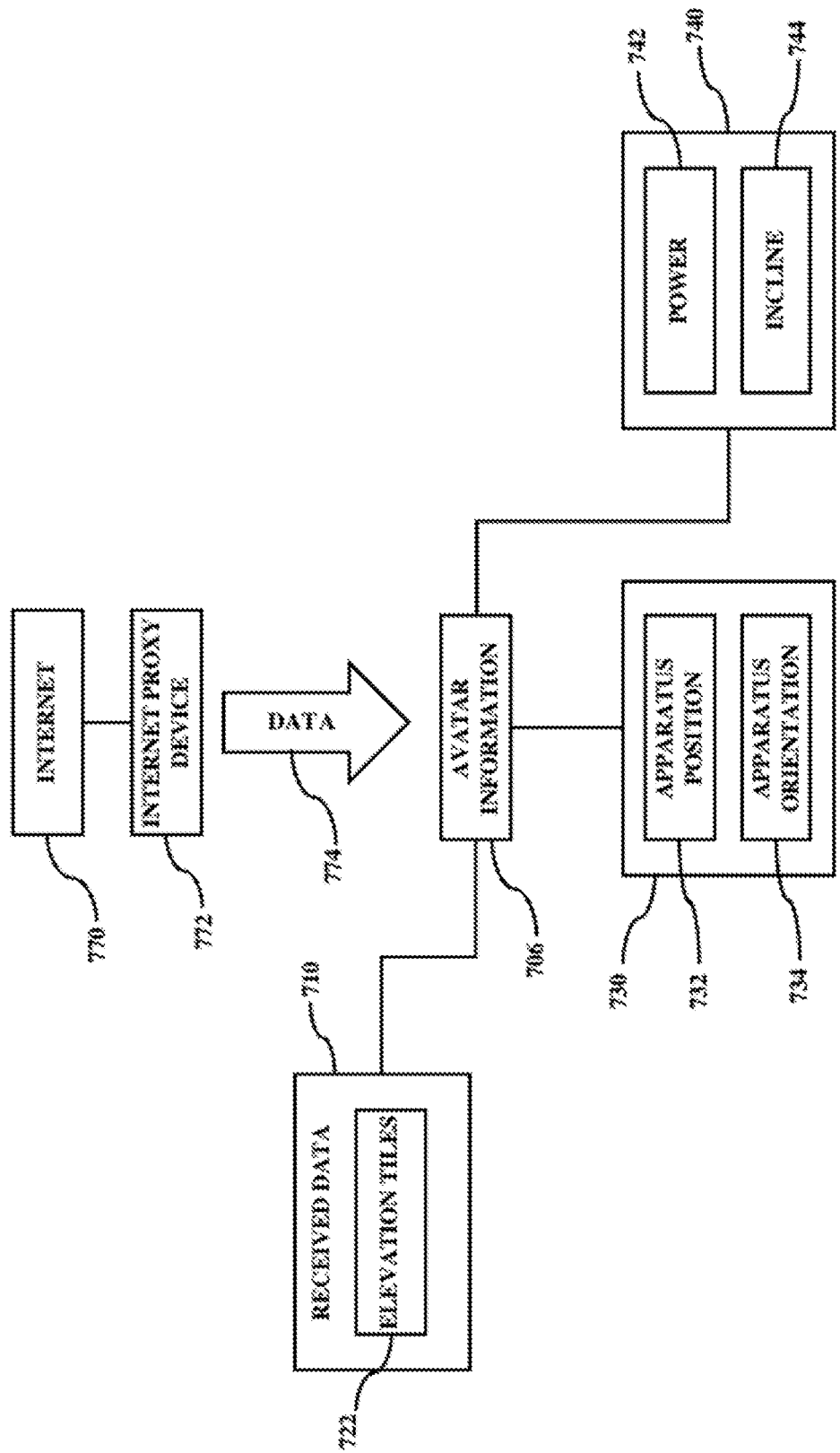
FIG. 6H is a block diagram of another example system for establishing the position of an avatar relative to an apparatus in accordance with some embodiments.
Figure 61:
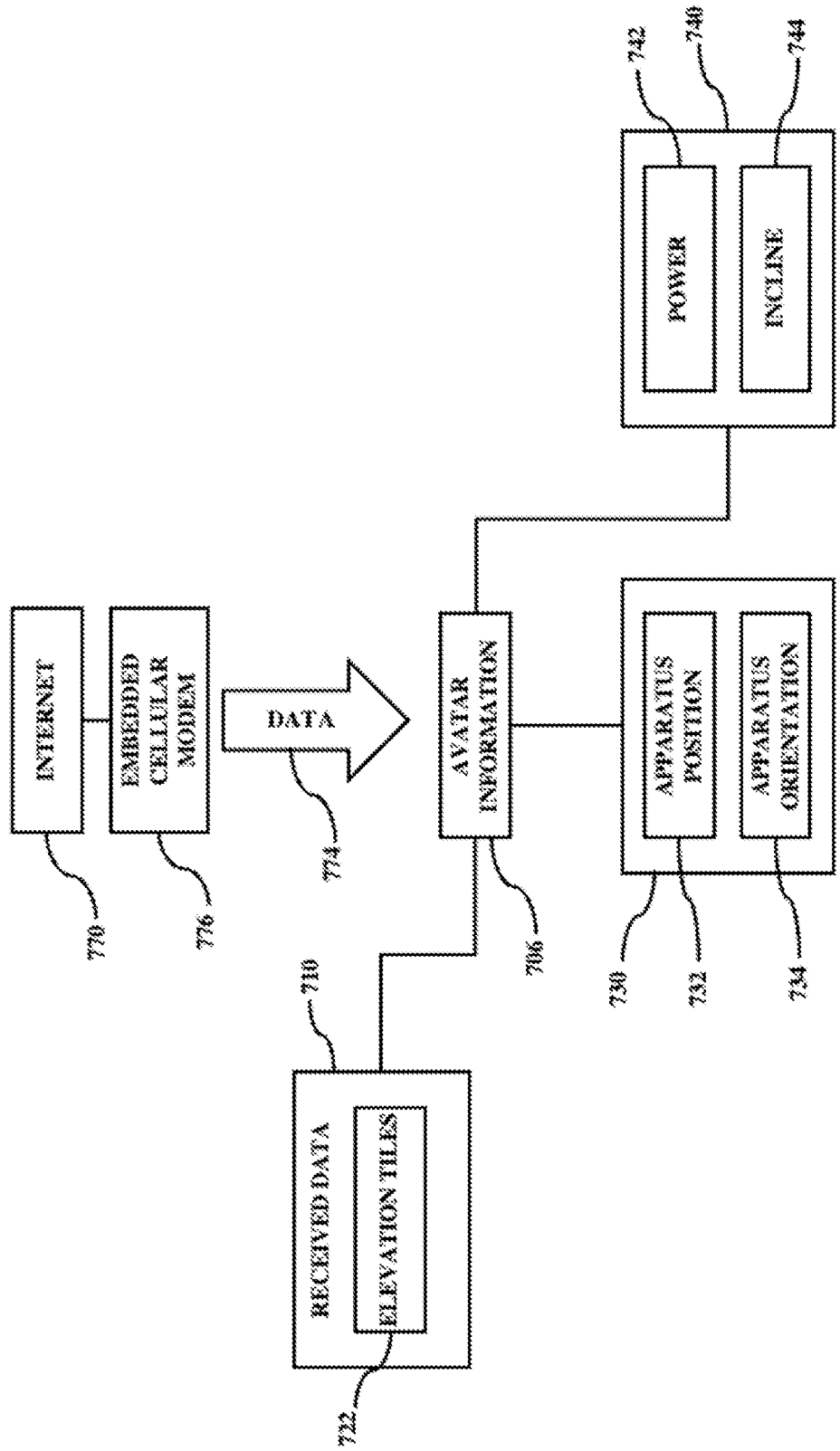

As shown in FIGS. 6G, 6H, and 6I, in accordance with various embodiments, if wearable augmented reality apparatus 110 is receiving data 774 from internet 770, other factors may affect avatar information 706. As shown in FIG. 6G, in accordance with some embodiments, this may include exertion dataset 740 and/or information in received data 710 (elevation tiles 722, etc.). As further shown in FIG. 6H, in addition to the fields shown in FIG. 6G, avatar information 706 may further be modified by receive data 710. FIG. 6I depicts an embodiment analogous to FIG. 6H where data 774 is received by wearable augmented reality apparatus 110 via embedded cellular modem 776 as opposed to internet proxy device 772. Not all components shown in FIGS. 6A-6I may be included in various embodiments of wearable augmented reality apparatus 110 that are within the scope of the disclosure. Furthermore, there may be other components not depicted in FIGS. 6A-6I that may be included in various embodiments of wearable augmented reality apparatus 110 that are within the scope of this disclosure.

FIG. 7A is a block diagram that illustrates an example of how the apparatus camera attitude 820 may be calculated. As used herein, apparatus camera attitude 820 may be used to refer to the settings and metrics by which wearable augmented reality apparatus 110 understands how the user of wearable augmented reality apparatus 110 views the world. This information may be used to define how virtual objects appear and are properly superimposed on a user's field of view.

In accordance with some embodiments, input data 800 may be processed by processor unit 142, which may determine data 810, which may impact apparatus camera attitude 820. In accordance with some embodiments, apparatus position 802 may be included in input data 800. In accordance with some embodiments, apparatus position 802 may include the geographic coordinates or relative coordinates of wearable augmented reality apparatus 110 and the user of wearable augmented reality apparatus 110. The geographic coordinates included in apparatus position 802 may be included in apparatus camera attitude 820, but the elevation value included in apparatus position 802 may be calculated for the ground the user of wearable augmented reality apparatus 110 is standing on.

In order to determine apparatus camera attitude 820, which should reflect the eye or eyes of the user of wearable augmented reality apparatus 110, user height 804 may need to be included in input data 800 in accordance with some embodiments. In accordance with some embodiments, user height 804 may include information related to the full height of the user of wearable augmented reality apparatus 110. In accordance with some embodiments, user height 804 may include an estimate as to the eye-height of the user of wearable augmented reality apparatus 110, which may be approximately equal to the height of the wearable augmented reality apparatus 110 off the ground. In accordance with some embodiments, user height 804 may be sent to wearable augmented reality apparatus 110 prior to operation as part of data 104. In accordance with some embodiments, user height 804 may be estimated by sensor input from altimeter 126, camera 128, and/or IR sensor 130. In accordance with some embodiments, a fixed value of user height 804 may be assumed and used by wearable augmented reality apparatus 110 in operation.

In accordance with some embodiments, apparatus orientation 806 may be included in input data 800. In accordance with some embodiments, apparatus orientation 806 may be the orientation included in apparatus camera attitude 820 with little to no processing.

Figure 7B:
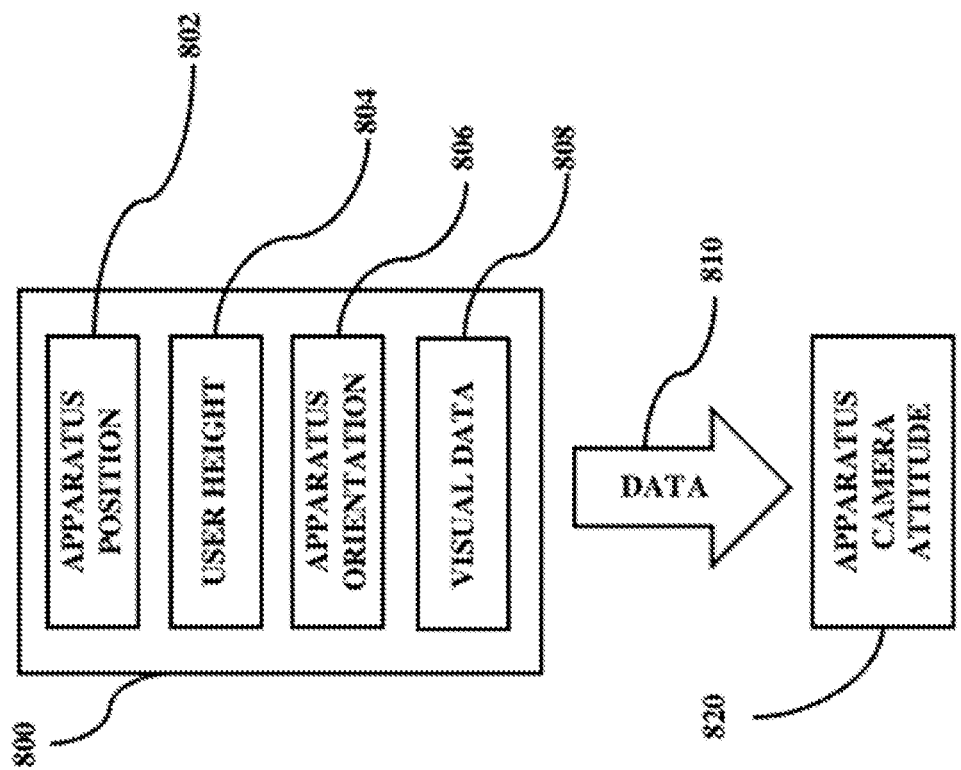
FIG. 7B is a block diagram of another example system for establishing the camera attitude settings of an apparatus in accordance with some embodiments.

As shown in FIG. 7B, in accordance with some embodiments, visual data 808 may be included in input data 800, which may refine both the presumed height and orientation of apparatus camera attitude 820. As an example, if the user of wearable augmented reality apparatus 110 bends over, the height of their eye-line and the orientation through which they see the world and any virtual objects may need to be adjusted in accordance with new visual data 808, which may reflect the change and impact data 810 such that apparatus camera attitude 820 may be made more accurate.

Figure 8A:
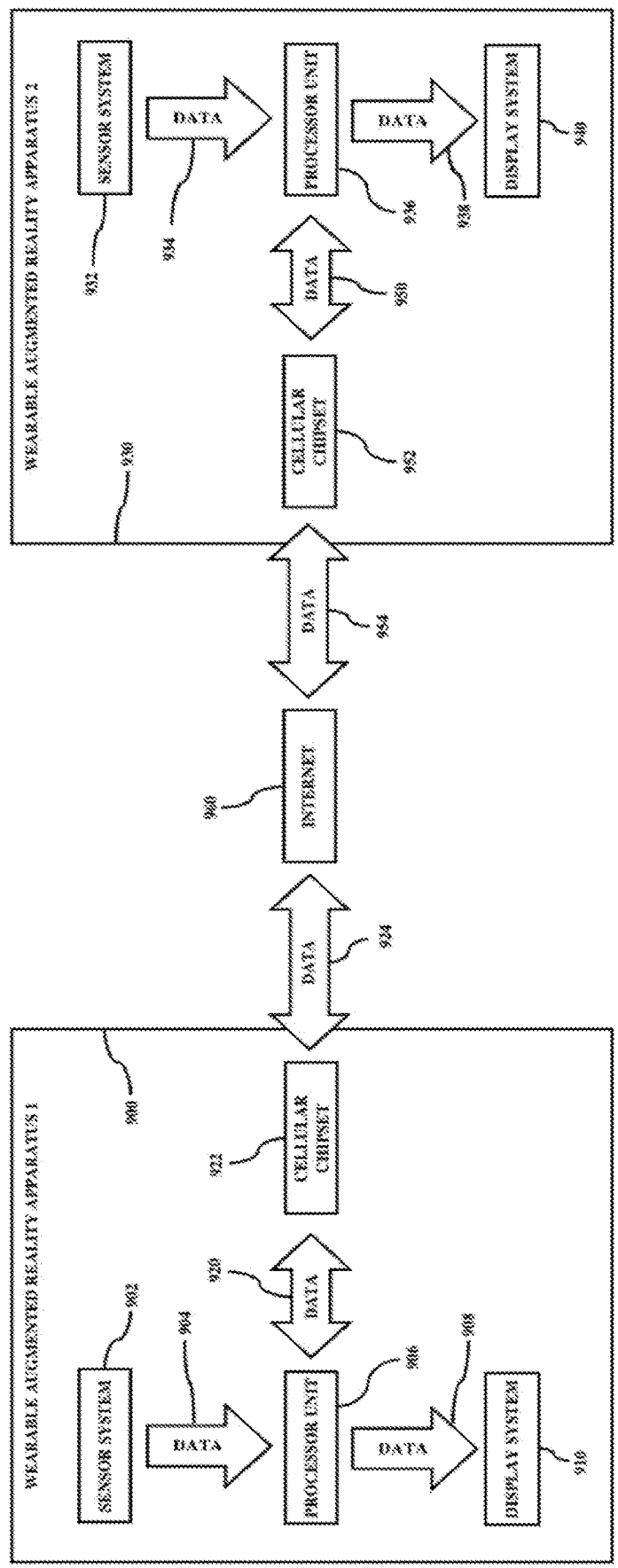
FIG. 8A is a block diagram of an example system of how multiple apparatuses may communicate through the internet in accordance with some embodiments.
Figure 8B:
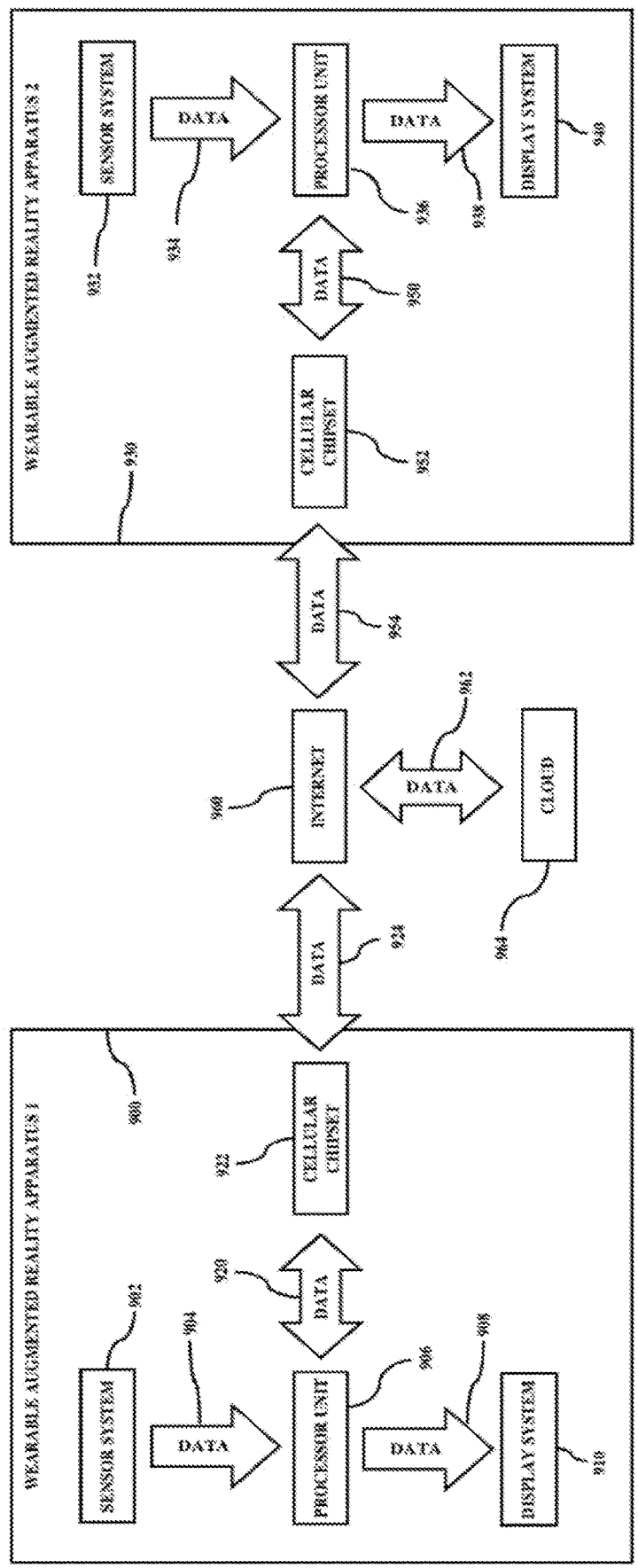
FIG. 8B is a block diagram of another example system of how multiple apparatuses may communicate through the internet in accordance with some embodiments.
Figure 8C:
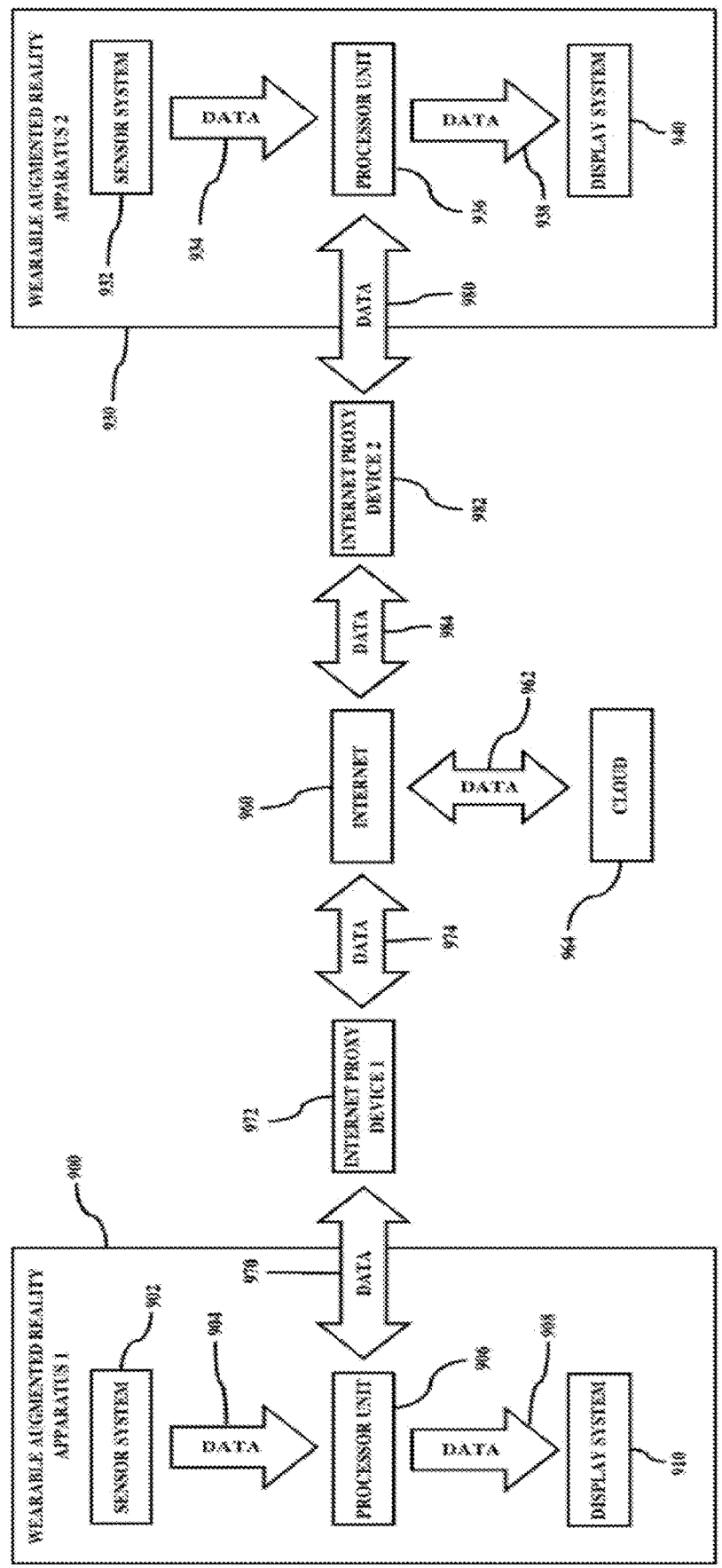
FIG. 8C is a block diagram of another example system of how multiple apparatuses may communicate through the internet in accordance with some embodiments.

As shown in FIG. 8A-8C, in accordance with some embodiments, multiple wearable augmented reality headsets, which may be embodiments of wearable augmented reality apparatus 110, may transfer data between each other during active operation. This transfer of data may be unidirectional or multidirectional. In accordance with some embodiments, at least two versions of wearable augmented reality apparatus 110, wearable augmented reality apparatus 1 900 and wearable augmented reality apparatus 2 930, may communicate in real time via internet 960 during operation and/or active workouts by users of the respective apparatuses.

In accordance with some embodiments, within wearable augmented reality apparatus 1 900, which may operate similarly to wearable augmented reality apparatus 2 930, data from sensor system 902 may transfer data 904 to processor unit 906. As used herein, sensor system 902 and sensor system 932 may include any of the sensors and fields included sensor update 500, even if not all sensors in sensor system 902 or sensor system 932 are physically embedded in wearable augmented reality apparatus 1 900 or wearable augmented reality apparatus 2 930 respectively. As shown in FIGS. 5A-5G and FIG. 6A-I, data 904 may be processed by processor unit 906 to yield an attitude for wearable augmented reality apparatus 1 900, as well as values for the speed, power exertion, and/or health data/metrics for the user of wearable augmented reality apparatus 1 900. In accordance with some embodiments, processor unit 906 may output data 908, which may be wholly or at least partially based on results from data 904. Display system 910 may display one or more virtual objects and/or metrics based at least partially on data 908.

In accordance with some embodiments, however, processor unit 906 may receive data through data stream 920 which may affect data 908, and thus what is displayed by display system 910. Processor unit 906 may also send data via data stream 920 to cellular chipset 922, which may be physically or operationally included in wearable augmented reality apparatus 1 900. In accordance with some embodiments, data sent from processor unit 906 to cellular chipset 922 may be at least partially based on data 904. In accordance with some embodiments, data sent from processor unit 906 may include the speed and/or power output for a user of wearable augmented reality apparatus 1 900. In accordance with some embodiments, data from data stream 920 sent to cellular chipset 922 might include audio or textual information customized by the user of wearable augmented reality apparatus 1 900 or by an automated program.

Cellular chipset 922, in accordance with some embodiments, may be equipped for unidirectional or bidirectional communication with internet 960. In accordance with some embodiments, cellular chipset 922 may send data to internet 960 via data stream 924. Data contained in data stream 924 sent from cellular chipset 922 to internet 960 may be at least partially based on data sent from processor unit 906.

As shown in FIG. 8B, in accordance with some embodiments, cloud 964 may be, by way of example, an application server, which may be operationally coupled to internet 960. Internet 960 may transmit data via data stream 962 (based at least partially on regularly updated data stream 924 and/or data stream 954), which may be cached and/or processed by cloud 964. Cloud 964 may also ensure that communication between wearable augmented reality apparatus 1 900 and wearable augmented reality apparatus 2 930 is properly synchronized. Cloud 964 may store and track data and output data to wearable augmented reality apparatus 1 900 and/or wearable augmented reality apparatus 2 930 via data stream 962 and internet 960.

As shown in FIG. 8C, in accordance with some embodiments, wearable augmented reality apparatus 1 900 may output and receive data from internet 960 via data stream 970 connected with internet proxy device 1 972. In accordance with some embodiments, wearable augmented reality apparatus 2 930 may output and receive data from internet 960 via data stream 980 connected with internet proxy device 2 982. In accordance with some embodiments, at least one of internet proxy device 1 972 and internet proxy device 2 982 may be a smartphone, smart watch, laptop, computer, or any other internet connected device with multiple applications. In accordance with some embodiments, wearable augmented reality apparatus 1 900 and wearable augmented reality apparatus 2 930 may transmit and/or receive data directly with one another, which may happen via a Bluetooth connection as opposed to through internet 960 in accordance with some embodiments.

FIG. 9A is a diagram that illustrates an example of how the relative positions and orientations of a user and an avatar may be automatically changed in accordance with various factors. In accordance with some embodiments, direction 1002 may be a specific fixed direction in a coordinate system defined by axes 1000. In accordance with some embodiments, axes 1000 may align with compass rose directions. In accordance with some embodiments, 1002 aligns with one of the axes in axes 1000.

When a given frame is rendered, a user of wearable augmented reality apparatus 110 may be positioned at position 1004 and an avatar may be positioned at position 1006. In accordance with some embodiments, direction 1008 is a direction a user is moving. In accordance with some other embodiments, direction 1008 is a direction a user is facing. Angle 1010 may be the angle between directions 1008 and 1002. Angle 1012 may be the angle between 1002 and the vector formed by avatar position 1006 and user position 1004.

In accordance with some embodiments, if the difference between angles 1010 and 1012 is within a predefined threshold, then a direction a user at position 1004 is facing as interpreted by processor unit 142 and data collection and positioning system 650 may be adjusted.

In FIG. 9A and FIG. 9B, angle 1010 exceeds angle 1012. In FIG. 9A, when the next frame is rendered, the new direction the user is facing may be adjusted by angle 1014 such that the angle between new direction 1016 and direction 1002 is less than angle 1010. Angle 1014 may be determined by multiplying an angular velocity value by the amount of time between frames.

FIG. 9B shows a method that may accomplish similar objectives to the one shown in FIG. 9A. As shown in FIG. 9B, when the next frame is rendered, avatar position 1006 may be adjusted to new avatar position 1020, where the distance between the avatar position and the user position remains the same, but the angle between direction 1002 and the vector formed using new avatar position 1020 and user position 1004 is increased by angle 1018. As with angle 1014, angle 1018 can be determined by multiplying an angular velocity value by the amount of time between frames.

In both FIG. 9A and FIG. 9B, the values for how much the user direction has changed and/or how much the avatar position has changed may carry over to the next frame such that any noticeable changes are smooth and consistent.

FIG. 10 shows an example of how the relative positions of a user and an avatar may be automatically changed when certain conditions are met and there is no predefined path for the user or avatar. The methods in FIG. 9A and FIG. 9B may contribute to creating a smooth experience when a user is on a curve and other times a user's heading/motion of direction may only be changing gradually. However, if a user of wearable augmented reality apparatus 110 makes a meaningfully sharp turn, it may be useful to have a way to also have the avatar abruptly change its position to adjust to that.

In the example shown in FIG. 10, a user of wearable augmented reality apparatus 110 may be at position 1100 and an avatar may be at position 1108. So long as the direction the user is facing (or, in accordance with some embodiments, the direction the user is moving) is within the angular range created by angles 1102 and 1104, it may be understood that no sharp turns have been made.

But, as shown in this example, if direction 1106, which can represent the direction the user is facing (or, in accordance with some embodiments, the direction the user is moving), is outside of the angular range created by angles 1102 and 1104 for more than a predefined amount of time, it may be inferred that a turn has been made. Under this condition, then the avatar position may be changed to position 1110, which is the same distance from user position 1100 as position 1108, but is in line with direction 1106.

Figure 11:
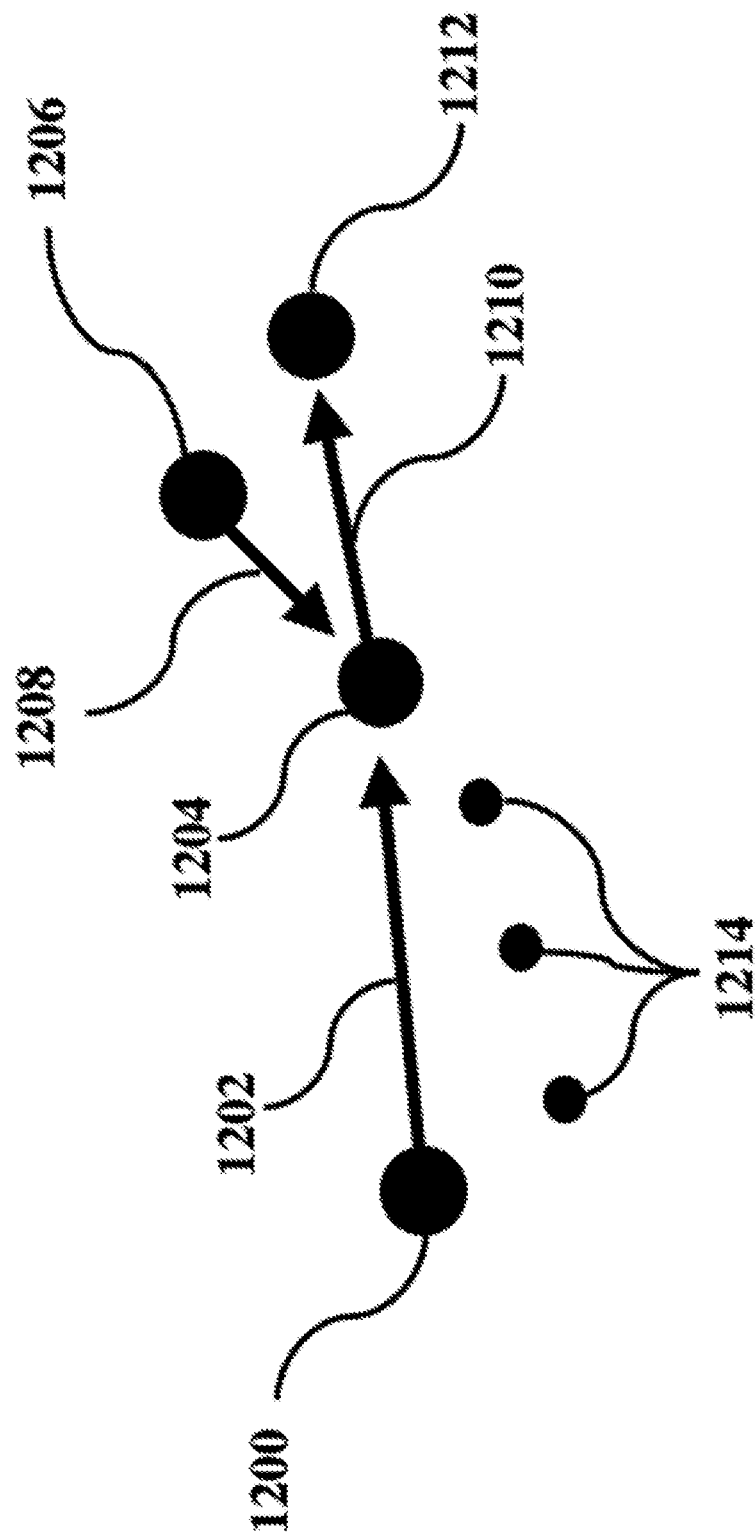
FIG. 11 is a diagram that illustrates an example of how the position of an apparatus in space may be estimated based at least partially on previous positional data in accordance with some embodiments.

FIG. 11 shows an example of how apparatus position may be calculated based at least partially on previous GPS readings so as to create a smoother user experience. In accordance with some embodiments, the example of positioning shown in FIG. 11 may represent a position estimate method for wearable augmented reality apparatus 110 if there is no expected path that the user and/or avatar are supposed to follow.

In accordance with some embodiments, point 1200 may represent a raw GPS point. Points 1214 may represent estimated apparatus positions between when subsequent GPS readings for raw GPS point 1200 and raw GPS point 1206 were received (which, in accordance with some embodiments, may be approximately one second apart). In this example, let point 1204 be the last estimated position of the apparatus before raw GPS point 1206 is received. Let vector 1202 be the vector from point 1200 to point 1204 and let vector 1208 be the vector from point 1206 to point 1204. Let point 1212 be the estimated position of the apparatus at some arbitrary time after the GPS reading for point 1206 was received and before the next GPS reading is received. Let vector 1210 be the vector from point 1204 to point 1212.

In accordance with some embodiments, to create a smooth and accurate positional experience for a user and an avatar, vector 1210 may be equivalent to the unit vector of vector 1202 multiplied by the estimated speed of the apparatus when the GPS reading for point 1206 is received (which may be referred to as speed 1206) minus vector 1208, all multiplied by the time since the GPS reading point 1206 was received (which may be referred to as time 1212).

Formulaically, this is equivalent to saying:

Vector 1210=(Time 1212)*(((Vector 1202)/(||Vector 1202||))*(Speed 1206)−(Vector 1208))

And that Point 1212=(Point 1204)+(Vector 1210)

In accordance with some embodiments, speed 1206 may be a raw speed received by a GPS unit. In accordance with some embodiments, speed 1206 may be altered at least in part by an embodiment of data collection and positioning system 650 described in FIGS. 5A-5G.

Figure 12:
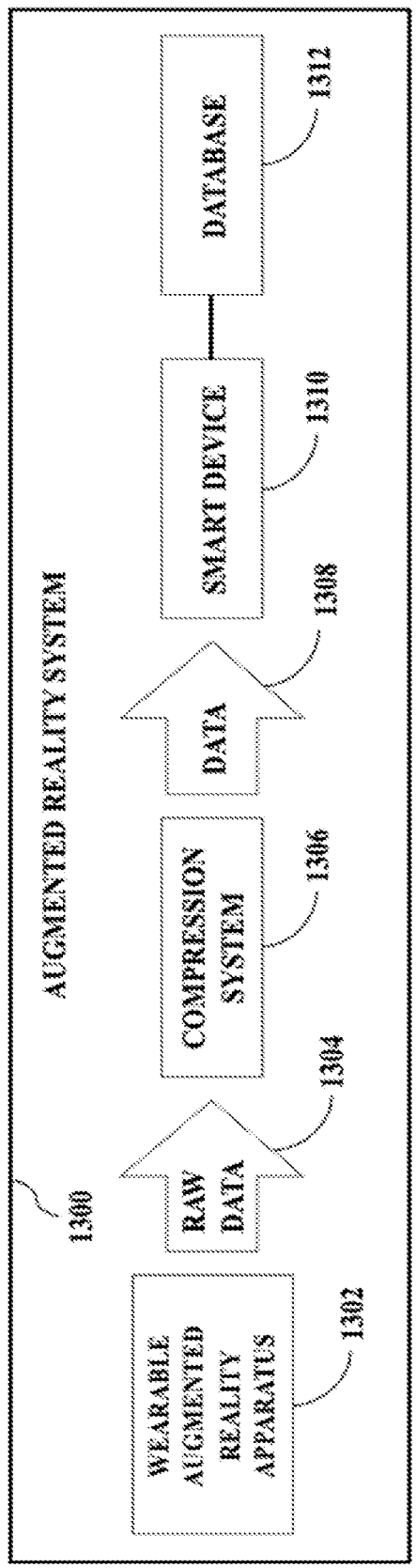
FIG. 12 is a block diagram of an example system of data transfers in an augmented reality system in accordance with some embodiments.

FIG. 12 shows a block diagram for data transfers within augmented reality system 1300. In accordance with some embodiments, either during or after operation, wearable augmented reality apparatus 1302 may output raw data 1304, which may include information about wearable augmented reality apparatus 1302 and/or the activity of the user of wearable augmented reality apparatus 1302. In accordance with some embodiments, raw data 1304 may include the path that the user of wearable augmented reality apparatus 1302 travelled and/or the performance of the user during a workout with respect to time and/or distance.

Raw data 1304 may contain too much information to be quickly transferred or stored, so, in accordance with some embodiments, raw data 1304 may be compressed by compression system 1306. Compression system 1306 may be software and/or a set of algorithms that operate on processor unit 142 in wearable augmented reality apparatus 1302, or may be hardware or a combination of software and hardware that operate on a device external to wearable augmented reality apparatus 1302. In accordance with some embodiments, compression system 1306 may output data 1308, which may be a compressed version of raw data 1304. In accordance with some embodiments, data 1308 may be transmitted to smart device 1310 wirelessly. In accordance with some embodiments, data 1308 may be transmitted to smart device 1310 via a Bluetooth connection. In accordance with some embodiments, data 1308 may be transmitted to smart device 1310 through a wired connection.

In accordance with some embodiments, smart device 1310 may be operationally connected to database 1312. In accordance with some embodiments, data may be stored in database 1312 that is at least partially based on data 1308. In accordance with some embodiments, database 1312 may be local storage on smart device 1310. In accordance with some embodiments, smart device 1310 may be connected to the internet, and database 1312 may represent some form of online storage. In accordance with some embodiments, data 1310 may be decompressed on smart device 1310 or at some other point before data is saved in database 1312.

Figure 13A:
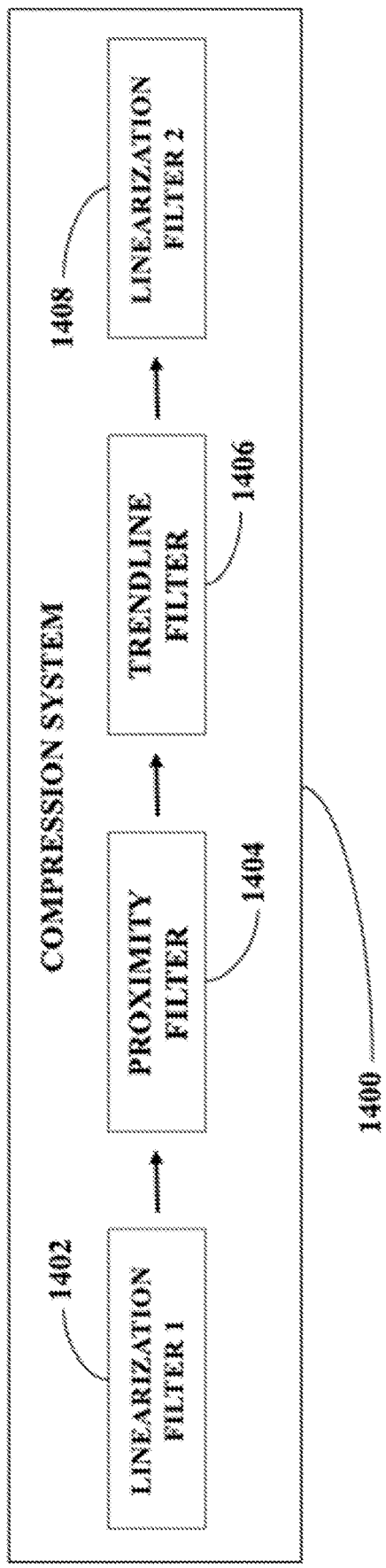
FIG. 13A is a block diagram of an example data compression system in accordance with some embodiments.

FIG. 13A shows a block diagram of example compression system 1400, which may be an example of compression system 1306 depicted in FIG. 12, that may, in accordance with some embodiments, compress a sequence of GPS points that compose a path travelled by wearable augmented reality apparatus 1302. In accordance with some embodiments, a sequence of GPS points may pass through a set of filters in compression system 1400. In accordance with some embodiments, some or all of a sequence of GPS points may pass through some or all of the filters shown in FIG. 13A. In some embodiments, some or all of the sequence of GPS points may pass through filters in the order shown or in a different order.

Figure 13B:
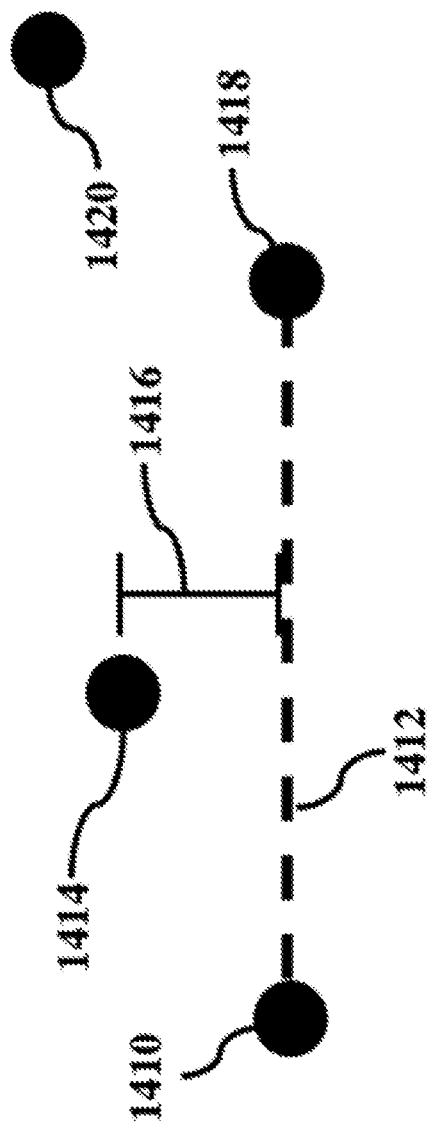
FIG. 13B is a diagram that illustrates an example of a test of a relationship between multiple points in space in accordance with some embodiments.

FIG. 13B shows an example of a linear threshold test that may be employed in linearization filter 1 1402 and/or linearization filter 2 1408. In the example shown, let points 1410, 1414, 1418, and 1420 be a sequence of ordered GPS points. Let line 1412 be the line between point 1410 and point 1418, and let distance 1416 be the distance between point 1414 and line 1412. As shown in FIG. 13E and FIG. 13F, respectively, linearization threshold tests 1450 and 1470 return true for the example shown in FIG. 13B if and only if distance 1416 is more than a predefined threshold. That is to say, for an iteration through a given sequence of points, a linear threshold test will return false for a given point if it is less than a predefined distance between the line connecting the two adjacent points in the sequence (i.e. could effectively be removed from the sequence if a line was drawn between adjacent points to re-create the overall path).

Figure 13C:
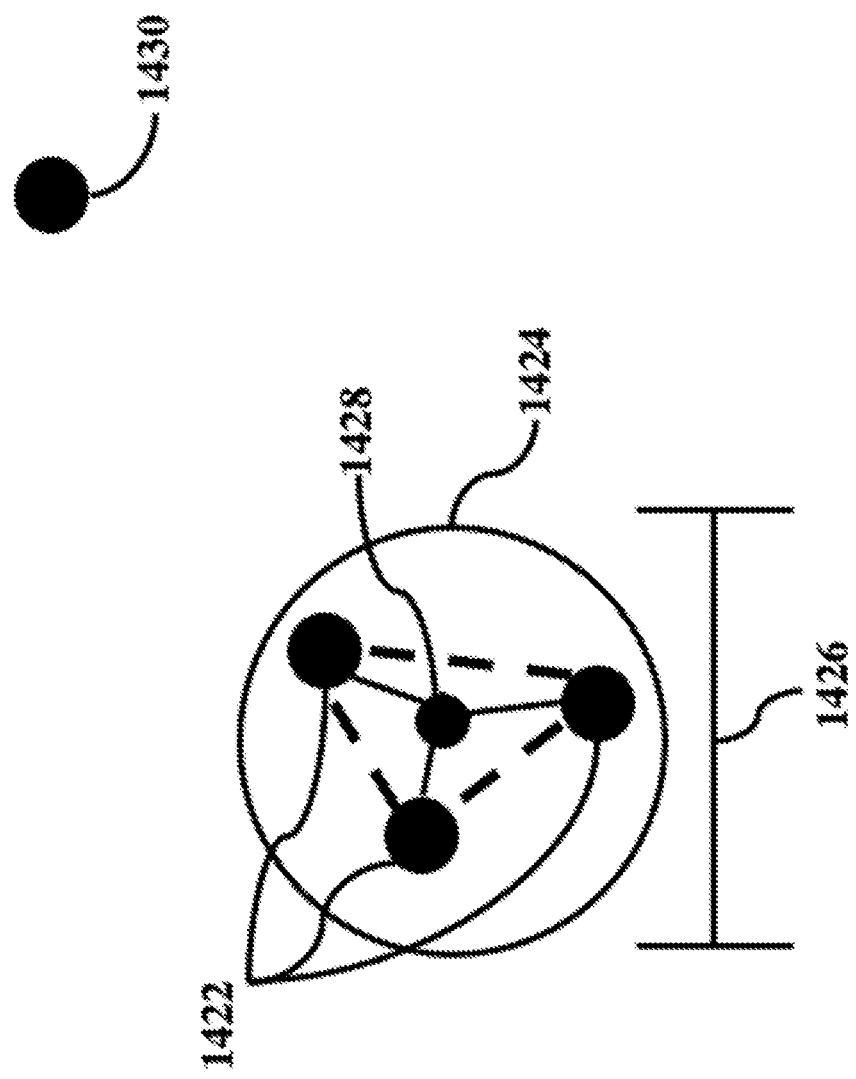
FIG. 13C is a diagram that illustrates an example of another test of a relationship between multiple points in space in accordance with some embodiments.
Figure 13E:
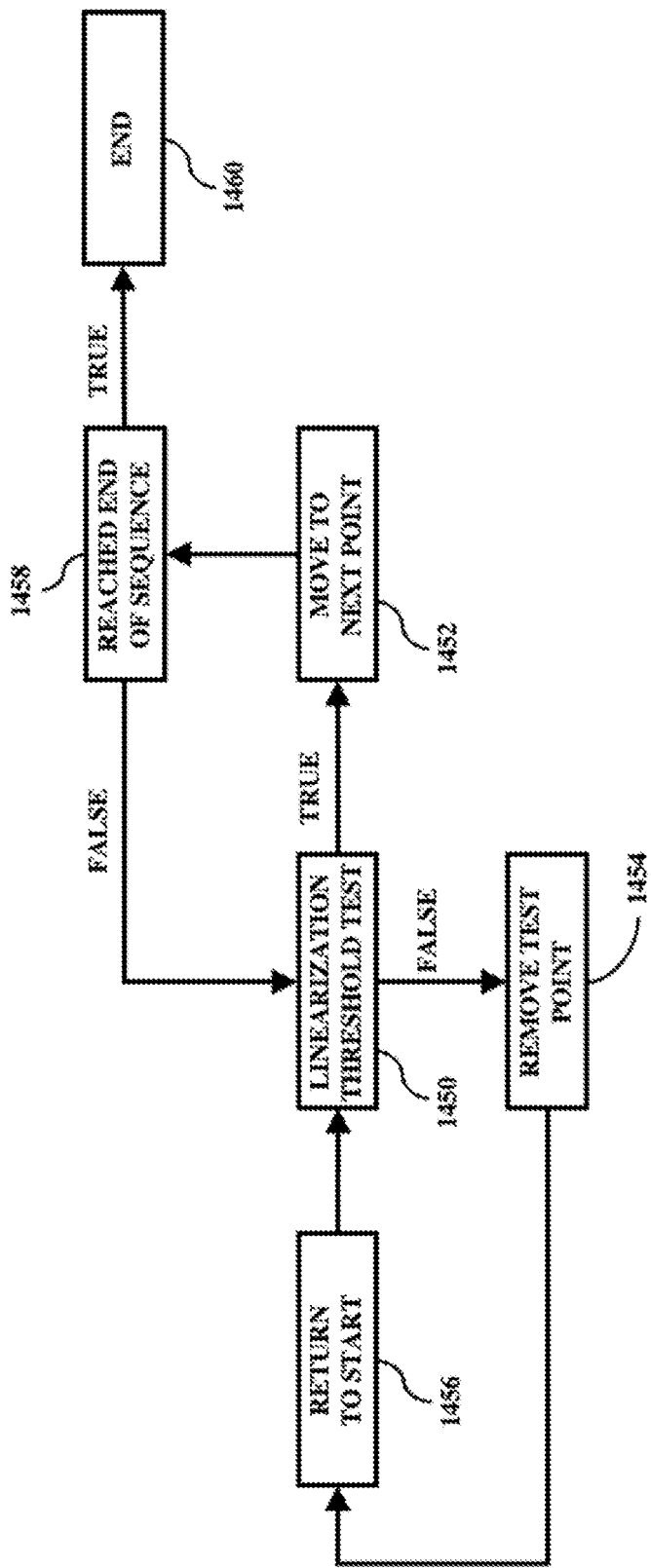
FIG. 13E is a flow chart diagram that illustrates an example of a compression method in accordance with some embodiments.
Figure 13F:
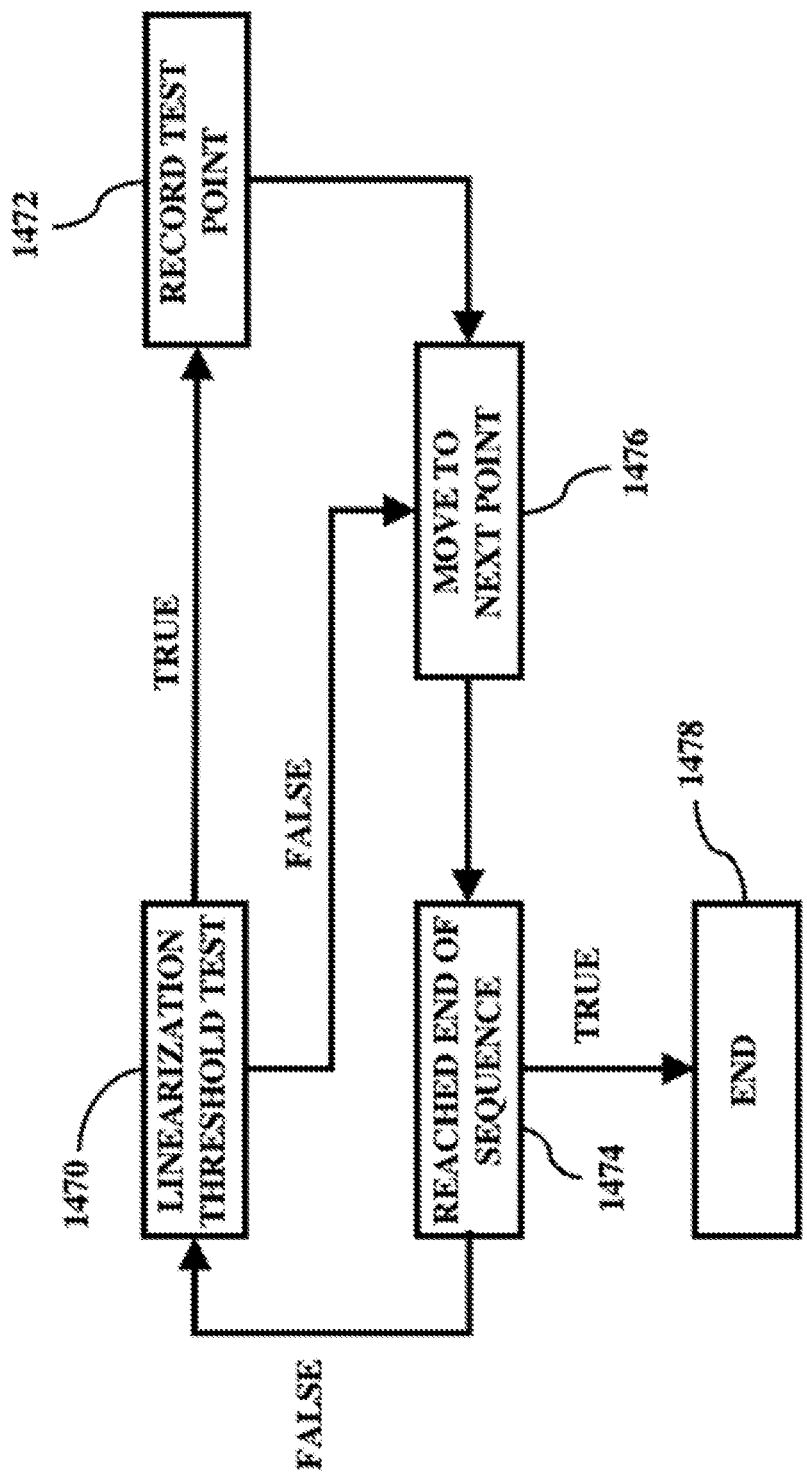
FIG. 13F is a flow chart diagram that illustrates another example of a compression method in accordance with some embodiments.

FIG. 13C shows an example of a method that may be employed in proximity filter 1404 in accordance with some embodiments. As shown in the example, points 1422 may be adjacent points in a sequence of GPS points that may all fit within circle 1424, which has diameter 1426. As shown in the example, point 1430 may be a point that may not be able to be inscribed in circle 1424 or any other circle with diameter 1426 that also includes points 1422. In accordance with some embodiments, proximity filter 1404 may identify clusters of points like points 1422 in a sequence of GPS points and replace those points in the compressed sequence with point 1428, which in accordance with some embodiments, may be the arithmetic mean position of at least some of the points in points 1422.

FIG. 13D shows an example of a method that may be employed in trendline filter 1406. As shown in the example, let points 1434, 1438, 1440, 1442, and 1446 all be points in a GPS sequence and let trendline 1432 be the trendline from points 1434, 1438, 1440, and 1442. In accordance with some embodiments, if all points 1434, 1438, 1440, and 1442 are less than a predefined distance from trendline 1432, then all those points may be replaced by the outermost points projected onto trendline 1432, which may include point 1436 (the projection of point 1434 onto trendline 1432) and point 1444 (the projection of point 1442 onto trendline 1432).

In accordance with some embodiments, if it is established that all points that trendline 1432 was derived from are less than a predefined distance threshold from trendline 1432, the set of points examined may expand to adjacent points (such as point 1446), where a new trendline 1448 may be constructed taking point 1446 into account, and the test to see if all points 1434, 1438, 1440, 1442, and 1446 are all within a predefined distance of trendline 1448 may be repeated. If all points are within the maximum distance from trendline 1448, the projection of the outermost points (points 1446 and 1434) onto trendline 1448 may replace the full sequence of points that resulted in trendline 1448. In accordance with some embodiments, this process of expansion into adjacent points to form new trendlines may be repeated until there is at least one point that is used to define a trendline that is above the predefined distance from that trendline.

FIG. 13E is a flow diagram that illustrates an example of the logic that may be implemented in linearization filter 2 1408. In accordance with some embodiments, linearization threshold test 1450 may represent the test outlined in FIG. 13B, which returns true if and only if distance 1416 is more than a predefined threshold. For the purposes of this example, FIG. 13E may represent a step in linearization filter 2 1408 from FIG. 13A that is applied to the points in FIG. 13B. As shown in FIG. 13E, if the test 1450 returns true for point 1414, meaning it may not reasonably be approximated as a point on line segment 1412, then step 1452 (move to next point) may take place, and point 1418 and its distance from the line between 1414 and point 1420 may be evaluated by linear threshold test 1450 to see if point 1418 may be reasonably approximated as a point on line segment between the adjacent points in the sequence. However, if reached end of sequence test 1458 returns true, indicating that there are no further GPS points in the sequence to be tested, then end step 1460 may be reached. If linearization threshold test 1450 returns false for point 1414, then step 1454 (remove test point) may be taken, and point 1414 may be removed from the sequence, and the filter process may return to the start of the sequence (step 1456) and repeat the logical flow on a sequence of points that may not include point 1414. Thus, when point 1418 is reached, linear threshold test 1450 may evaluate whether point 1418 may be reasonably approximated as a point on the line segment connecting the new adjacent points in the sequence, which would be 1410 and 1420 if point 1414 was removed. This logical flow may continue until end step 1460 is reached.

FIG. 13F is a flow diagram that illustrates an example of the logic that may be implemented in linearization filter 1 1402. In accordance with some embodiments, linearization threshold test 1470 may represent the test outlined in FIG. 13B, which returns true if and only if distance 1416 is more than a predefined threshold. For the purposes of this example, FIG. 13F may represent a step in linearization filter 1 1402 from FIG. 13A that is applied to the points in FIG. 13B. As shown in FIG. 13F, if the test 1470 returns false for point 1414, meaning it may reasonably be approximated as a point on line segment 1412 then step 1476 (move to next point) may take place, and point 1418 and its distance from the line between 1414 and point 1420 may be evaluated by linear threshold test 1470. However, if reached end of sequence test 1474 returns true, indicating that there are no further GPS points in the sequence to be tested, then end step 1478 may be reached.

In accordance with some embodiments, if linearization threshold test 1470 returns true for point 1414, which would indicate that distance 1416 is more than the predefined threshold and point 1414 may not reasonably be approximated as a point on line segment 1412, then step 1472 may be taken, where point 1414 is recorded. When end step 1478 is reached, the final set of recorded points may represent the new GPS sequence passed to the subsequent filter or sent out as the final output of compression system 1400. All test points that are not recorded may be removed from the sequence without significantly affecting the overall path created by connecting points in the sequence. The recorded points are the points in the sequence that deviated significantly from the line segment connecting adjacent points.

Figure 14A:
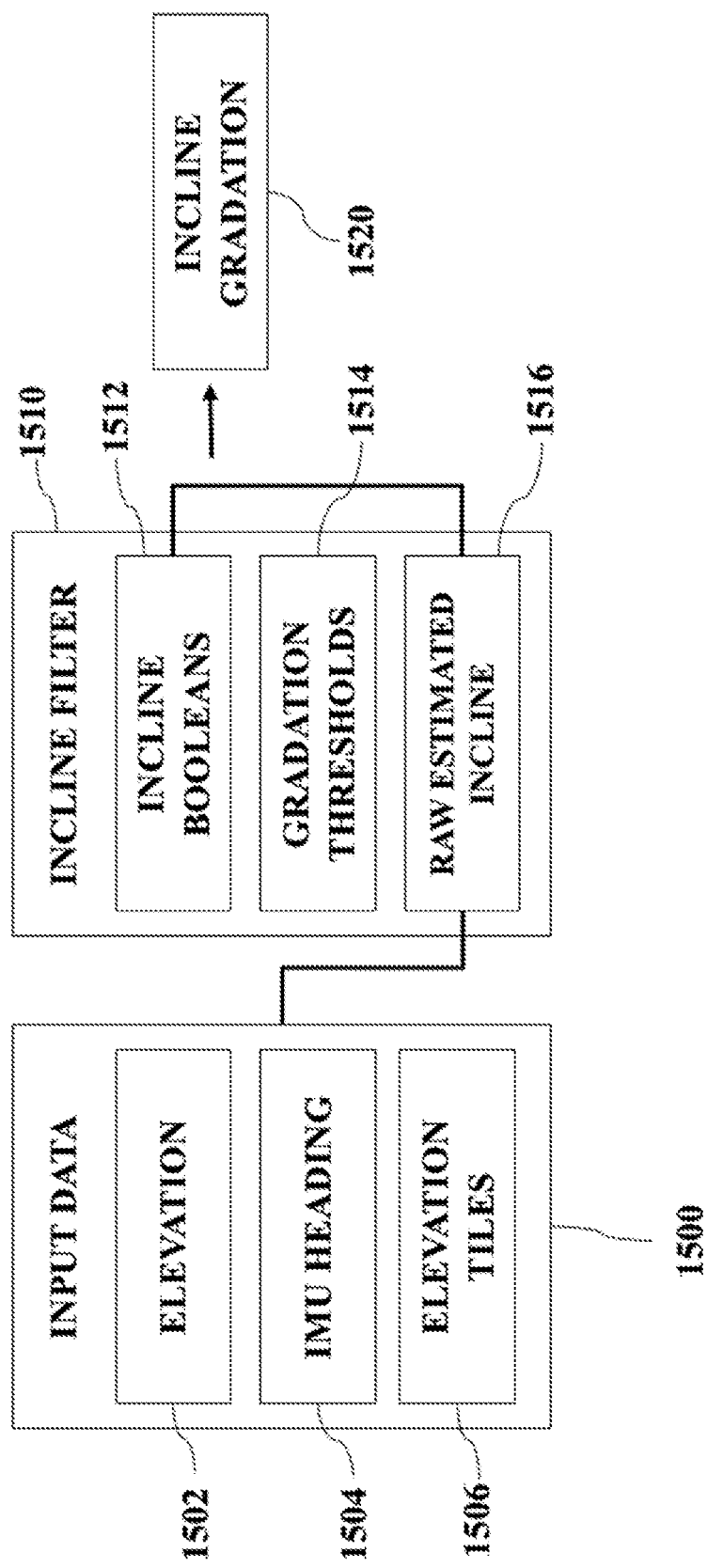
FIG. 14A is a block diagram of an example system of how the incline gradation of a user may be estimated in accordance with some embodiments.

FIG. 14A is a block diagram that illustrates an example of how incline gradation 1520, which may include a tiered estimation for the incline the user is on, may be estimated for wearable augmented reality apparatus 110. In accordance with some embodiments, input data 1500 to incline filter 1510 may include the current estimated elevation 1502, which may correspond to elevation 532 from FIGS. 5C, 5F, and 5G, and IMU heading 1504, which may include the direction the user of wearable augmented reality apparatus 110 is facing and/or moving. Input data 1500 may also include elevation tiles 1506, which may correspond to elevation tiles 612 from FIGS. 5A-5G. Combining current elevation 1502, IMU heading 1504, and elevation tiles 1506 may yield raw estimated incline 1516, which may be calculated by finding the change in elevation in the area proximal to wearable augmented reality apparatus 110 along IMU heading 1504 (or in the exact opposite direction of IMU heading 1504 in accordance with some embodiments). In accordance with some embodiments, the apparent incline of a user and the analogous placement on an avatar on display system 146 may be based entirely or partly on raw estimated incline 1516. In accordance with some embodiments, raw estimated incline 1516 for a user and/or an estimated incline for an avatar may be modified at least partially based on visual data from camera 128.

In accordance with some embodiments, incline filter 1510 may include gradation thresholds 1514, which may be a finite set of gradations that the user of wearable augmented reality apparatus 110 may be estimated to be on. In one example, there may be five values in the gradation thresholds 1514 dataset, corresponding to estimated gradations when the user is on a steep uphill, shallow uphill, flat surface, shallow downhill, or steep downhill. This is not meant to be limiting. Any number of values may be used.

In accordance with some embodiments, incline filter 1510 may also include incline booleans 1512, which may indicate whether the user is currently estimated to be on a hill, if they are going up or downhill, and/or if they are currently on a steep hill. Incline booleans may be combined with raw estimated incline 1516 to yield a final choice for incline gradation 1520. As an example, if incline booleans 1512 indicate the wearable augmented reality apparatus 110 is on a flat surface, but raw estimated incline 1516 sends an outlier estimate that wearable augmented reality apparatus 110 is suddenly on a steep hill, incline gradation 1520 may reflect a flat surface until raw estimated incline 1516 suggests otherwise for a significant, continuous period of time, in which case incline booleans 1512 may change, as well.

Figure 14B:
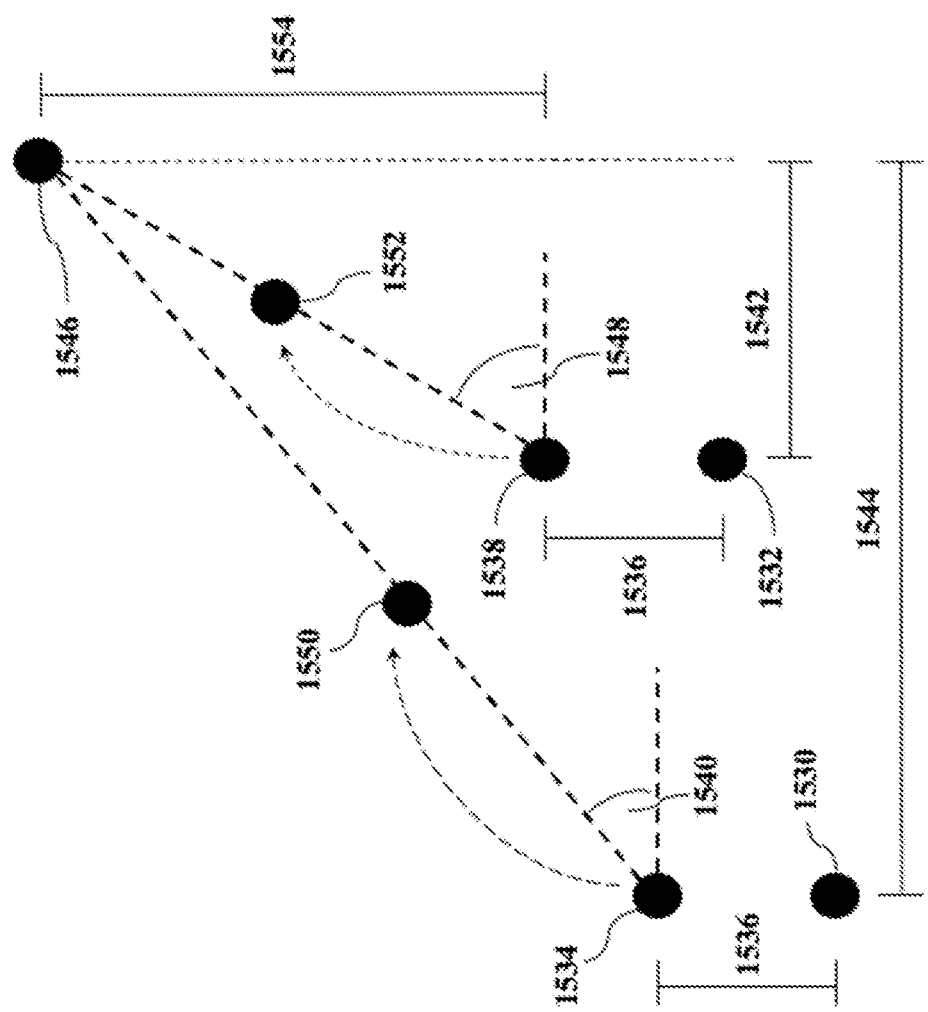
FIG. 14B is a diagram that illustrates an example of how the elevation of a user and an avatar may be approximated in accordance with some embodiments.

FIG. 14B shows an example of how the elevation of a user and an avatar may be approximated when there is not a predefined path for the user or the avatar in accordance with some embodiments. As noted previously, when there is no predefined path, elevation for both the user and the avatar must be calculated using preset and preprocessed elevation data in a defined area such as elevation tiles. Certain APIs, such as Amazon Web Services (AWS) terrain tiles, have saved the elevation at regular intervals from around the globe. By bilinearly interpolating between these data points, it is possible to get a reasonable approximation for elevation for any GPS point.

Elevation data about the area where wearable augmented reality apparatus 110 is being used may be preloaded and preprocessed prior to an activity. One method to calculate the elevation for the user and the avatar is to construct a system whereby the absolute geographic positions of the user and the avatar are calculated during each frame and then their respective elevations can be calculated. While this method is feasible, it is relatively computationally inefficient. Furthermore, the accuracy of new GPS data, which may be received less frequently than the frames should be rendered, may have much more of an impact on the smoothness of this experience compared to the method outlined in FIG. 14B.

In the example in FIG. 14B, a user and an avatar may both be moving in the same direction when a new GPS point has been received or after a fixed, predefined amount of time has passed that exceeds the time it takes for a single frame to render. Let point 1530 be the user's GPS position and elevation and point 1532 be the avatar's GPS position and elevation. Let point 1534 be constructed to have the same GPS position as point 1530 but have an accurate elevation that differs from the elevation of point 1530 by distance 1536, which can be understood to be the absolute elevation error when the GPS point corresponding to point 1530 and point 1534 is received. With this information, the 3D positions of the user and the avatar may change to 1534 and 1538 respectively when a new GPS point is received, such that the elevations for both 3D positions nearly simultaneously change by distance 1536.

Let incline 1540 represent the incline the user is currently on. Incline 1540 may be calculated using the difference between point 1534's elevation and the elevation a certain amount of distance in front of or behind the user in line with the direction the user is facing or moving. Until the next GPS point is received, the elevation of the user at point 1550 may be calculated using incline 1540 and the amount of distance along the GPS plane a user has travelled since the most recent GPS point was received.

Incline 1548, which is used to calculate the avatar's elevation at point 1552, may likely differ from incline 1540 in order to maximize the chance that when the next GPS point is received, the incline between the user and avatar's position is approximately equivalent to incline 1540.

In order to calculate incline 1548, point 1546, which is what the approximate avatar position should be when the new GPS point is received, may be required to be determined first. Assuming that the avatar's speed and the amount of time in between GPS updates is known, that may be used to calculate distance 1542 an avatar may travel along the GPS plane, which may then be used to determine the GPS position of point 1546.

The elevation of point 1546 may be determined by adding the elevation of point 1534 to the product of incline 1540 and distance 1544. From there, incline 1548 may be calculated by dividing distance 1554 (the difference in elevation between points 1546 and 1538) by distance 1542. FIG. 14B illustrates a method of improving the vertical placement, size, and/or orientation of a holographic avatar rendered on display system 146 to minimize the number of significant jumps in avatar appearance between frames and improve consistency of avatar appearance with a programmed/expected behavior.

Figure 15A:
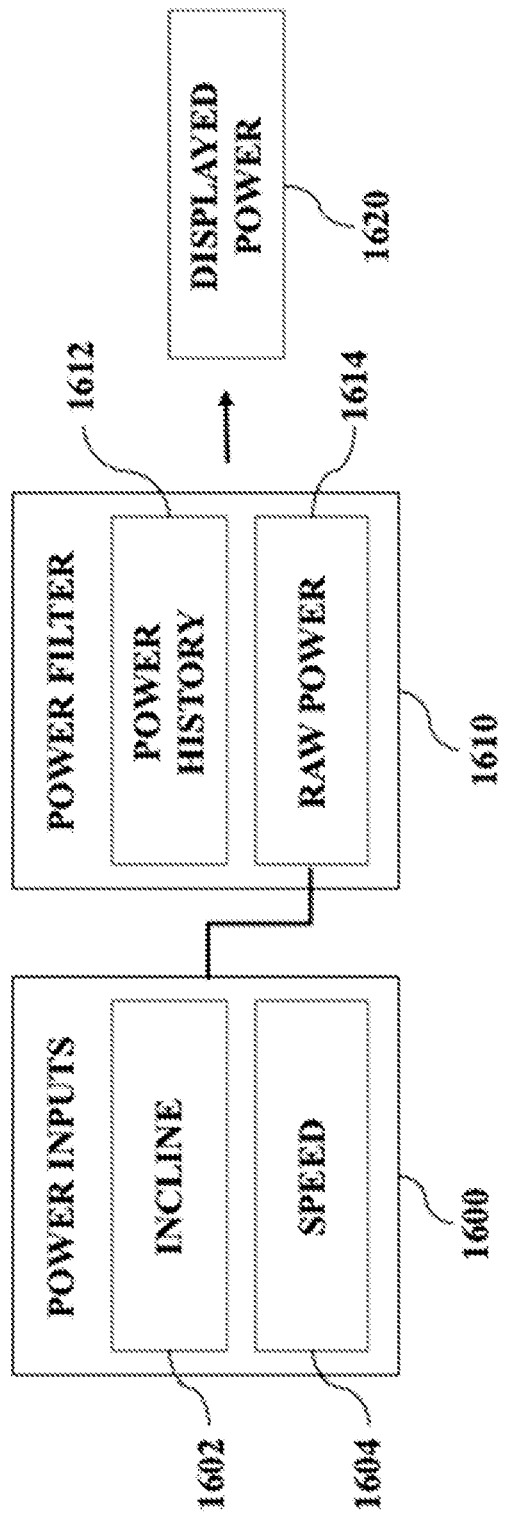
FIG. 15A is a block diagram of an example system of how a user's power exertion may be estimated and displayed in accordance with some embodiments.

FIG. 15A is a block diagram that illustrates an example of how displayed power 1620, the power value displayed by display system 146 may be calculated. In accordance with some embodiments, displayed power 1620 may also be used to modify estimated user position and/or avatar position and behavior. In accordance with some embodiments, power inputs 1600 may include incline 1602 and speed 1604. Incline 1602 and speed 1604 may be combined in accordance with a linear or polynomial formula and some given constants to yield raw power 1614.

Power filter 1610 may synthesize raw power 1614 with power history 1612 to modify displayed power 1620. As an example, if raw power 1614 noticeably spikes compared to previous values in power history 1612, there may be a proportionally smaller increase in displayed power until the spike is shown to be part of a trend of the user accelerating and/or moving to a steeper incline. In accordance with some embodiments, displayed power 1620 may be rounded to the nearest multiple of a given number (two, five, ten, etc.) so as to not fluctuate unnecessarily and distract the user.

Figure 15B:
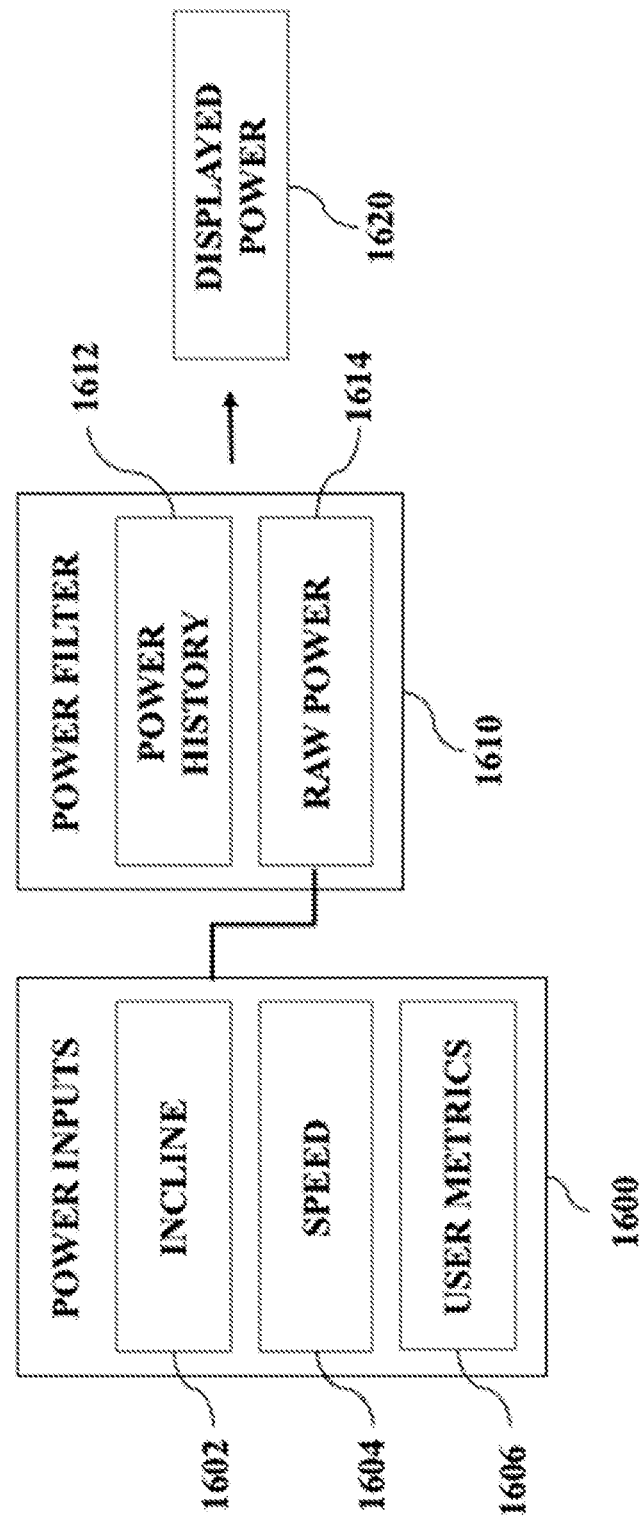
FIG. 15B is a block diagram of another example system of how a user's power exertion may be estimated and displayed in accordance with some embodiments.

As shown in FIG. 15B, power inputs 1600 may further include user metrics 1606, which may include the weight of a user of wearable augmented reality apparatus 110. In accordance with some embodiments, user metrics 1606 may further include the height and/or the stride length of a user of wearable augmented reality apparatus 110. In accordance with some embodiments, default values for user metrics 1606 may be assumed and implemented automatically by power filter 1610 as constants.

It should be understood that many variations are possible based on the disclosure herein. Although features and elements are described above in particular combinations, each feature or element can be used alone without the other features and elements or in various combinations with or without other features and elements.

What is claimed is:

1. A wearable augmented reality apparatus comprising:
a processor;
an inertial measurement unit (IMU) configured to output one or more signals;
a camera configured to capture visual data;
a compass being configured to output an indication of a direction of orientation of the wearable augmented reality apparatus; and
a display system operationally coupled to the processor configured to display at least one virtual avatar;
the processor being configured to account for dilution of precision (DOP) in estimating a position for the wearable augmented reality apparatus, wherein the processor, in accounting for DOP in estimating the position of the wearable augmented reality apparatus, is configured to:
determine that the DOP of at least one signal, received by a global navigation satellite system (GNSS) unit from a GNSS, is above a threshold; and
in response, use the one or more signals output from the IMU and the visual data to estimate the position of the wearable augmented reality apparatus; and
the processor being further configured to determine the direction of orientation based on the indication from the compass and an indication of a head size of a user of the wearable augmented reality apparatus.

2. The wearable augmented reality apparatus of claim 1, wherein the GNSS unit is an external unit that is not physically embedded in the wearable augmented reality apparatus.

3. The wearable augmented reality apparatus of claim 1, wherein the processor is further configured to:
receive one or more signals from an infrared sensor; and
determine a height of a wearer of the wearable augmented reality apparatus based on the one or more signals from the infrared sensor.

4. The wearable augmented reality apparatus of claim 1, wherein the processor is further configured, in response to the determining that the DOP of one or more signals received by the GNSS unit is above the threshold:
adjust a weight applied to the one or more signals output from the IMU.

5. The wearable augmented reality apparatus of claim 1, wherein the processor is further configured to determine an incline value indicating an angle at which the wearable augmented reality apparatus is increasing or decreasing in elevation.

6. The wearable augmented reality apparatus of claim 5, wherein the processor is further configured to calculate a speed of the wearable augmented reality apparatus based on the incline value.

7. The wearable augmented reality apparatus of claim 1, wherein the processor is further configured to determine a range of speeds, wherein a calculated speed at which the wearable augmented reality apparatus is moving is considered valid only within the range.

8. The wearable augmented reality apparatus of claim 1, wherein the processor is configured to determine an orientation offset to adjust the indication from the compass.

9. The wearable augmented reality apparatus of claim 1, wherein the processor is configured to:
determine a cadence of motion of the user of the wearable augmented reality apparatus using the one or more signals from the IMU; and
determine a speed, the position, or both the speed and the position of the wearable augmented reality apparatus based on the cadence.

10. A method performed by a wearable augmented reality apparatus, the method comprising:
receiving, from a compass, an indication of a direction of orientation of the wearable augmented reality apparatus;
determining the direction of orientation based on the indication from the compass and an indication of a head size of a user of the wearable augmented reality apparatus; and
accounting for dilution of precision (DOP) in estimating a position for the wearable augmented reality apparatus, wherein the accounting for DOP in estimating the position of the wearable augmented reality apparatus includes:
determining that the DOP of at least one signal, received by a global navigation satellite system (GNSS) unit from a GNSS, is above a threshold; and
in response, using the one or more signals output from an inertial measurement unit (IMU) and visual data received from a camera to estimate the position of the wearable augmented reality apparatus.

11. The method of claim 10, further comprising:
receiving one or more signals from an infrared sensor; and
determining a height of a wearer of the wearable augmented reality apparatus based on the one or more signals from the infrared sensor.

12. The method of claim 10, further comprising estimating the position of the wearable augmented reality apparatus based on at least two most recent GNSS points.

13. The method of claim 10, further comprising, in response to the determining that the DOP of one or more signals received by the GNSS unit is above the threshold:
adjusting a weight applied to the one or more signals output from the IMU.

14. The method of claim 10, further comprising:
determining an incline value indicating an angle at which the wearable augmented reality apparatus is increasing or decreasing in elevation.

15. The method of claim 14, further comprising:
calculating a speed of the wearable augmented reality apparatus based on the incline value.

16. The method of claim 10, further comprising:
determining a range of speeds, wherein a calculated speed at which the wearable augmented reality apparatus is moving is considered valid only within the range.

17. The method of claim 10, further comprising:
determining an orientation offset to adjust the indication from the compass.

18. The method of claim 10, further comprising:
determining a cadence of motion of the user of the wearable augmented reality apparatus using the one or more signals from the IMU; and
determining a speed, the position, or both the speed and the position of the wearable augmented reality apparatus based on the cadence.

19. A wearable augmented reality apparatus comprising:
a processor;
an inertial measurement unit (IMU) configured to output one or more signals;
a camera configured to capture visual data; and
a display system operationally coupled to the processor configured to display at least one virtual avatar;
the processor being configured to account for dilution of precision (DOP) in estimating a position for the wearable augmented reality apparatus, wherein the processor, in accounting for DOP in estimating the position of the wearable augmented reality apparatus, is configured to:
determine that the DOP of at least one signal, received by a global navigation satellite system (GNSS) unit from a GNSS, is above a threshold; and
in response, use the one or more signals output from the IMU and the visual data to estimate the position of the wearable augmented reality apparatus; and
the processor being further configured to:
receive one or more signals from an infrared sensor; and
determine a height of a wearer of the wearable augmented reality apparatus based on the one or more signals from the infrared sensor.

* * * * *